United States Patent
Johannesson et al.

(10) Patent No.: US 7,665,655 B2
(45) Date of Patent: Feb. 23, 2010

(54) APPARATUS AND METHOD FOR PRESENTING BOTH FACES OF A DOCUMENT FOR PROCESSING

(75) Inventors: Glen Johannesson, Waterloo (CA); Jeffrey Davis, Waterloo (CA); William Stefanuk, Waterloo (CA)

(73) Assignee: RDM Corporation, Waterloo, Ontario (CA)

( * ) Notice: Subject to any disclaimer, the term of this patent is extended or adjusted under 35 U.S.C. 154(b) by 745 days.

(21) Appl. No.: 11/341,417

(22) Filed: Jan. 30, 2006

(65) Prior Publication Data

US 2006/0186208 A1     Aug. 24, 2006

Related U.S. Application Data

(63) Continuation-in-part of application No. 10/410,232, filed on Apr. 10, 2003, now Pat. No. 7,182,249.

(60) Provisional application No. 60/647,387, filed on Jan. 28, 2005.

(51) Int. Cl.
*G06F 17/00* (2006.01)
(52) U.S. Cl. .................................. 235/375; 235/475
(58) Field of Classification Search ................ 235/475, 235/477, 480, 375
See application file for complete search history.

(56) References Cited

U.S. PATENT DOCUMENTS

| | | | |
|---|---|---|---|
| 4,456,236 A * | 6/1984 | Buddendeck | 271/3.05 |
| 4,840,344 A | 6/1989 | Moroe | |
| 4,984,779 A | 1/1991 | Iwasaki | |
| 5,237,159 A | 8/1993 | Stephens et al. | |
| 5,339,139 A | 8/1994 | Fullerton et al. | |
| 5,345,090 A | 9/1994 | Hludzinski | |
| 5,347,115 A | 9/1994 | Sherman et al. | |
| D355,437 S | 2/1995 | Reph | |
| 5,415,391 A | 5/1995 | Wong et al. | |
| 5,438,435 A | 8/1995 | Lawniczak | |
| 5,488,676 A | 1/1996 | Harding, Jr. | |
| 5,566,256 A | 10/1996 | Harding, Jr. | |
| 5,651,624 A | 7/1997 | Passer | |
| 5,789,916 A | 8/1998 | Mitchell | |
| 5,808,283 A | 9/1998 | Stanton et al. | |
| 5,865,547 A | 2/1999 | Harris et al. | |
| 5,887,865 A | 3/1999 | Ishimaru | |
| 5,997,192 A | 12/1999 | Martinez et al. | |
| 6,017,161 A | 1/2000 | Harris et al. | |
| 6,065,679 A | 5/2000 | Levie et al. | |
| 6,085,977 A | 7/2000 | James et al. | |
| 6,089,450 A | 7/2000 | Koeple | |
| 6,097,606 A | 8/2000 | Groves et al. | |
| 6,109,521 A | 8/2000 | Martinez et al. | |

(Continued)

*Primary Examiner*—Karl D Frech

(57) ABSTRACT

An apparatus for presenting each of a first face and a second face of a document to a processing element to facilitate processing of the document thereby. The apparatus includes a first transport subassembly for moving the document along a first document path to present the first face of the document to the processing element. The apparatus also includes a gate adapted to permit movement of the document from the first document path to the second document path. In addition, the apparatus has a second transport subassembly for moving the document in the second document path in a reverse direction until the document engages a downstream side of the gate. The gate directs the document, upon engagement thereof with the downstream side, into the first document path with the second face of the document positioned for presentation to the processing element.

4 Claims, 50 Drawing Sheets

U.S. PATENT DOCUMENTS

| | | |
|---|---|---|
| 6,126,073 A | 10/2000 | Rowlands |
| 6,155,483 A | 12/2000 | Chupka et al. |
| 6,257,783 B1 | 7/2001 | Hanaoka et al. |
| 6,261,008 B1 | 7/2001 | Omura |
| 6,293,715 B1 | 9/2001 | James et al. |
| 6,296,405 B1 | 10/2001 | Brewington et al. |
| 6,299,365 B1 | 10/2001 | Harris et al. |
| 6,350,005 B1 | 2/2002 | Asai et al. |
| 6,373,511 B1 | 4/2002 | Groves et al. |
| 6,447,182 B2 | 9/2002 | Brewington et al. |
| 6,473,519 B1 | 10/2002 | Pidhimy et al. |
| 6,523,927 B2 | 2/2003 | Asai et al. |
| 6,530,704 B2 | 3/2003 | Omura |
| 6,695,427 B2 | 2/2004 | Murata et al. |
| 6,816,608 B2 | 11/2004 | Cato |
| 2003/0037002 A1 | 2/2003 | Higgins et al. |

* cited by examiner

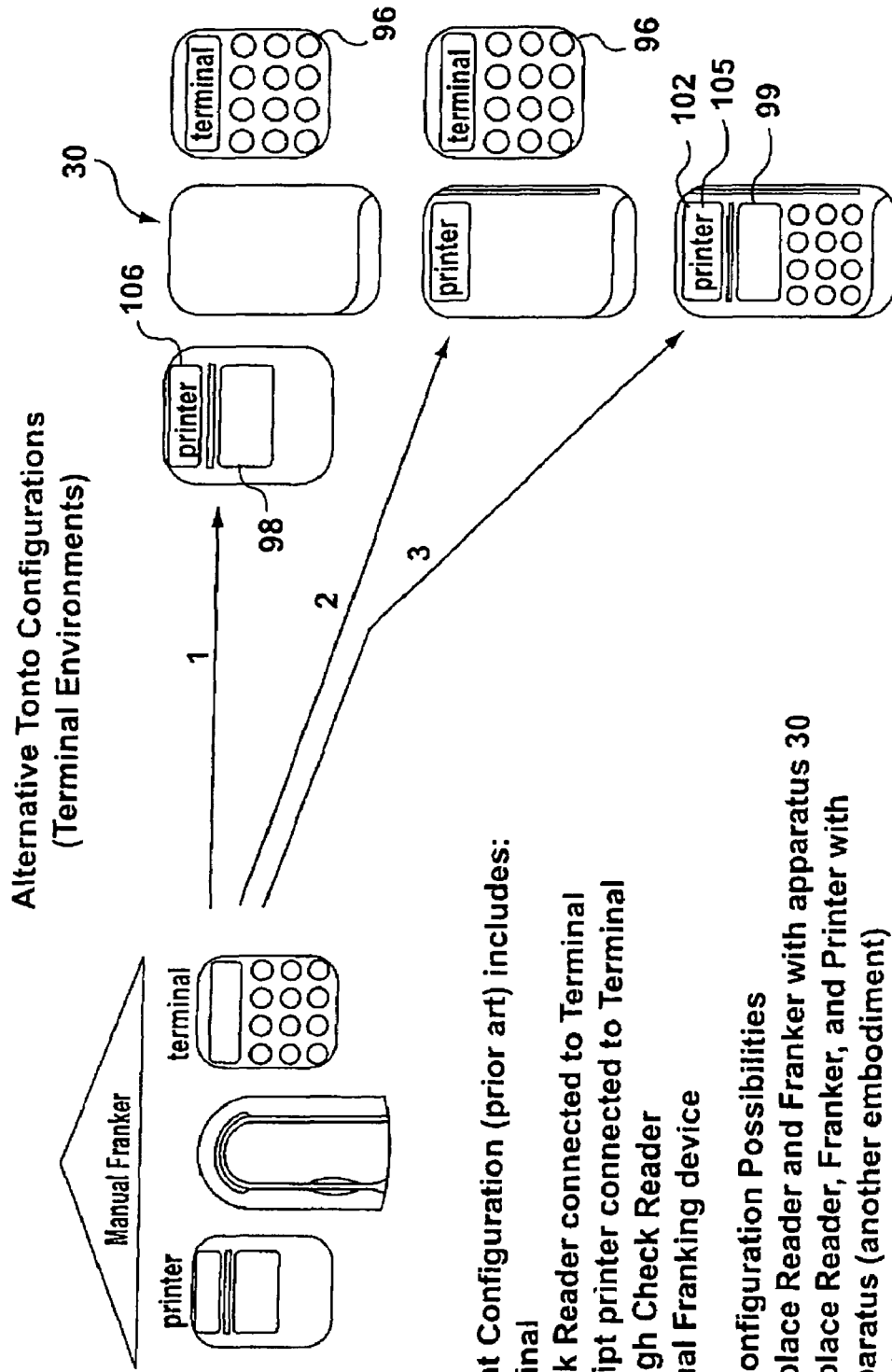

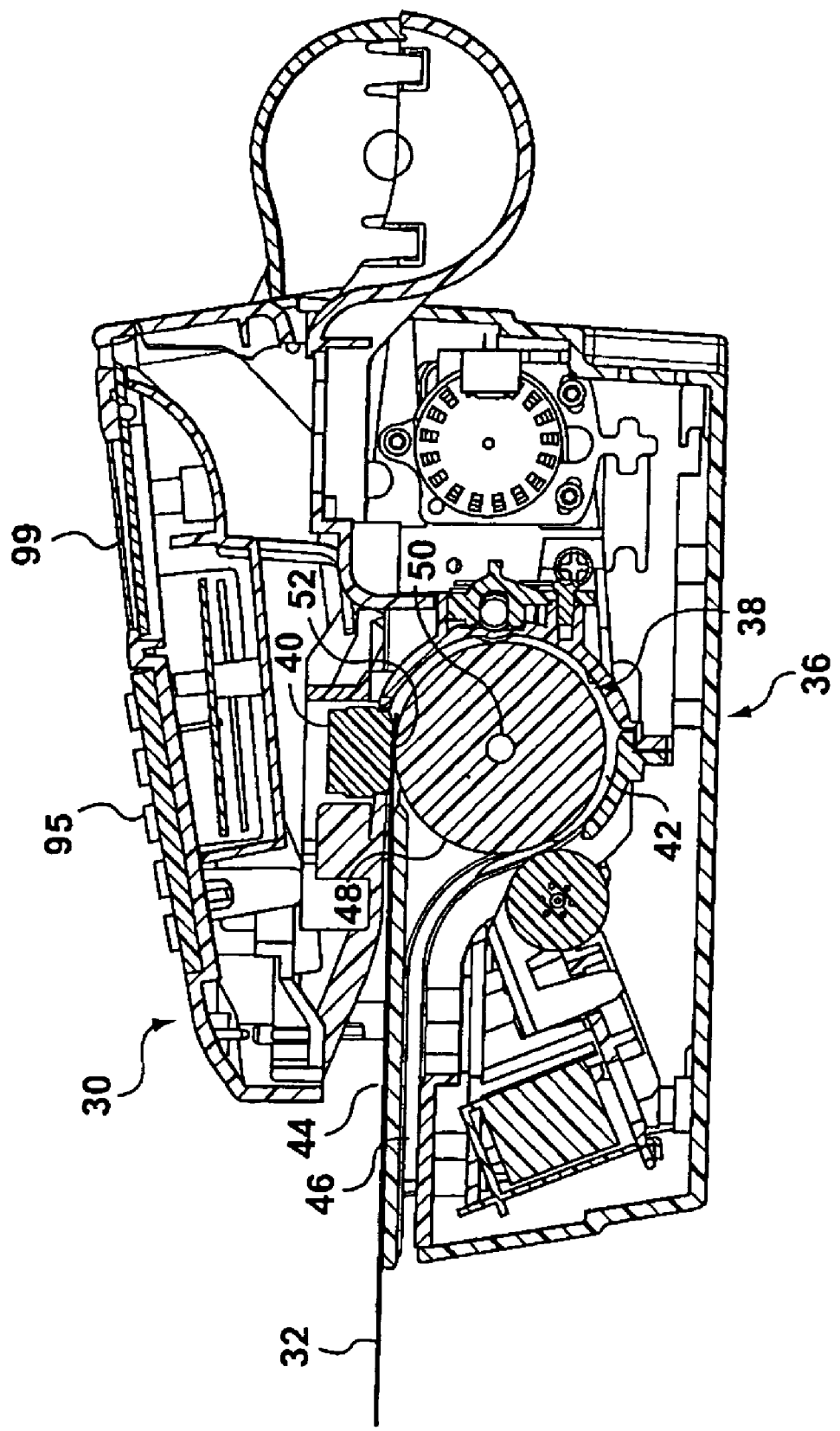

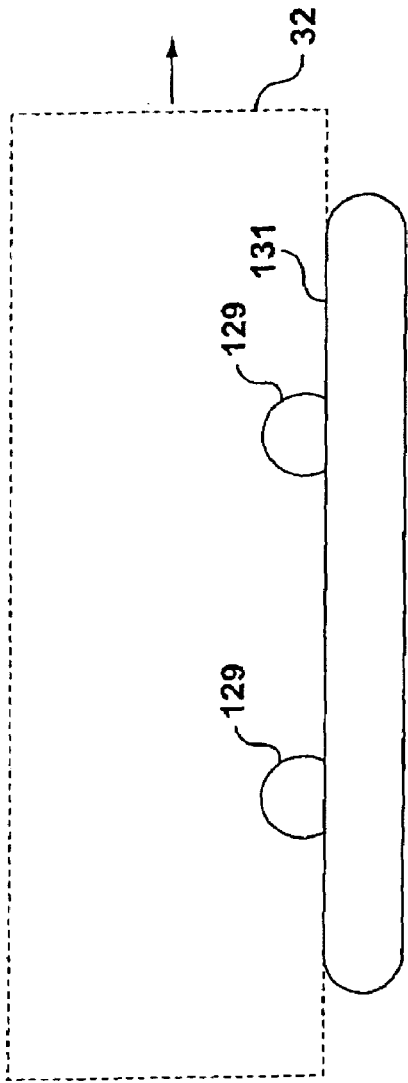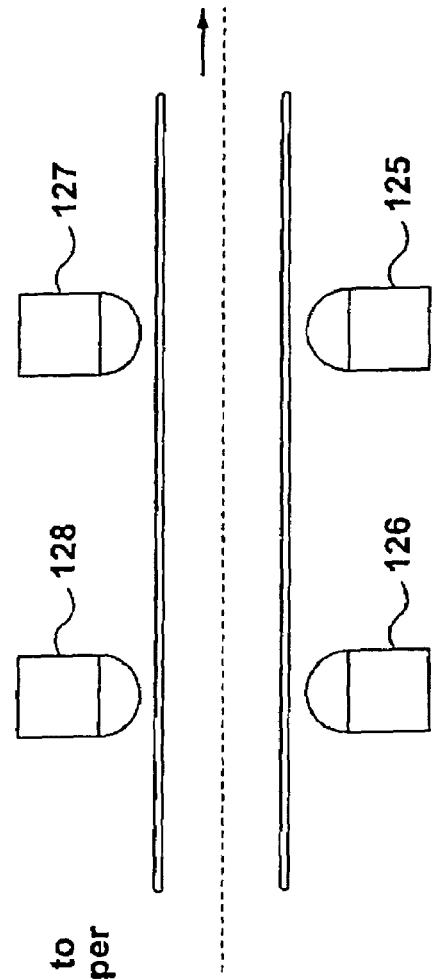

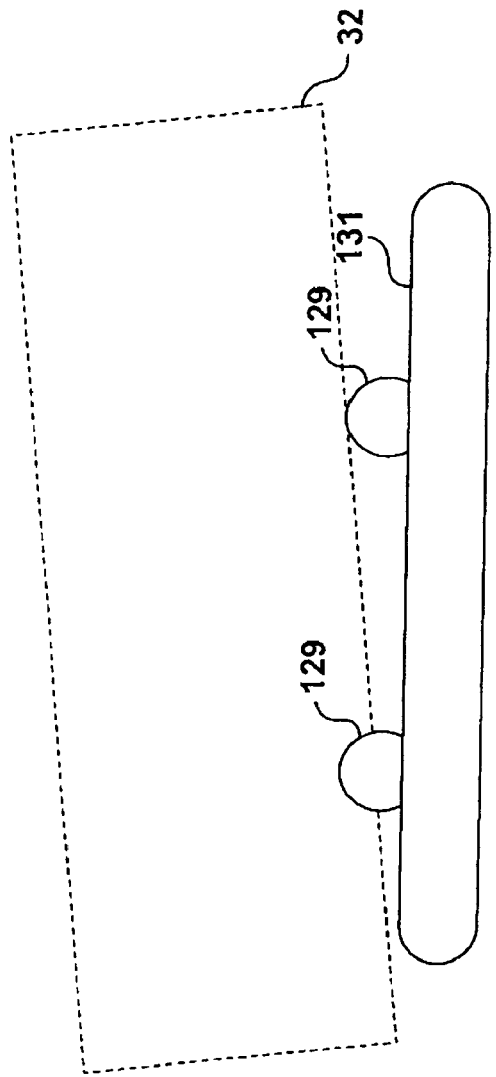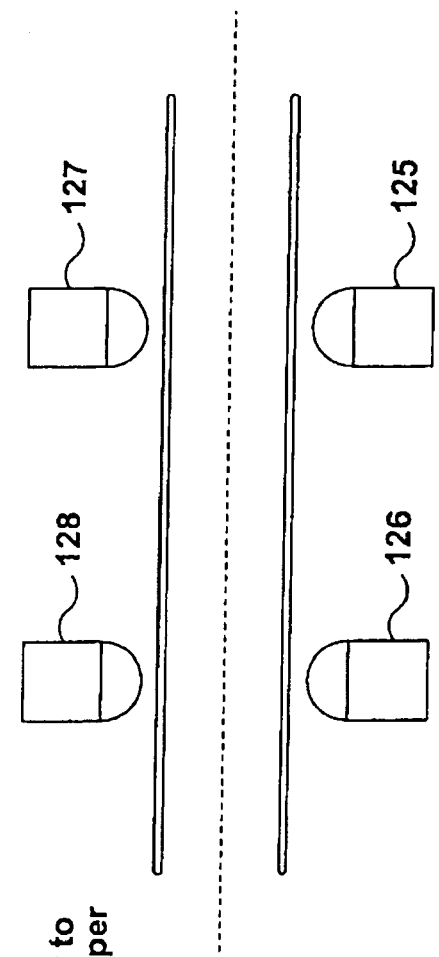

Top view

Side view perpendicular to direction of paper motion

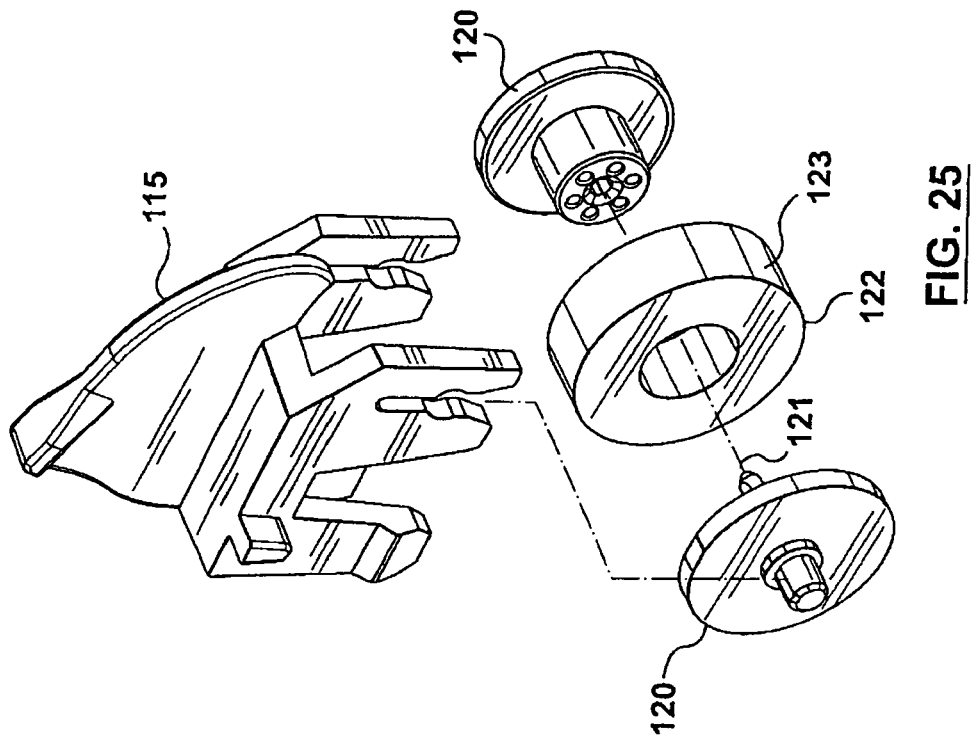
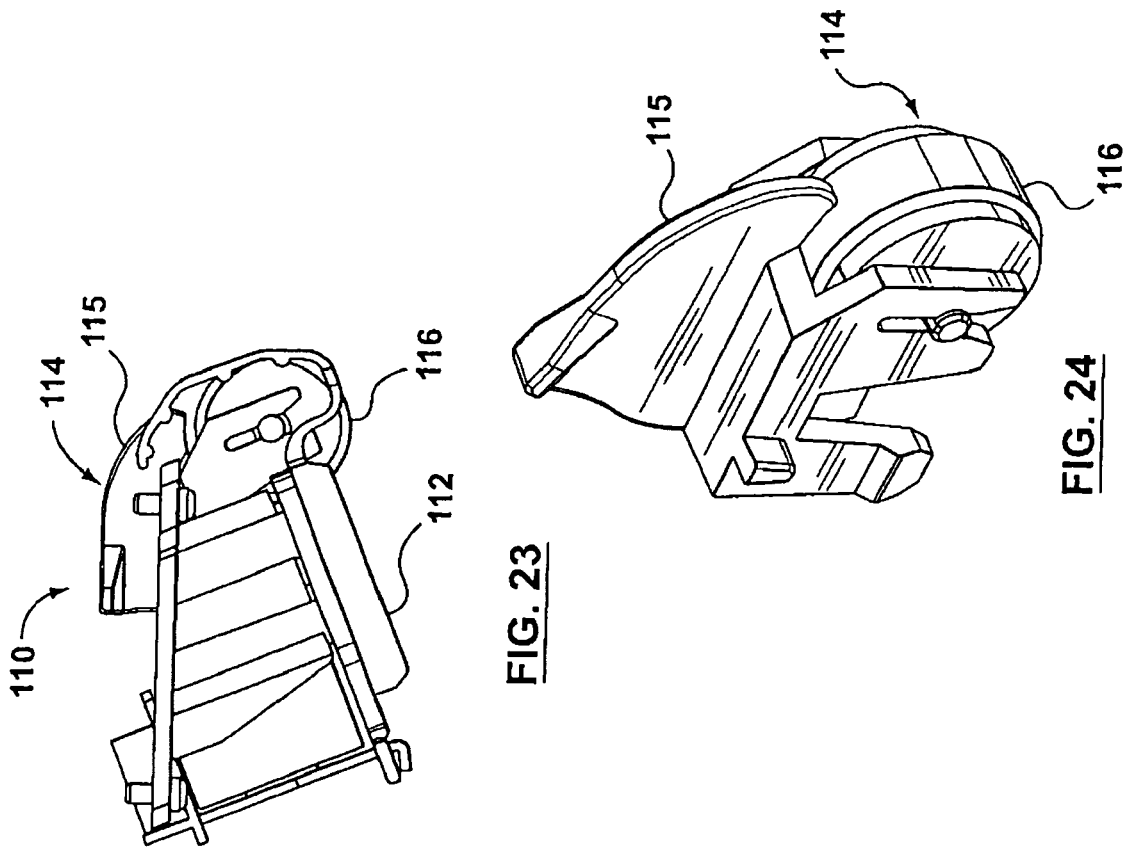

APPARATUS AND METHOD FOR PRESENTING BOTH FACES OF A DOCUMENT FOR PROCESSING

This application is a continuation-in-part of application Ser. No. 10/410,232, filed Apr. 10, 2003. This application also claims the benefit of U.S. Provisional Application No. 60/647,387, filed Jan. 28, 2005.

FIELD OF THE INVENTION

This invention relates to an apparatus and a method for presenting each of a first face and second face of a document to a processing element to facilitate processing thereby.

BACKGROUND OF THE INVENTION

A variety of documents such as checks, bill stubs, bond coupons, and money orders are presented in various transactions in which data is obtained from the document to enable the transaction to proceed. For example, in a transaction of purchase and sale by a consumer, the consumer may present a check in payment of the amount due. A vendor may wish to convert the check at point of sale, and if so, data must be obtained from the check in order to complete the transaction. Alternatively, a customer who wishes to pay an amount due to a vendor pursuant to an invoice (or bill) typically presents a bill stub (i.e., a detachable portion of the invoice designed to be returned with payment) to the vendor or the vendor's agent. The vendor, or the vendor's agent, needs to obtain data from the bill stub in order to complete the transaction.

In each of these examples, the vendor or his agent needs to obtain data from the document at point of presentment. Typically, the point of presentment is a retail context, and the consumer waits while the transaction is completed. The consumer also expects to be provided with confirmation of completion of the transaction immediately upon completion, at the point of presentment. The confirmation of completion is provided in different forms, but generally involves a receipt and/or a mark made on the document.

Known devices for obtaining data from documents suffer from a number of defects. For example, the "footprint" of a device for obtaining data from a document (i.e., the space on the vendor's counter occupied by the device) should be as small as possible. However, known devices still have relatively large footprints. Also, misfeeding of documents, and jamming, is a recurring problem in known data-obtaining devices. As another example, known devices can also permit a misread document to be processed in some circumstances, with the result that the vendor is then subsequently obligated to deal with the lack of document data.

Sometimes it is desirable or necessary to obtain information from both a front face of a document and a back face thereof, or to stamp or print information thereon. For example, in accordance with certain United States legislation, images of a check are, taken together, considered to be equivalent (i.e., for many purposes) to the original document, provided that certain requirements are met. In particular, the legislation requires that the images of the check include images of both the front face and the back face of the check.

In the prior art, processing the document to obtain information from both faces thereof is known. For example, a prior art device includes two scanners positioned to capture images of the front face and the back face respectively as the document is moved past the scanners. However, this approach has the disadvantage that scanners are relatively expensive. Also, a device which includes two scanners would need to have a sufficiently long, straight portion of a document path to accommodate the two scanners. Such a device would therefore have a relatively large footprint.

Alternatively, the document could be sent twice through a device with only one scanner, i.e., once inverted. However, this method is somewhat time-consuming, and vulnerable to operator error.

There is therefore a need for an apparatus and a method for presenting each of a first face and a second face of a document to a processing element to facilitate processing thereby which overcomes or mitigates one or more of the disadvantages of the prior art.

SUMMARY OF THE INVENTION

In a broad aspect of the present invention, there is provided an apparatus for presenting each of a first face and a second face of a document to a processing element to facilitate processing of the document thereby. The apparatus includes a first transport subassembly for moving the document along a first document path from a front end to a back end of the first document path past the processing element to present the first face of the document for processing thereof by the processing element. The apparatus also includes one or more gates, each gate having an upstream side defining the back end of the first document path and a downstream side defining an end of a second document path. Each gate is adapted to permit movement of the document from the first document path to the second document path. The apparatus also has a second transport subassembly adapted to move the document in the second document path until the document has cleared each gate. The second transport subassembly is further adapted to move the document thereafter along the second document path in a reverse direction until the document engages the downstream side of each gate. Each gate is adapted to direct the document, upon engagement thereof with the downstream side of each gate, into the first document path at the front end thereof with the second face of the document positioned for presentation to the processing element as the document is moved along the first document path by the first transport subassembly, for processing thereof by the processing element.

In another aspect, each gate is pivotable about an axis between an open position, in which each gate permits the document to move from the first document path to the second document path, and a closed position, in which each gate directs the document into the first document path upon engagement of the document with the downstream side of each gate.

In another of its aspects, each gate is biased to the closed position.

In yet another aspect, each gate is maintained in the closed position by gravity.

In another aspect of the invention, each gate includes a proximal end in which the axis is positioned, and a distal end disposed distal to the proximal end. The distal end is shaped such that, upon engagement of the document with the upstream side of each gate, the document moves each gate to the open position.

In another aspect, the apparatus includes a plurality of gates arranged in an array in which each gate is pivotable about the axis between the open position and the closed position. Each gate is positioned substantially parallel to each other and spaced a predetermined distance apart from each other.

In another aspect, the apparatus includes a receiver for receiving an acceptance signal indicating that the document is acceptable with respect to a transaction for which the document was submitted. In addition, if the document is unacceptable with respect to the transaction, a rejection signal indicating that the document is unacceptable is transmitted, and the rejection signal is receivable by the receiver. The receiver is adapted to communicate the acceptance signal to the second transport subassembly, upon receipt thereof by the receiver. The second transport subassembly is further adapted, upon receipt of the acceptance signal, to move the document along the second document path in a reverse direction until the document engages the downstream side of each gate. Each gate is adapted to direct the document, upon engagement thereof with the downstream side of each gate, into the first document path at the front end thereof with the second face of the document positioned for presentation to the processing element as the document is moved along the first document path, for processing thereof by the processing element. Finally, the document is moved into the second document path and to a predetermined acceptance position therefor.

In yet another aspect, the second transport subassembly is further adapted, upon receipt of the rejection signal, to move the document to a predetermined rejection position therefor.

In another of its aspects, the second transport subassembly is further adapted, upon receipt of the rejection signal, to maintain the document in a predetermined rejection position therefor.

BRIEF DESCRIPTION OF THE DRAWINGS

The invention will be better understood with reference to the drawings, in which:

FIG. 2A is a schematic diagram representing a configuration including a prior art device and a variety of configurations including the apparatus of the invention;

FIG. 4A is a side view cross-section of the apparatus of FIG. 4;

FIG. 20A is a schematic diagram representing the input guide means when the document is properly aligned therein;

FIG. 20B is a schematic diagram representing the input guide means when the document is properly aligned therein;

FIG. 20C is a schematic diagram representing the input guide means when the document is misaligned therein;

FIG. 20D is a schematic diagram representing the input guide means when the document is misaligned therein;

FIG. 23 is a side view of a stamping mechanism including a cartridge, drawn at a larger scale;

FIG. 24 is an isometric view of the cartridge of FIG. 23, drawn at a larger scale;

FIG. 25 is an exploded view of the cartridge of FIG. 24;

DETAILED DESCRIPTION OF THE PREFERRED EMBODIMENT(S)

Figure 3:
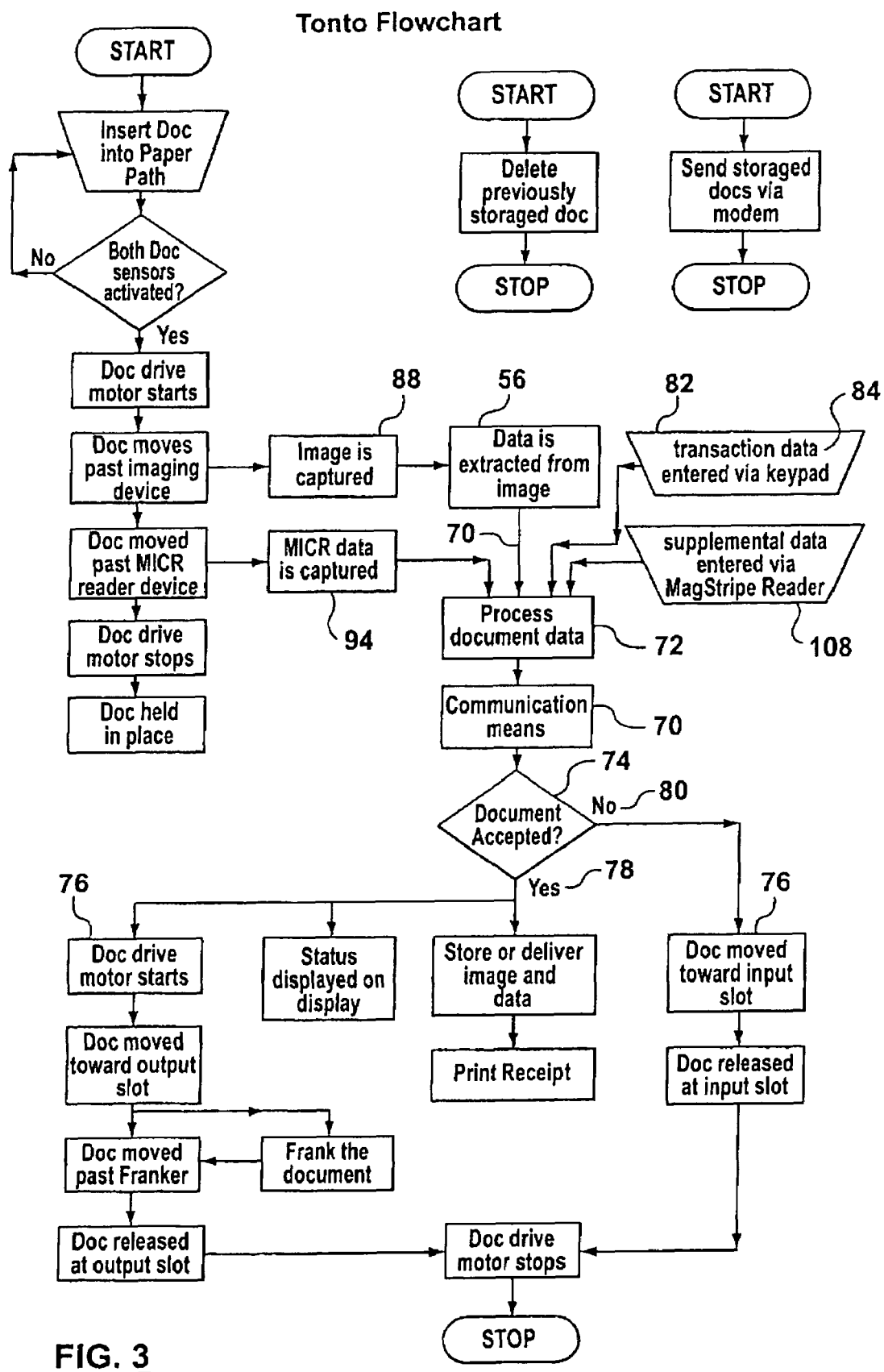
FIG. 3 is a flowchart diagram representing a method of obtaining data from a document in accordance with the present invention.
Figure 4:
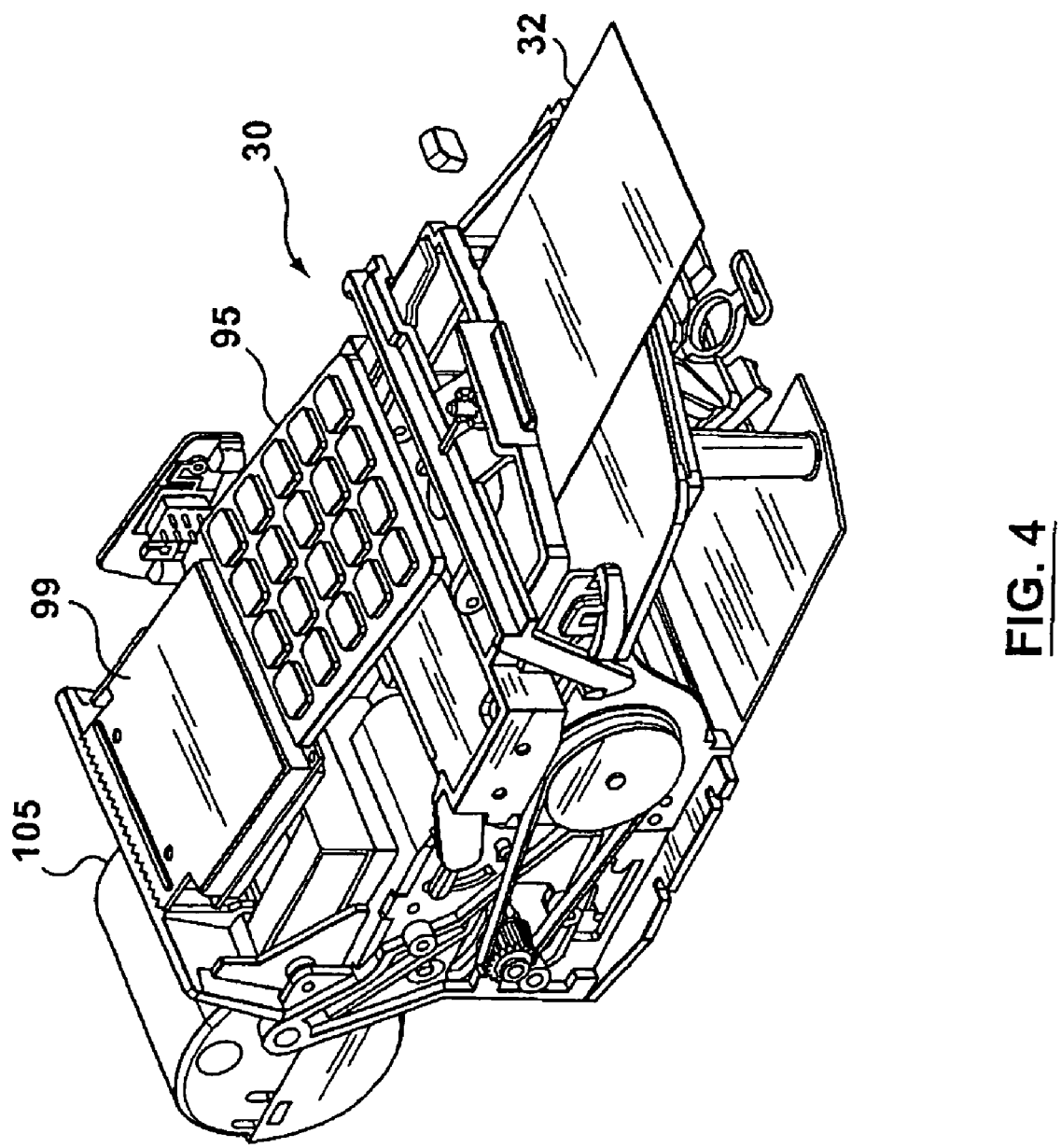
FIG. 4 is an isometric view of the apparatus of FIG. 1B with the cover removed.
Figure 5:
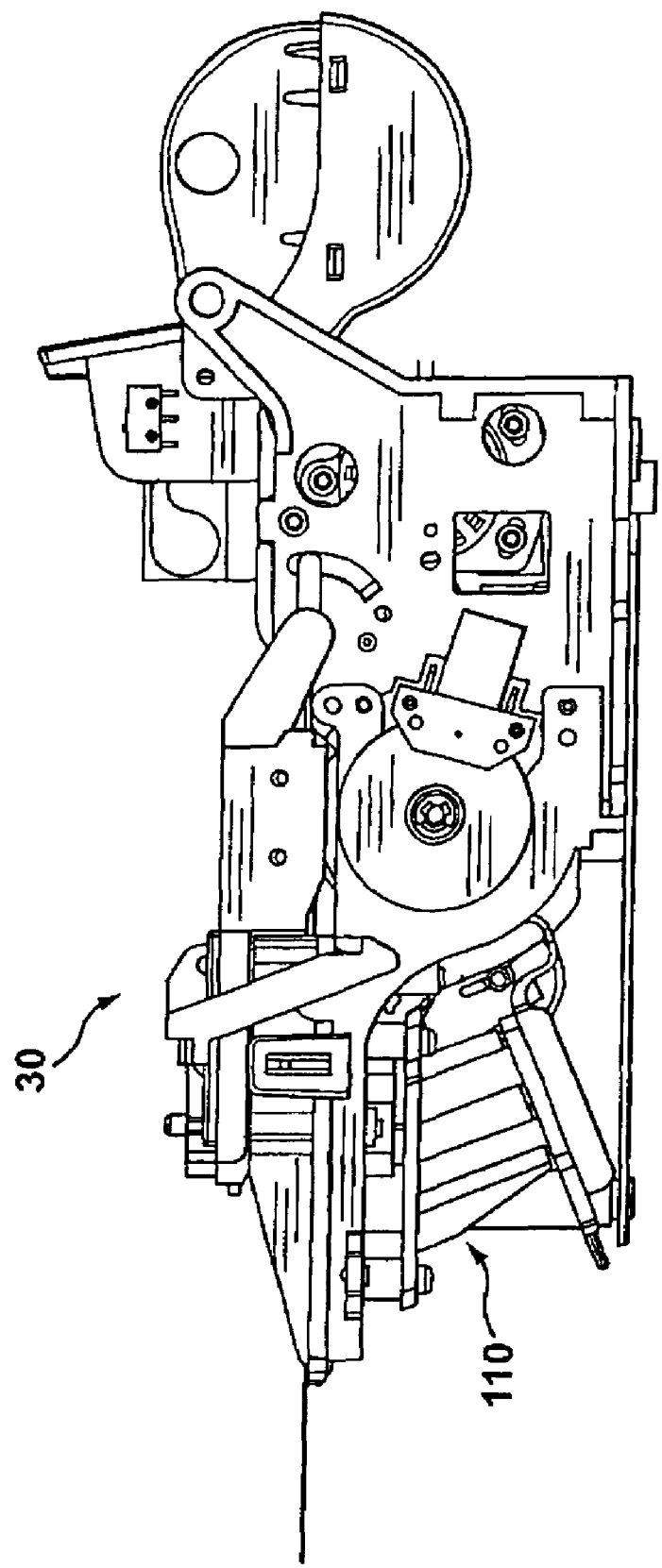
FIG. 5 is a side view of the apparatus of FIG. 4, drawn at a larger scale, with the keypad assembly and the display screen removed.
Figure 6:
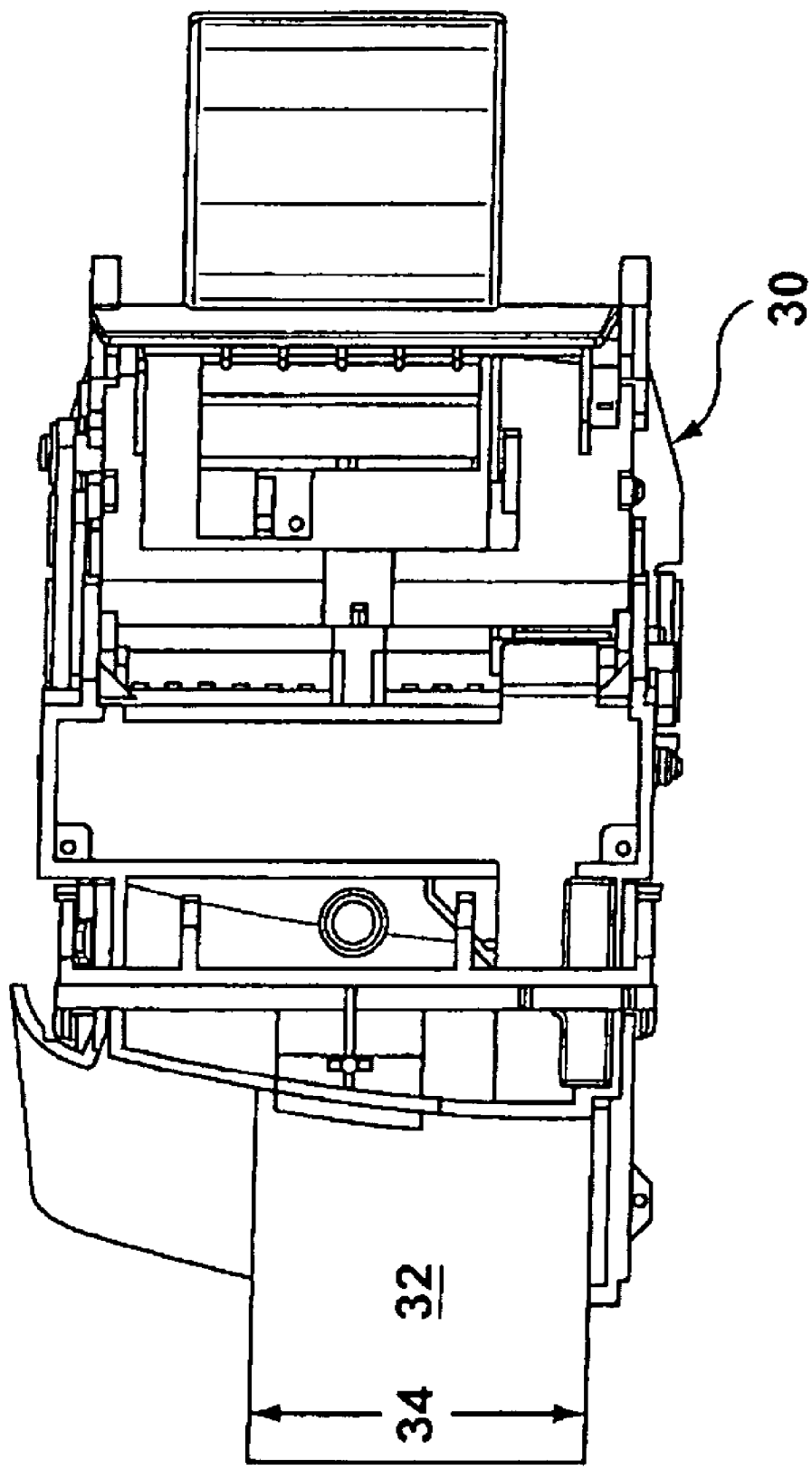
FIG. 6 is a top view of the apparatus of FIG. 5, drawn at a smaller scale.
Figure 6A:
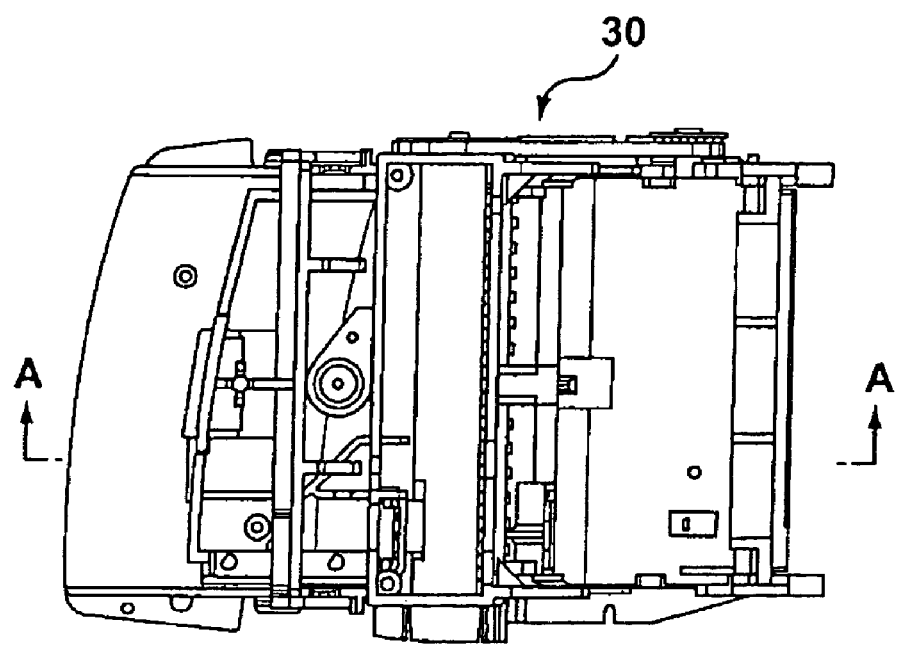
FIG. 6A is a top view of the apparatus of FIG. 6, drawn at a smaller scale, showing line A-A.
Figure 6B:
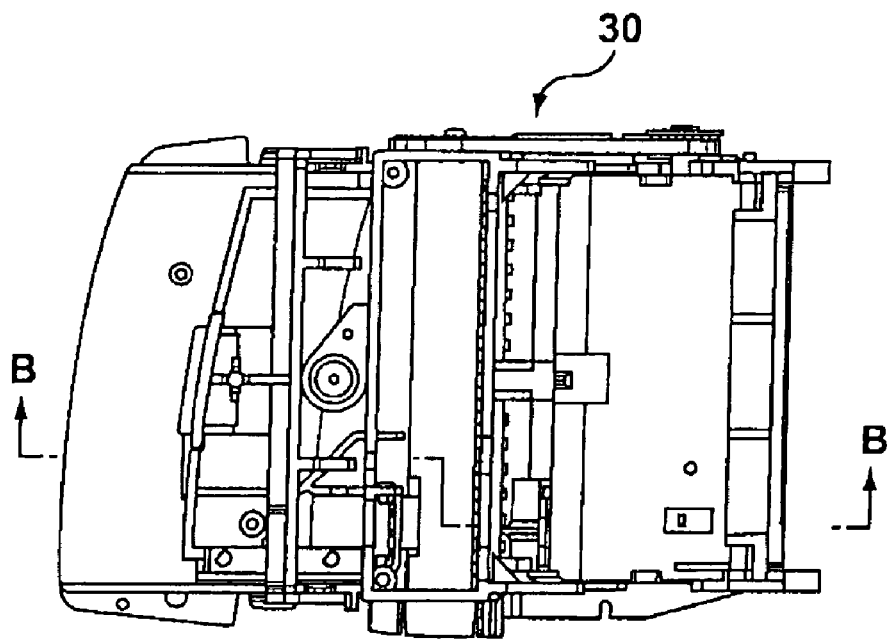
FIG. 6B is a top view of the apparatus of FIG. 6, drawn at a smaller scale, showing line B-B.

Reference is first made to FIGS. 1B, 3, 4, and 4A to describe a preferred embodiment of an apparatus for obtaining data from a document at point of presentment indicated generally by the numeral 30 in accordance with the invention. The apparatus 30 is for obtaining data from a document 32 having a predetermined width dimension 34 (FIG. 4) at point of presentment of the document 32, as will be described. As can be seen in FIG. 4A, the apparatus 30 has a frame 36, a drive mechanism 38 mounted on the frame 36, and a sensor 40 for obtaining document data. As will be described, the drive mechanism 38 is for moving the document 32 along a document path 42 in the apparatus 30 between a home position 44 and an exit position 46 (FIG. 4A). In the preferred embodiment, the document 32 is inserted into the apparatus 30 at the home position 44 (FIG. 4). The document 32 is removable from the apparatus 30 at the exit position 46. As can be seen in FIG. 4A, the drive mechanism 38 includes a roller 48 rotatable about a roller axis 50 for engaging a contact portion 52 of the document extending along the width 34 of the document 32. Also, the roller 48 has a substantially smooth surface 54 for supporting the contact portion 52, as will be described. The sensor 40 obtains document data 56 (FIG. 3) from the contact portion 52 of the document 32, as will also be described.

Figure 21:
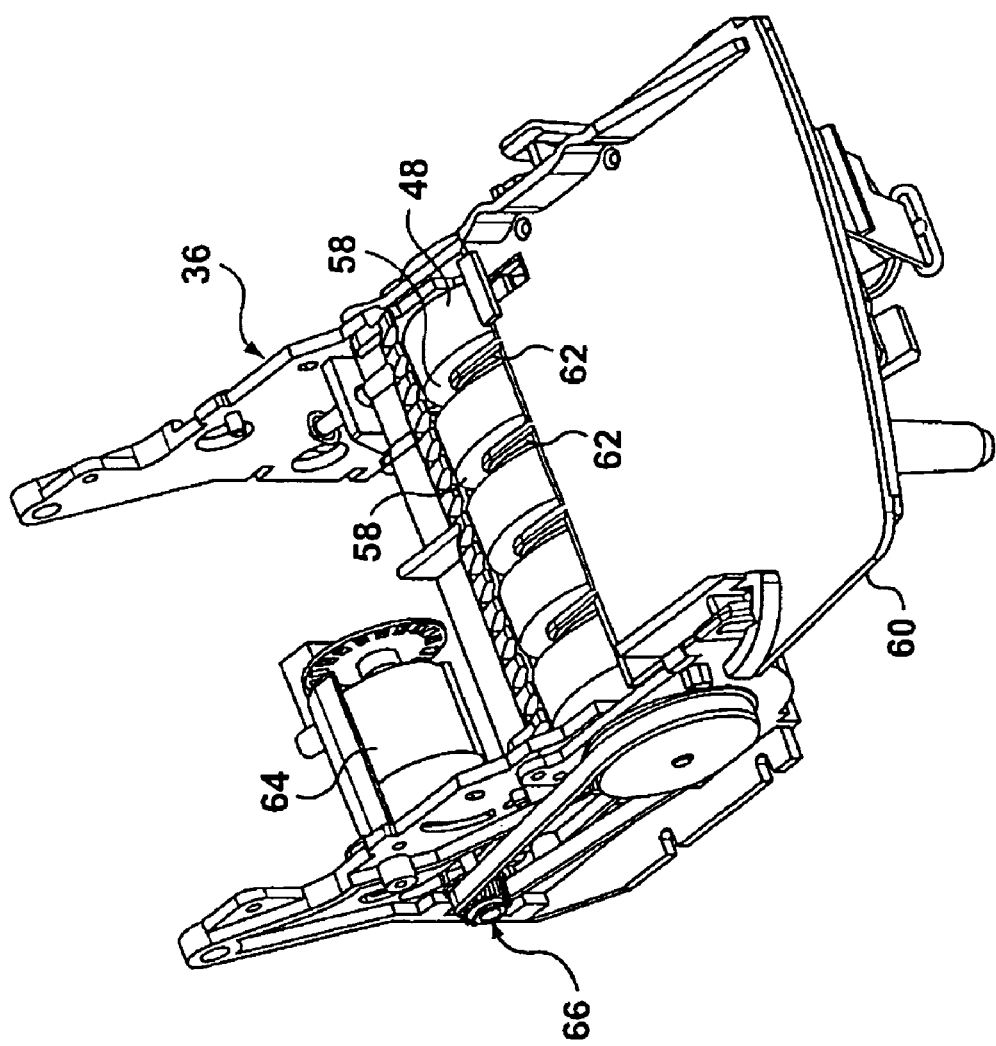
FIG. 21 is an isometric view of the frame of FIG. 16 and the input guide means with the contact image sensor housing removed, showing a slotted roller, drawn at a smaller scale.

As can be seen in FIG. 21, the roller 48 includes a plurality of slots 58 positioned substantially transverse to the roller axis 50. The frame 36 includes a deck portion 60 having fingers 62 extending from the deck portion 60 in an inward direction of travel in the document path 42 in the direction of arrow A (FIG. 21). Each finger 62 is received in each slot 58 for preventing misdirection of the document 32 out of the document path 42 upon engagement of the document 32 with the roller 48.

Figure 7:
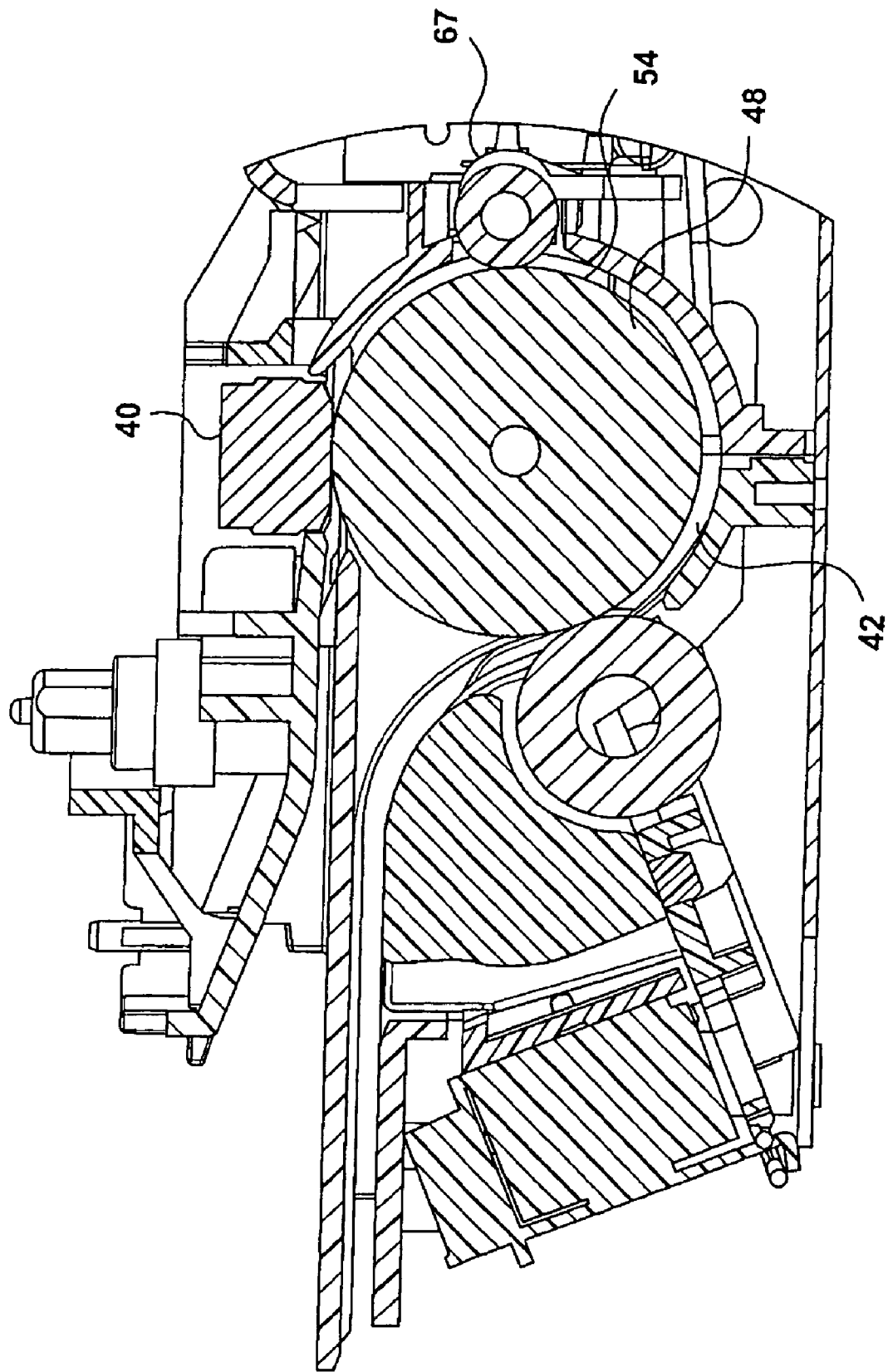
FIG. 7 is a cross-section taken along line A-A showing a document path in the apparatus, drawn at a larger scale.
Figure 22:
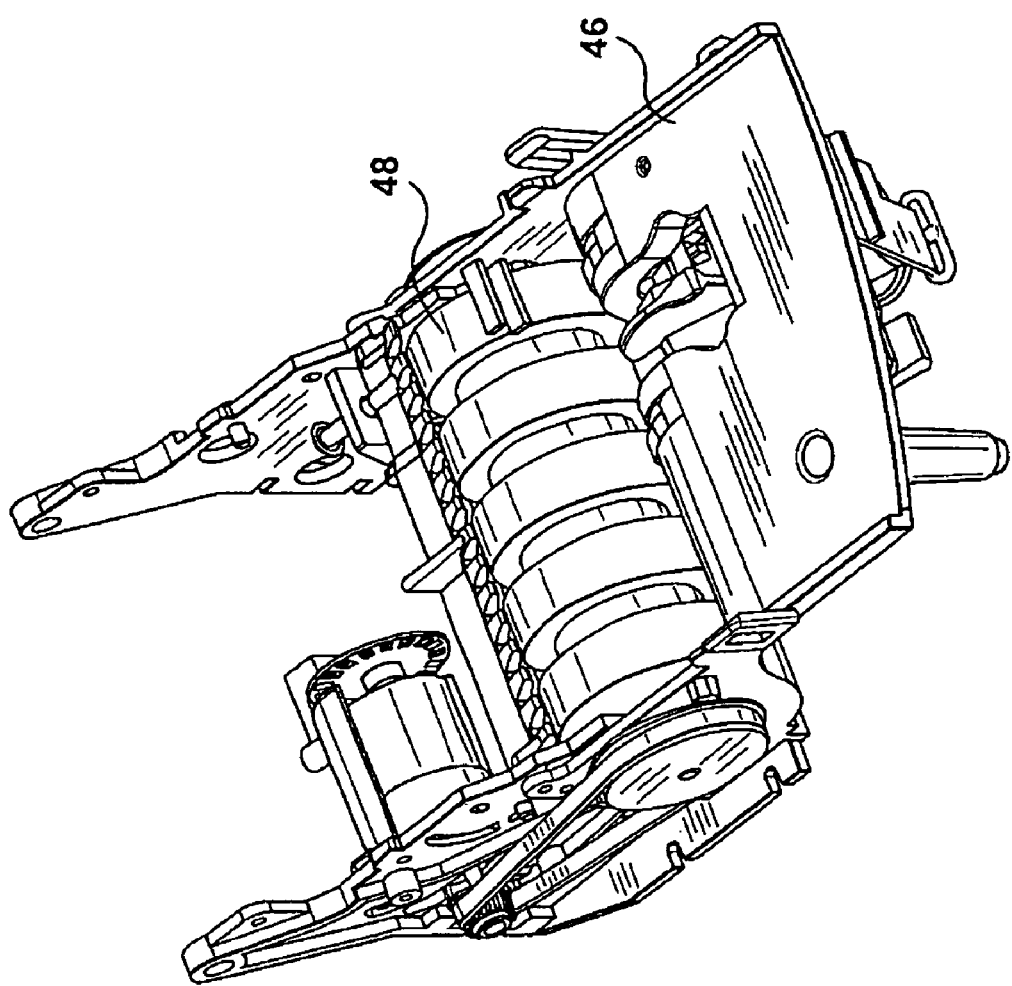
FIG. 22 is an isometric view of the frame of FIG. 21 with the input guide means removed, showing an exit guide means.

The frame 36 with the deck portion 60 removed is shown in FIG. 22. As shown in FIGS. 21 and 22, the drive mechanism 38 includes a motor 64 and drive assembly 66 which drive the roller 48 about its axis 50. The motor 64 and the drive assembly 66 are any suitable motor and drive assembly arrangement, and preferably are of conventional construction, as is known in the art. Preferably, an idler 67 is positioned to press the document 32 tightly against the roller surface 54 (FIG. 7).

It will be appreciated that the roller 48 is considered, for the purposes hereof, as a single roller, notwithstanding the plurality of slots 58 therein. As will be described, the use of a single roller, i.e., a roller extending across the width 34 of the document 32, provides for a number of advantages over known devices used for obtaining data from documents.

Preferably, the apparatus 30 is adapted to process a variety of documents having a wide range of document widths. As can be seen in FIG. 1B, for example, the apparatus 30 is capable of accepting a document having a width larger than the width 34 of the document 32.

Figure 11:
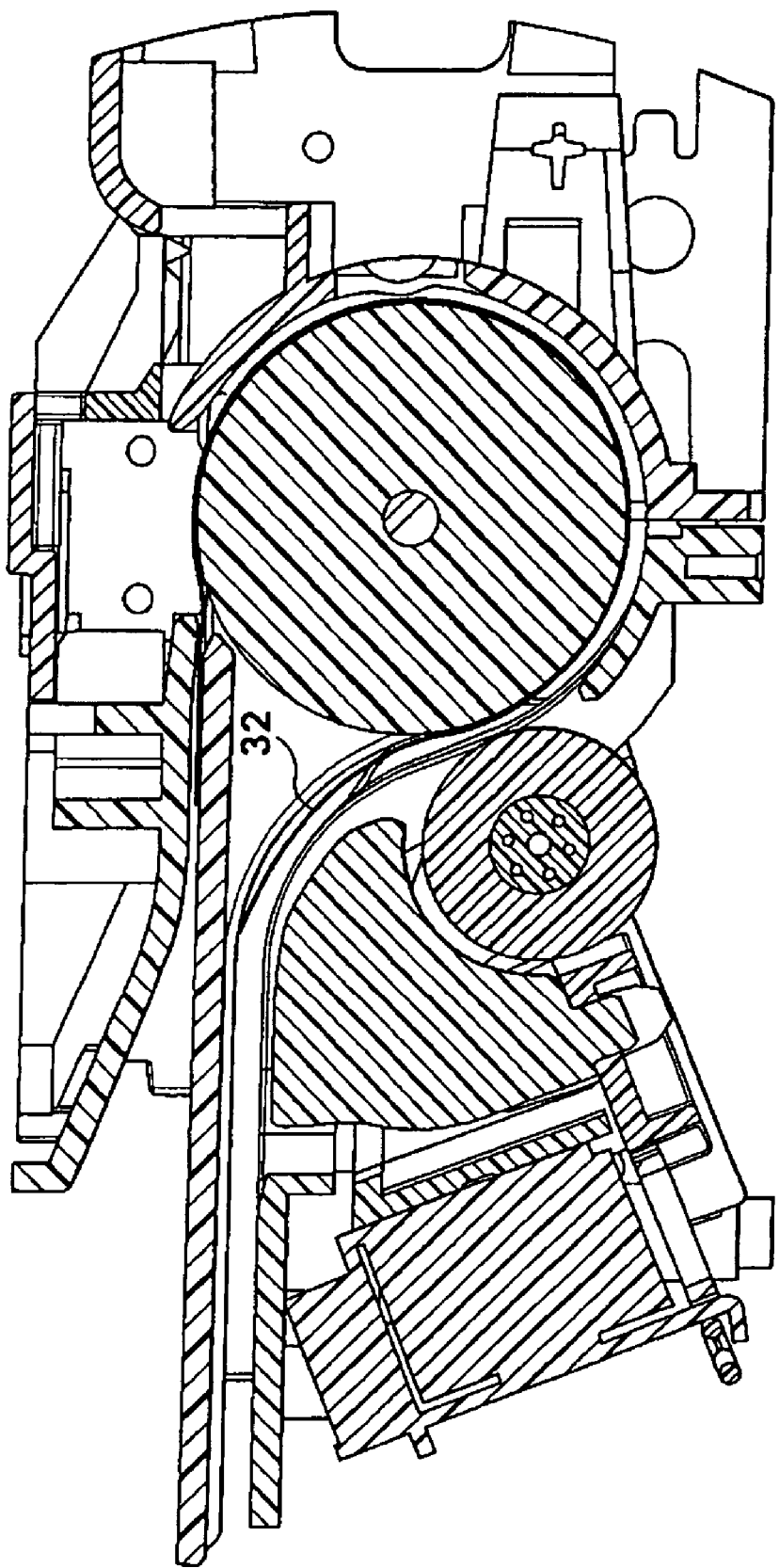
FIG. 11 is a cross-section taken along line A-A showing the document located adjacent to an unactuated stamping mechanism.
Figure 14:
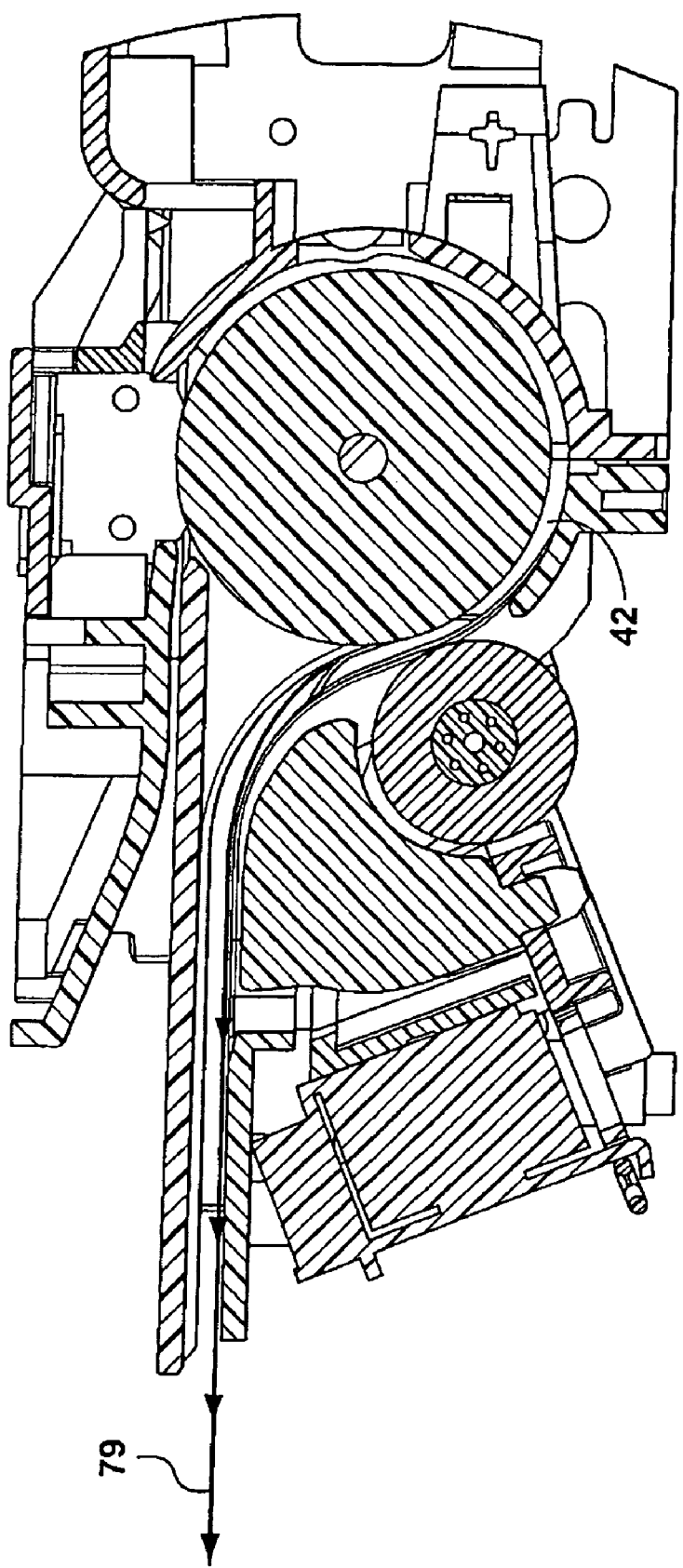
FIG. 14 is a cross-section taken along line A-A showing an acceptance path in the document path.
Figure 15:
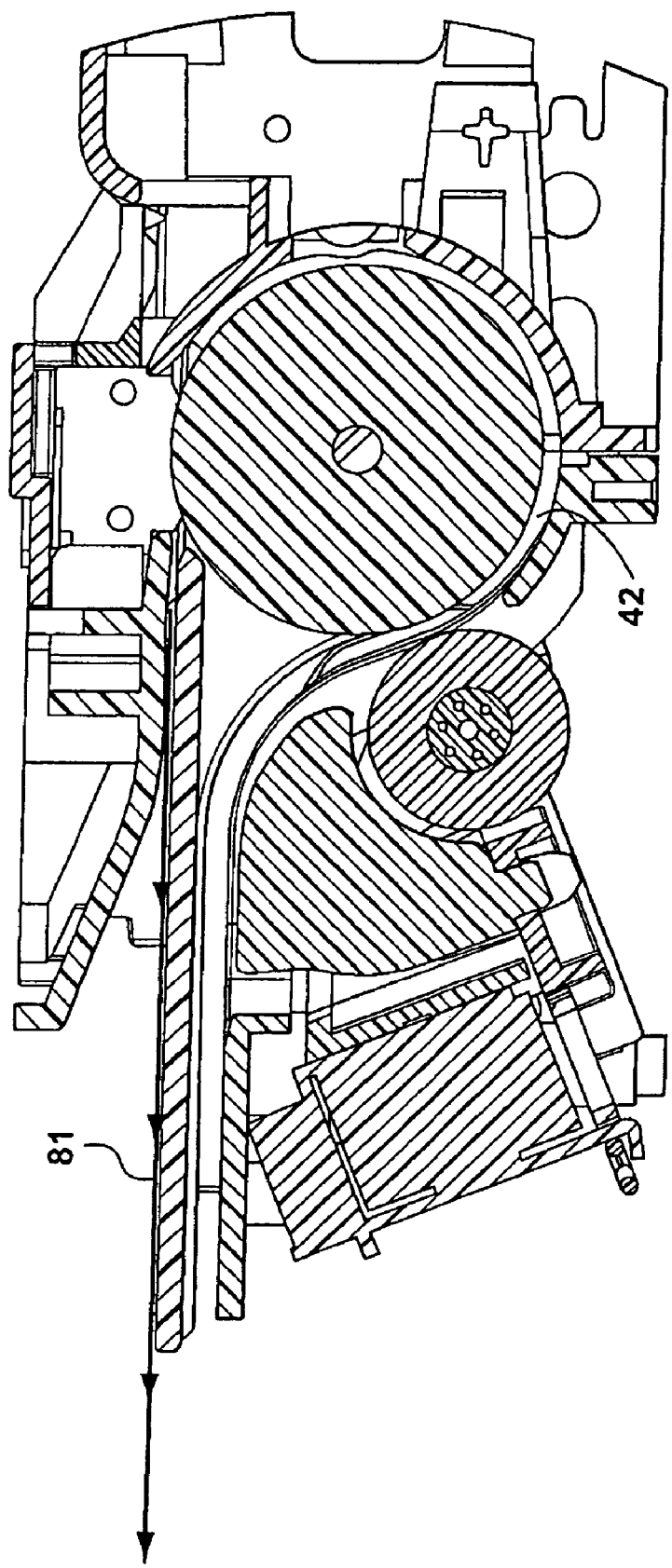
FIG. 15 is a cross-section taken along line A-A showing a rejection path in the document path.

In the preferred embodiment, the apparatus 30 includes communication means 70 for transmitting document data 56 obtained by the sensor 40 to a central data processor 72 (FIG. 3). The communication means 70 also transmits a transaction decision signal 74 from the central data processor 72 to a drive control means 76 controlling the drive mechanism 38. The data 56 from the document is analyzable by the central data processor 72 during an analysis time period. The transaction decision signal 74 is either an approved signal 78 or a rejected signal 80 (FIG. 3). The drive mechanism 38 is adapted to hold the document 32 stationary during the analysis time period (FIG. 11). After the analysis time period, upon the receipt by the drive control means 76 of the approved signal 78, the drive mechanism 38 moves the document 32 along an acceptance path 79 (FIG. 14) in the document path 42 to the exit position 46. Alternatively, upon the receipt by the drive control means 76 of the rejected signal 80, the drive mechanism 38 moves the document 32 along a rejected path 81 (FIG. 15) in the document path 42 to the home position 44.

Figure 8:
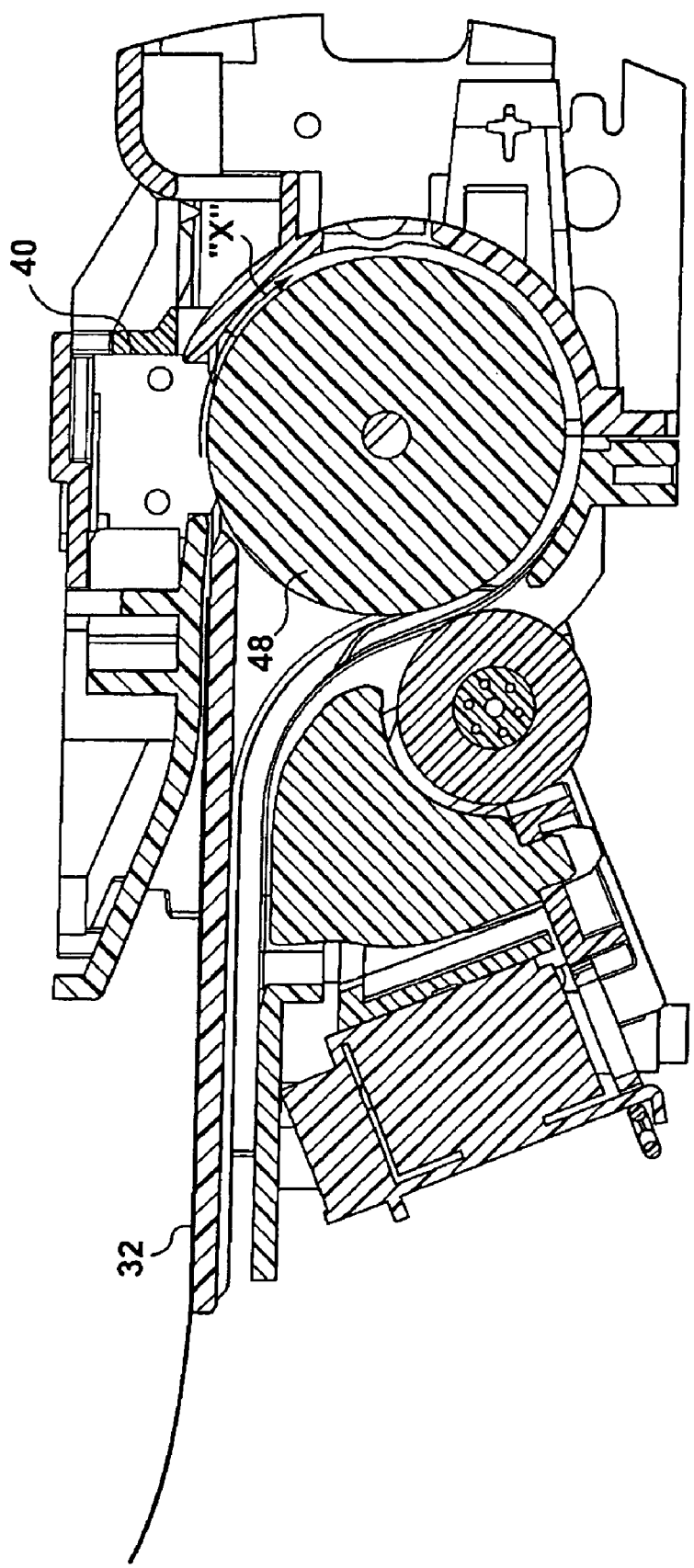
FIG. 8 is a cross-section taken along line A-A showing the document located at a home position in the document path.
Figure 9:
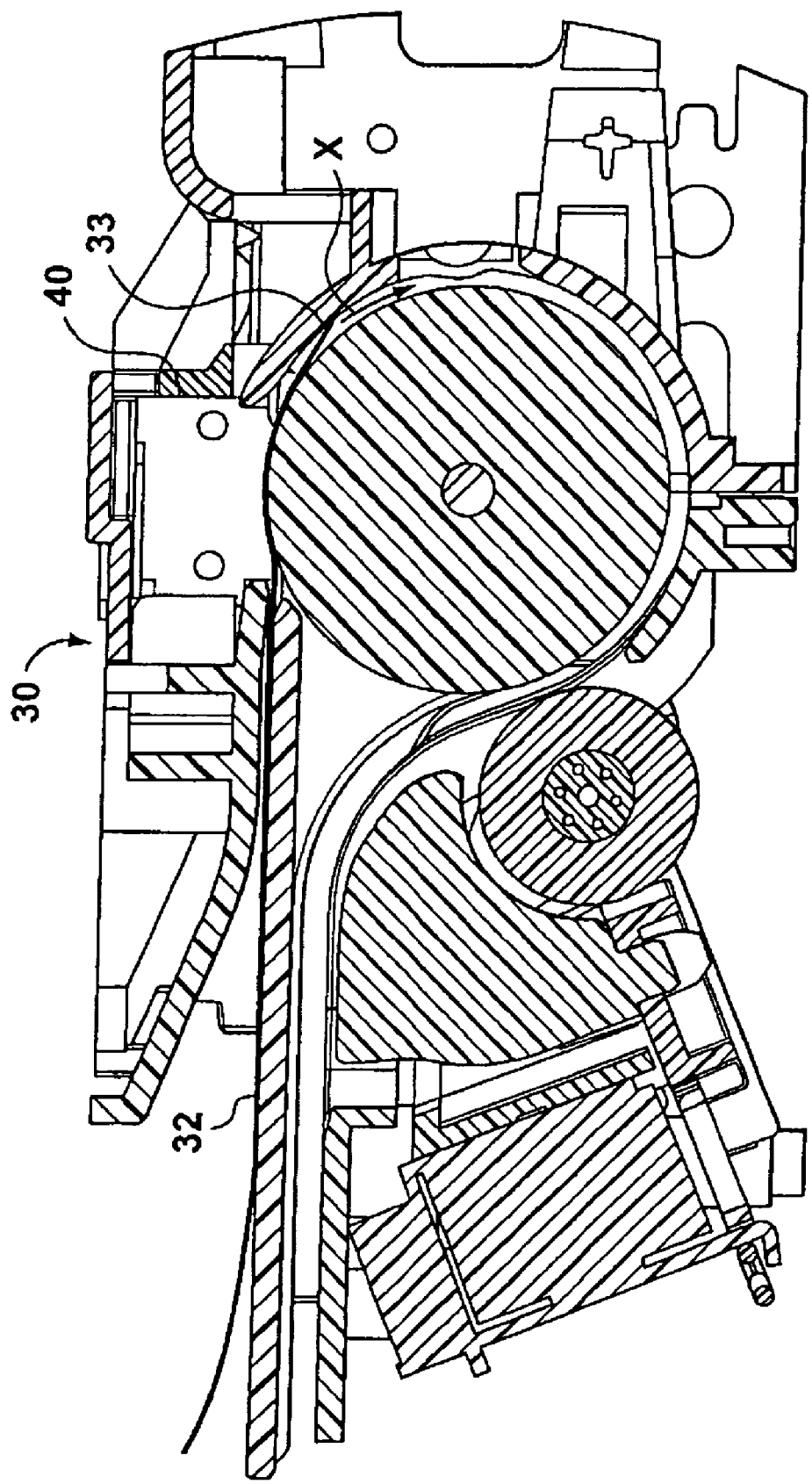
FIG. 9 is a cross-section taken along line A-A showing the document located adjacent to an image sensor.
Figure 10:
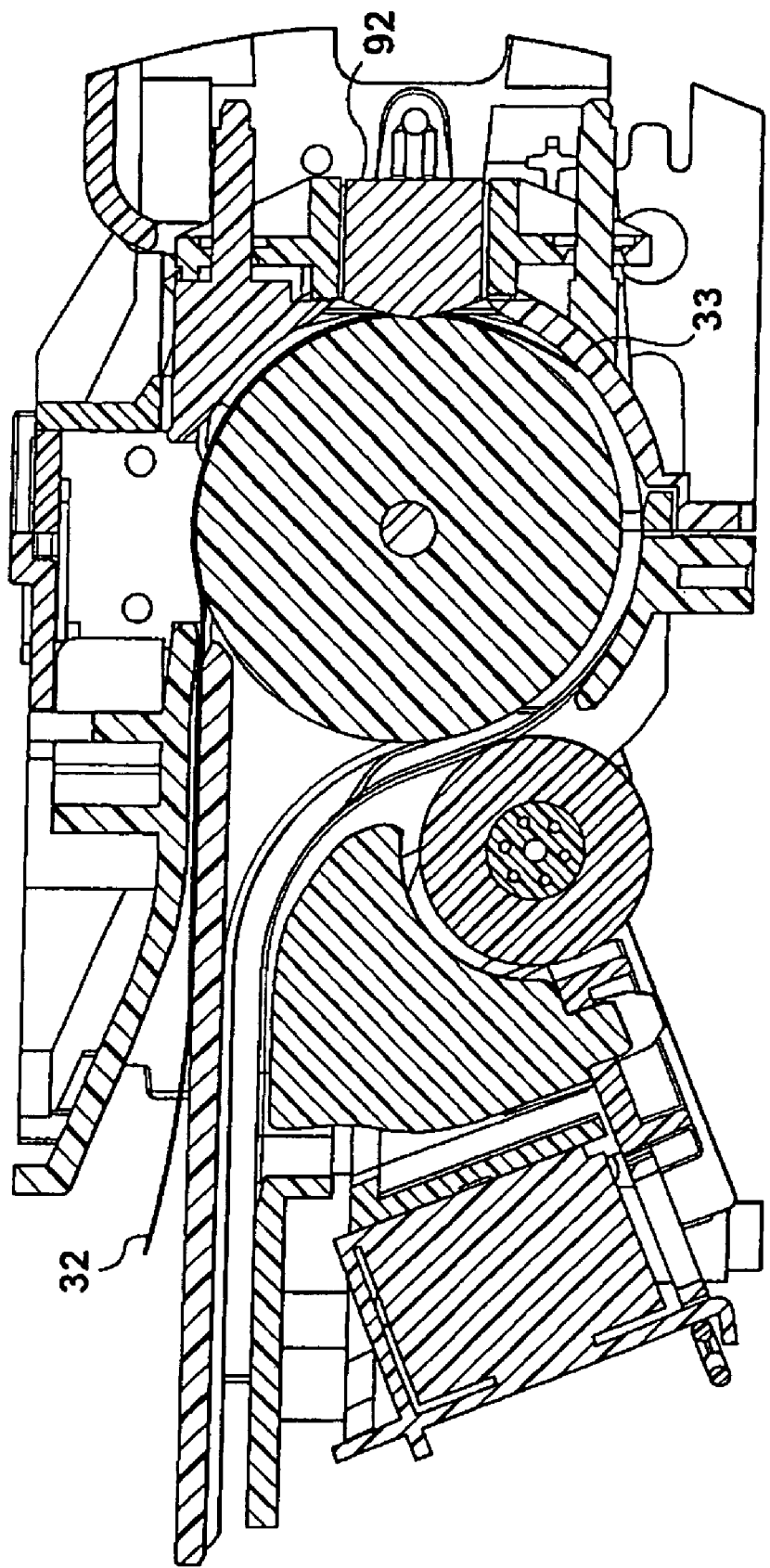
FIG. 10 is a cross-section taken along line B-B showing the document located adjacent to the MICR reader.
Figure 12:
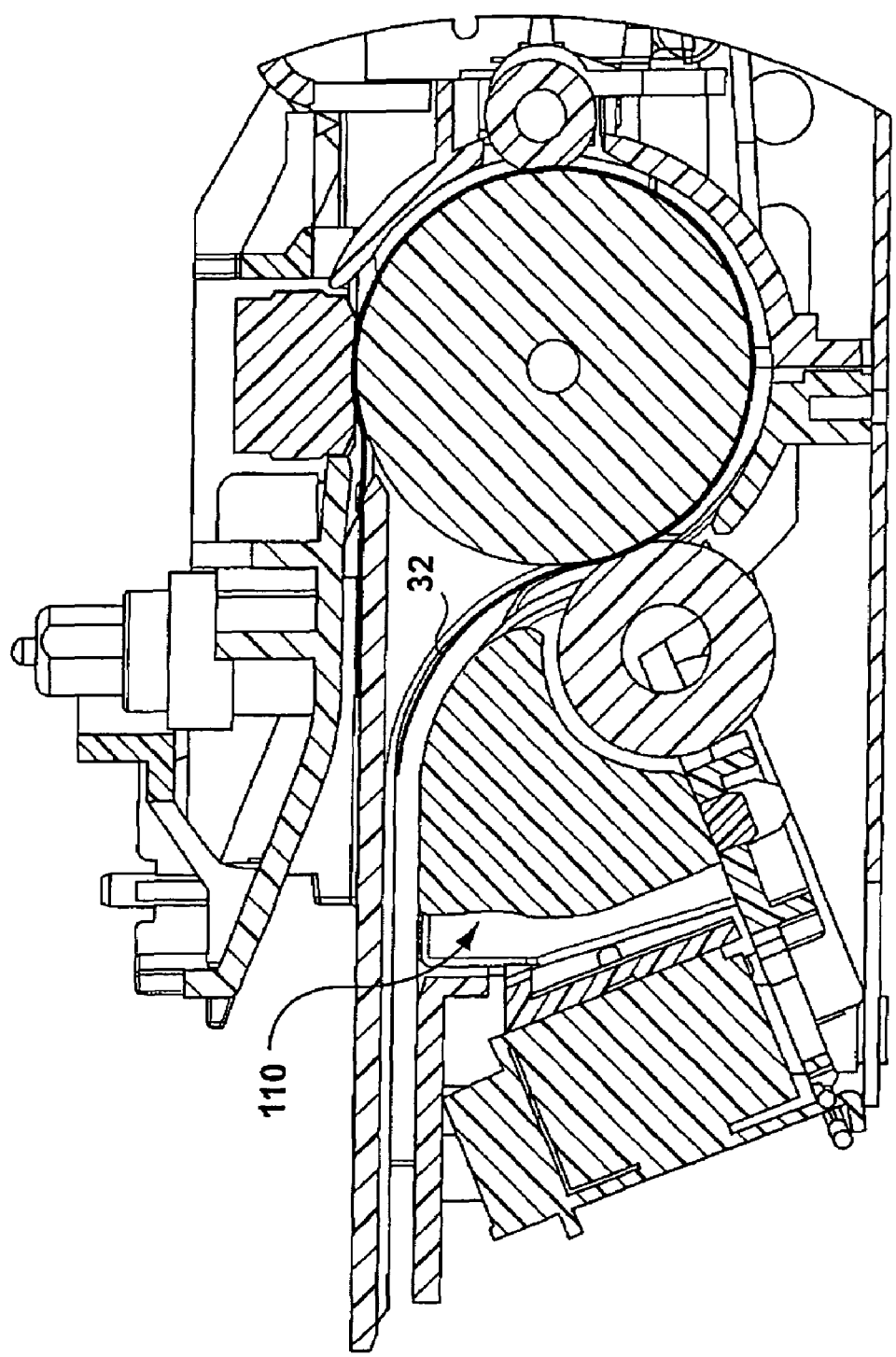
FIG. 12 is a cross-section taken along line A-A showing the document located adjacent to an actuated stamping mechanism.
Figure 13:
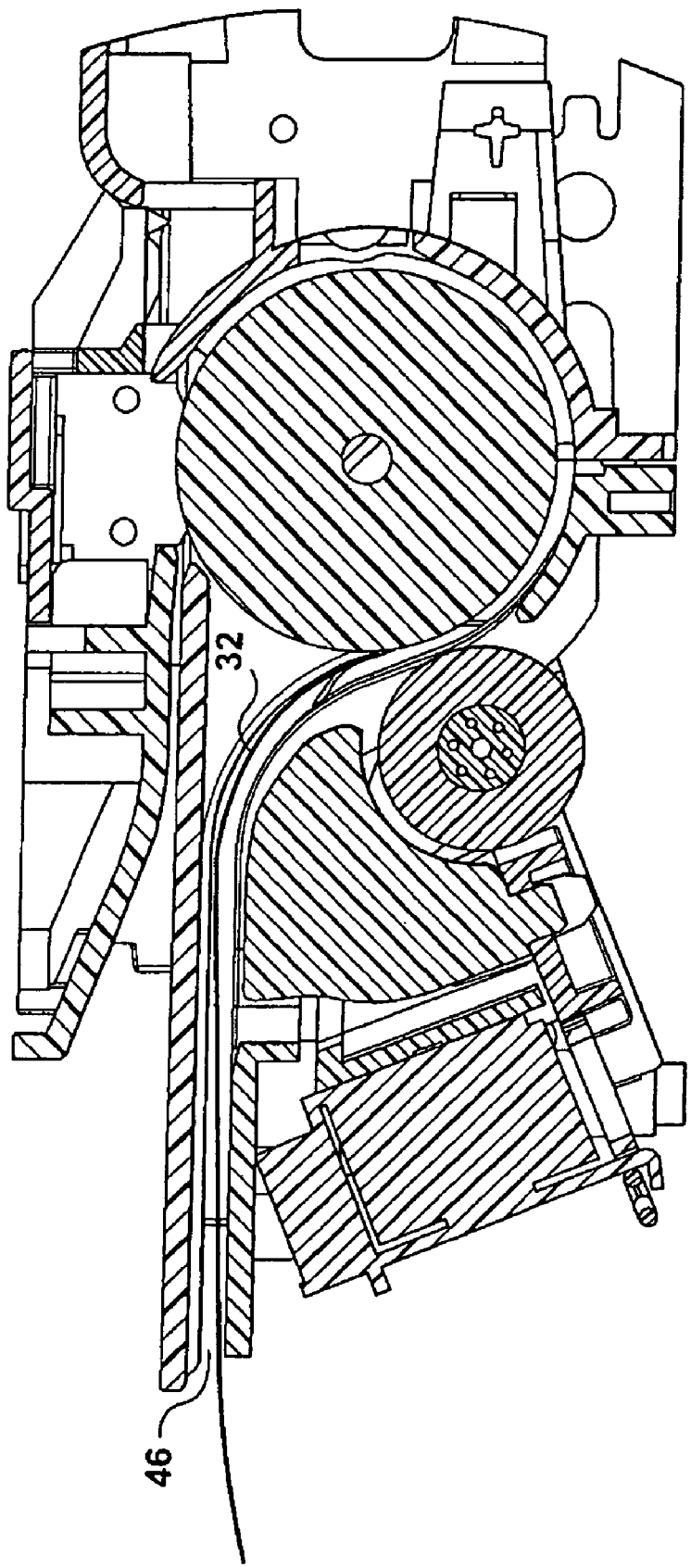
FIG. 13 is a cross-section taken along line A-A showing the document located in an exit position.
Figure 13A:
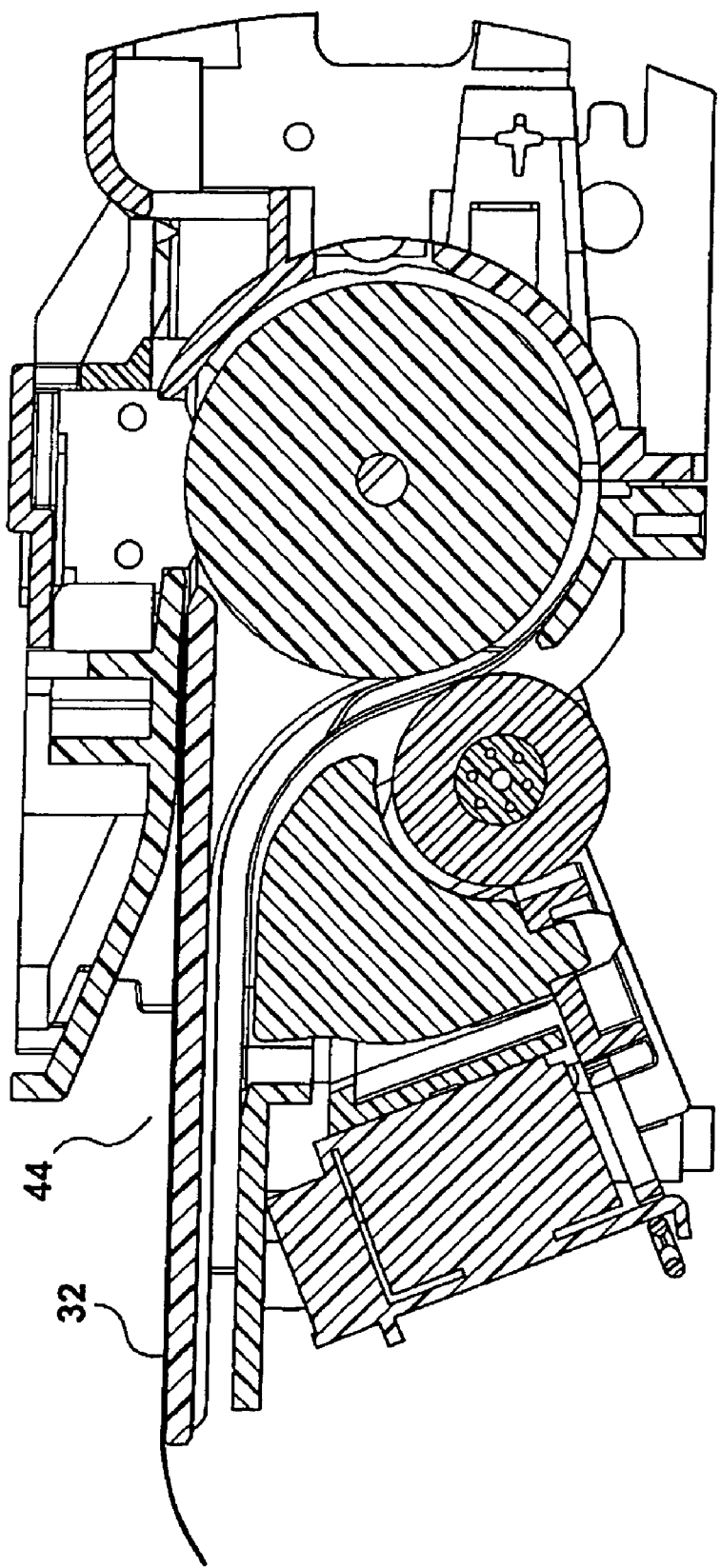
FIG. 13A is a cross-section taken along line A-A showing the document located in the home position.

Referring to FIG. 8, the document 32 is shown in the home position 44. In FIG. 9, the document 32 has been moved into the document path 42, so that a leading edge 33 has moved in an inward direction (shown by the arrow "X" in FIG. 9) and has moved past the sensor 40. In FIG. 10, the document 32 is shown as having moved further in the inward direction, so that the leading edge 33 is past a MICR reader 92. The document 32 is moved in the inward direction until the document 32 is in the position in the document path shown in FIG. 11. The document 32 is held stationary in the document path 42 as shown in FIG. 11 during the analysis time period. In FIG. 12, an approved signal 78 has been received, and the document 32 is to be moved along the accepted path 79. FIG. 13 shows the document 32 which has been moved along the accepted path 79 to the exit position 46. FIG. 13A shows a document moved along the rejected path 81 and located in the home position 44.

Preferably, the apparatus 30 also includes transaction data input means 82 for inputting transaction data 84 associated with the document data 56 into the apparatus 30. The communication means 70 transmits transaction data 84 and document data 56 to the central data processor 72. The central data processor 72 analyzes the transaction data 84 and the document data 56 and generates the transaction decision signal 74 resulting from the analysis. For example, and as will be described, the document 32 can be a check 86 (FIG. 28), and the document data 56 can be information identifying the bank account on which the check 86 is drawn. The central data processor 72 in this example would compare the amount of the transaction and the balance in the relevant bank account. The transaction decision signal 74 is an approved signal 78 if there are sufficient funds in the relevant bank account, and the transaction decision signal 74 is a rejected signal 80 if there are insufficient funds available in the relevant bank account.

In the preferred embodiment, the sensor 40 is an imaging sensor for obtaining an image 88 of the document 32. The sensor 40 could be any suitable sensor, such as, for example, a non-contact sensor, a reduction sensor, or a contact sensor. Preferably, the sensor 40 is a contact image sensor. It will be appreciated that the sensor 40 is capable of recognizing information from the document 32 so that certain data (for example, a customer account number on an invoice) can be extracted and used in the apparatus 30.

Figure 28:
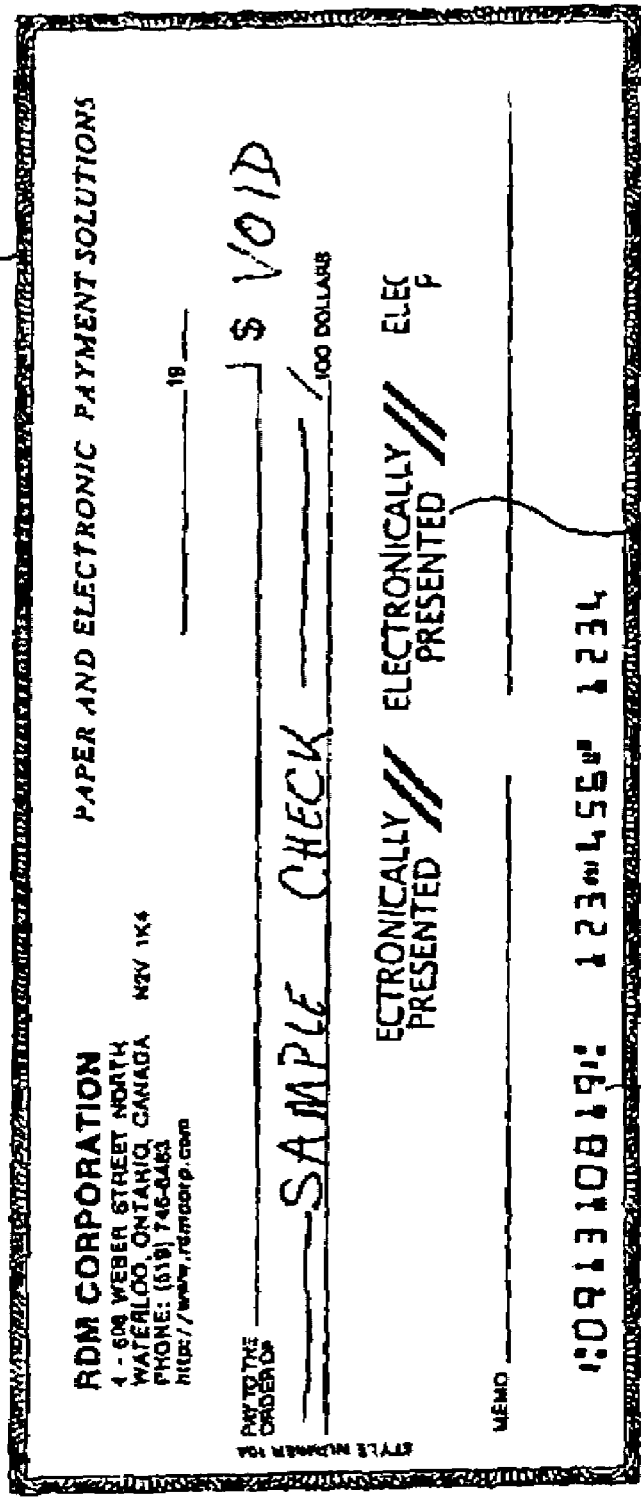
FIG. 28 is a sample of a document stamped by the stamp mechanism of the apparatus, drawn at a smaller scale.

Documents 32 such as checks 86 include magnetic ink character recognition (MICR) characters 90 (FIG. 28). The preferred embodiment of the apparatus 30 also includes the MICR reader 92 for reading MICR characters 90 on the document 32. The MICR reader 92 provides recognized MICR data 94 (FIG. 3) associated with the document 32. Preferably, the MICR reader 92 is positioned to read the MICR characters 90 on the document 32 when the document 32 is in the document path 42, as can be seen in FIG. 10.

It will be appreciated by those skilled in the art that MICR characters 90 can be recognized using other means. For example, the image sensor 40, using optical character recognition, could be used. The image data could be subjected to OCR algorithms, to result in recognized MICR data 94.

Figure 2B:
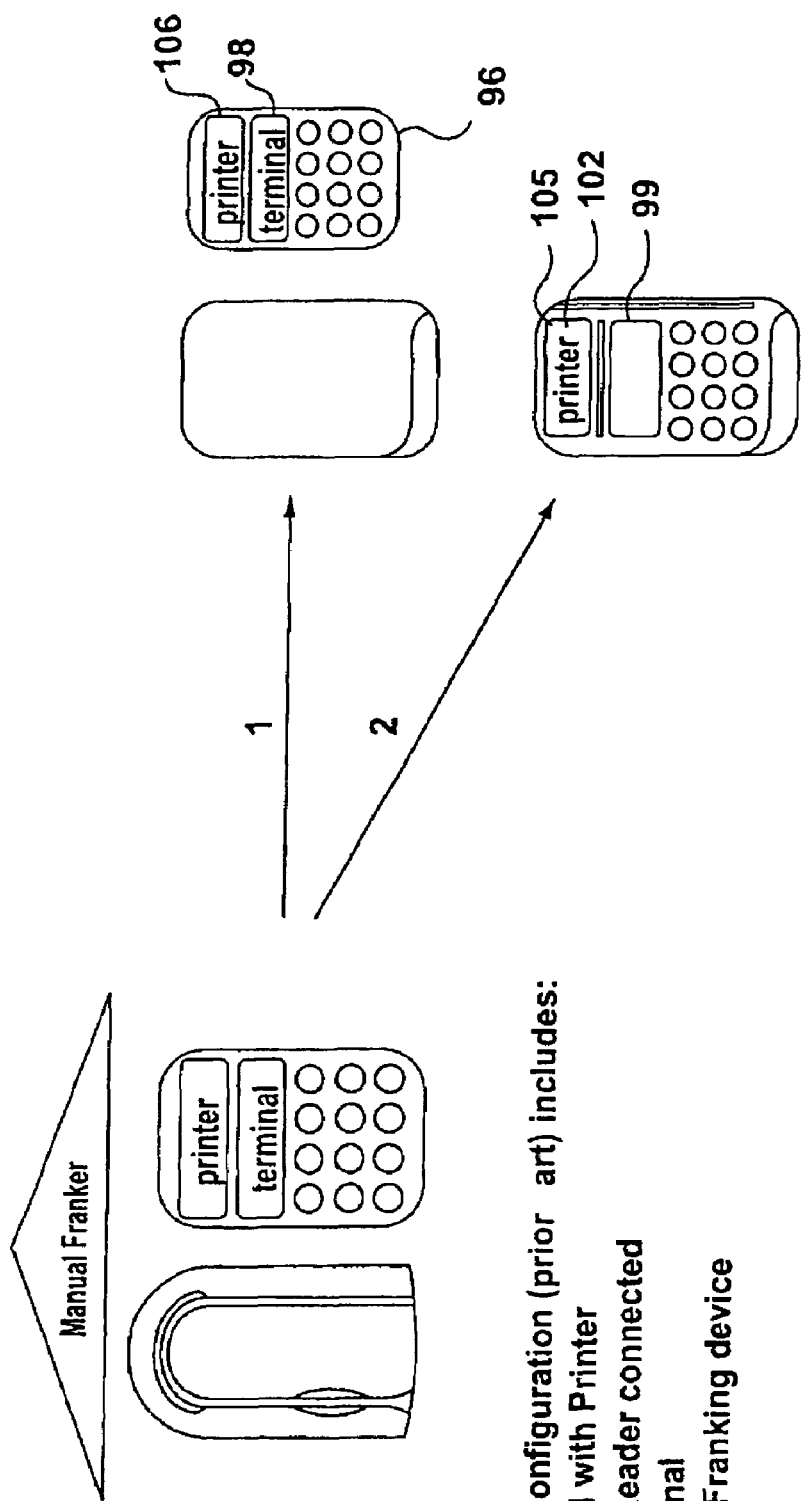
FIG. 2B is a schematic diagram representing a configuration including a prior art device and a variety of configurations including the apparatus of the invention.

As shown in FIG. 2A, the transaction data input means 82 could be an integrated keypad assembly 95, or a cash register or an external host 96 (FIGS. 2A, 2B) operably connected to the apparatus 30. Preferably, the apparatus includes the integrated keypad assembly 95, as shown in FIGS. 4 and 4A. It will be appreciated that the apparatus 30 could be used in a wide variety of configurations, as shown in FIGS. 2A and 2B.

It is also preferred that the apparatus 30 includes a display means 98, adapted to display at least part of the image 88. As shown schematically in FIG. 2A, the display means 98 could be an integrated display screen 99 or a display screen on a cash register or other terminal operably connected to the apparatus 30.

Figure 27:
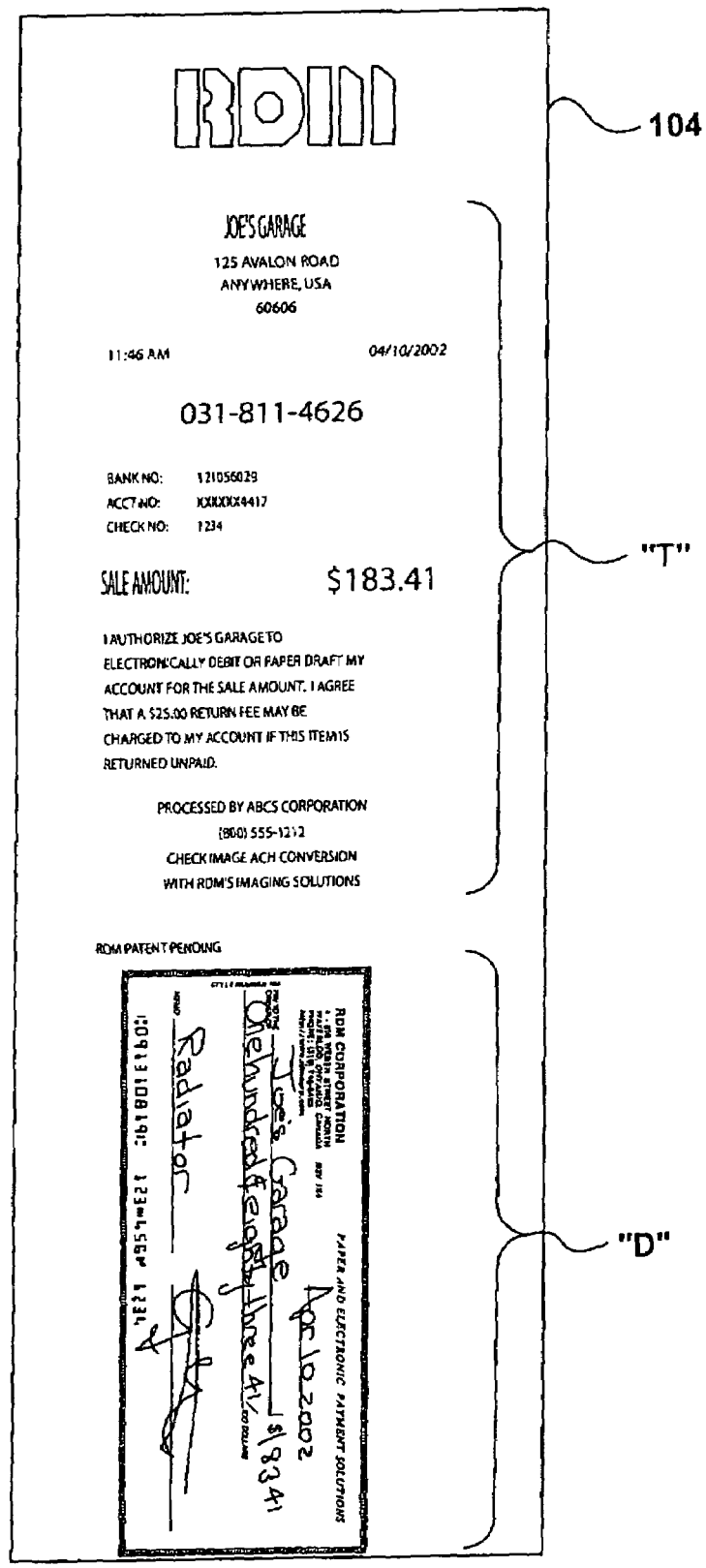
FIG. 27 is a sample of a receipt printed by a receipt printer of the apparatus including an image of the document, drawn at a larger scale.

Preferably, the apparatus 30 includes a printer 102 for printing a receipt 104 (FIG. 27). The printer 102 is adapted to print at least part of the document data 56 and at least a part of the transaction data 84 on the receipt 104. The part of the transaction data 84 which has been printed is designated as "T" in FIG. 27, and the part of the document data 56 printed on the receipt 104 is designated as "D" in FIG. 27). The printer 102 could be an integrated printer 105 or a remote printer 106 (FIGS. 2A, 2B).

In the preferred embodiment, the apparatus 30 includes an integrated display screen 99 and an integrated printer 105, so that they are located conveniently for a user (not shown).

The communication means 70 can be any suitable means for communication, including, for example, a direct wired connection to the central data processor 72, a wireless connection to the central data processor 72, or a public access network connected to the central data processor 72. Preferably, the communication means 70 is a modem.

The apparatus 30 can also include a magnetic stripe reader 108 (FIG. 3) adapted for obtaining information embedded in a magnetic stripe, for example, a magnetic stripe on a credit or debit card (not shown). The magnetic stripe information is communicated to the central data processor 72 with document data 56 for analysis.

In the preferred embodiment, the apparatus 30 also includes a stamping mechanism 110 for marking the document 32 after the approved signal 78 has been transmitted to the apparatus 30. Preferably, the stamping mechanism 110 is adapted to mark the document 32 as the document 32 is moved along the document path 42 towards the exit position 46 after the approved signal 78 has been received by the drive control means 76.

Figure 16:
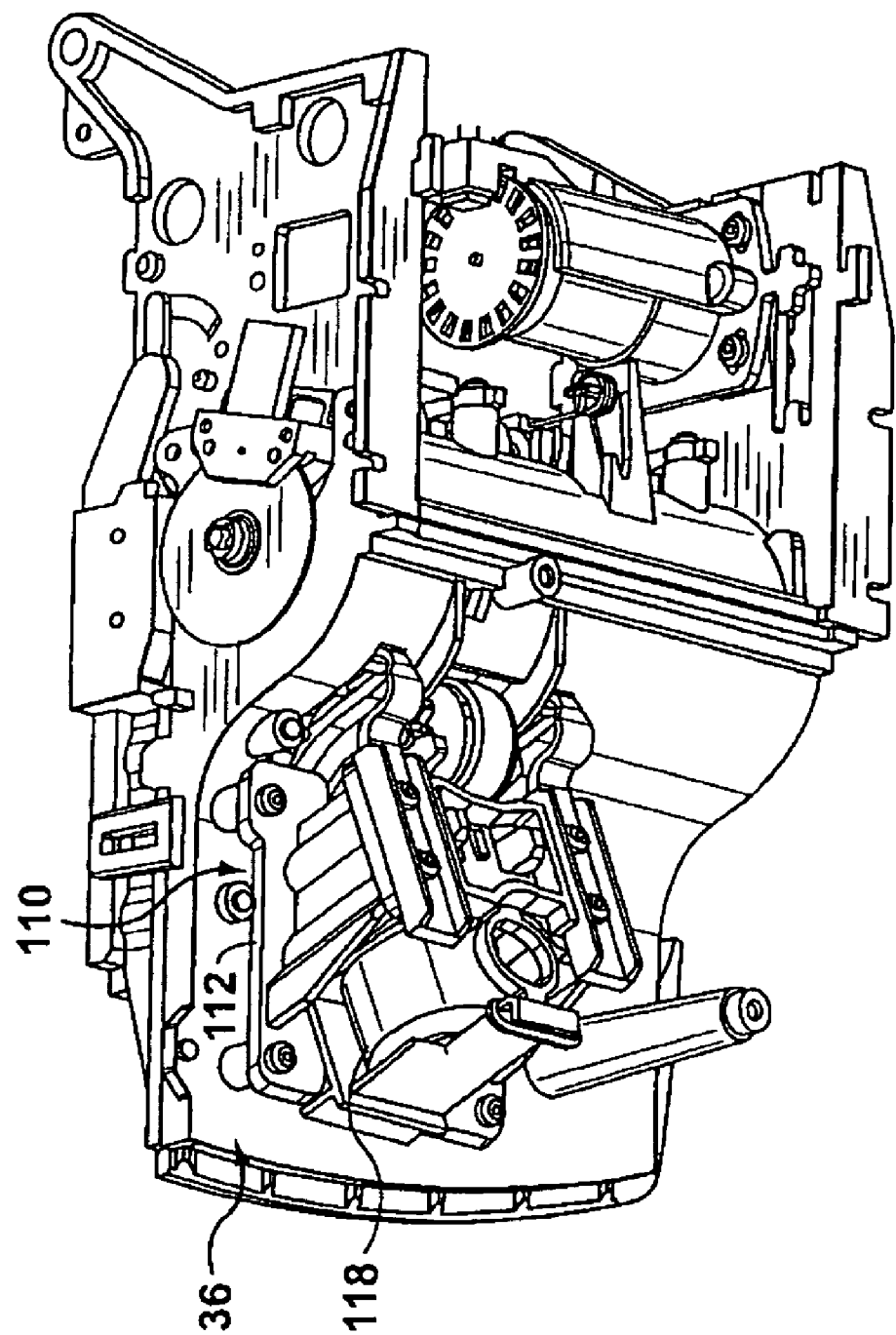
FIG. 16 is an isometric view from the bottom of a frame of the apparatus of FIG. 1.

As can be seen in FIGS. 16 and 23, the stamping mechanism 110 preferably includes a cartridge chassis 112 attached to the frame 36 and a cartridge 114 mounted in the cartridge chassis 112. The cartridge 114 includes a cartridge body 115 and a stamp portion 116. The stamping mechanism 110 also has an actuator 118 adapted to move the cartridge body 115 in the cartridge chassis 112 between an actuated state (FIG. 12), in which the stamp portion 116 is positioned to contact the document 32 and thereby to mark the document 32, and an unactuated state (FIG. 11), in which the stamp portion 116 is maintained spaced apart from the document 32. A mark 117 made by the stamping mechanism 110 is shown on a check 86 (FIG. 28).

Various types of actuators can be used. For example, a motor and a cam, an air pressure cylinder, or a hydraulic cylinder could be used. In the preferred embodiment, the actuator 118 is a solenoid.

Preferably, the cartridge body 115 is adapted for releasable attachment to the cartridge chassis 112, so that the cartridge 114 is relatively easy to remove and replace when the ink in the stamp portion 116 has been used up.

As can be seen in FIG. 25, the cartridge includes a wheel 120 adapted to be received and retained in the cartridge body 115, the wheel 120 being rotatable about a wheel axis 121 when positioned in the cartridge chassis 112. The stamp portion 116 also includes a stamp part 122 positionable on the wheel 120 which has a surface 123 adapted for marking a character on the document 32. The wheel 120 can comprise two cooperating parts, as shown in FIG. 25.

Preferably, the stamp part 123 is extruded high-density polyurethane foam, pre-inked with micro-pigmented ink, and thermally sealed on its outer diameter except for the printed character to be marked.

Figure 19:
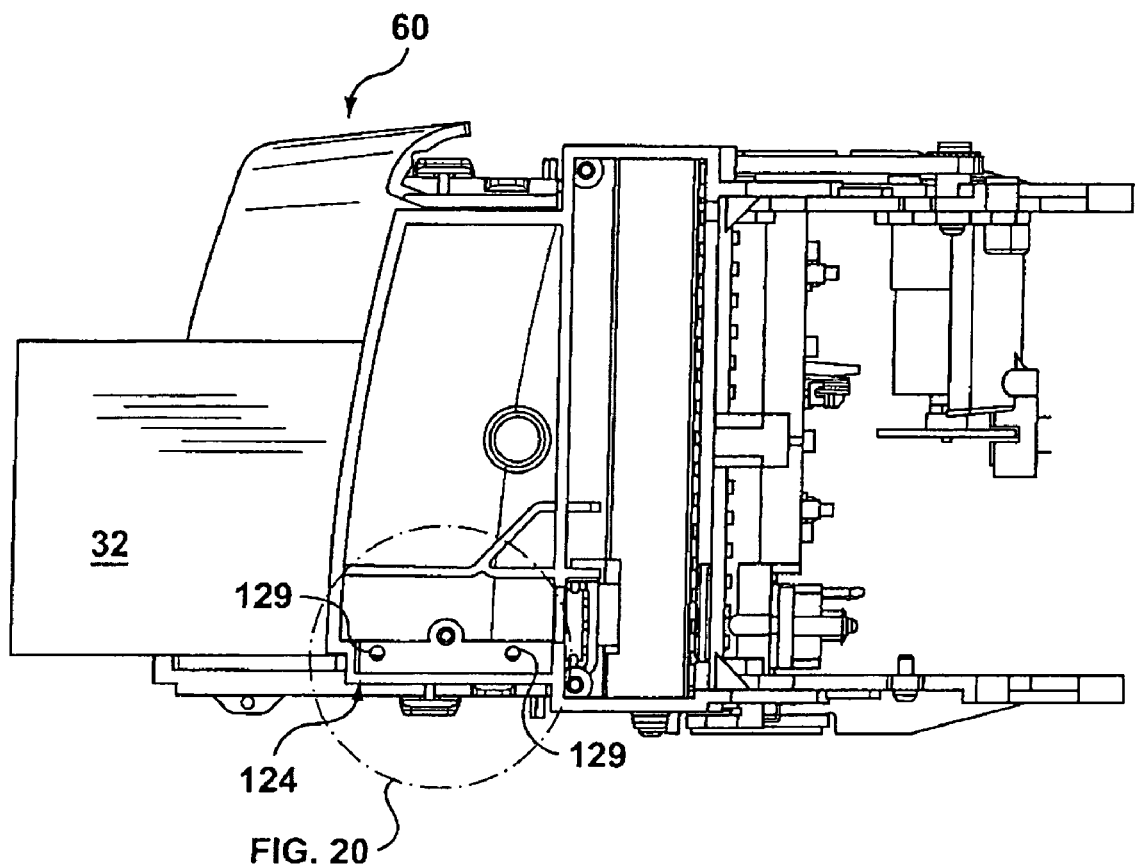
FIG. 19 is a partial top view of an input guide means mounted on the frame of FIG. 16 showing a document in position on the input guide means.
Figure 20:
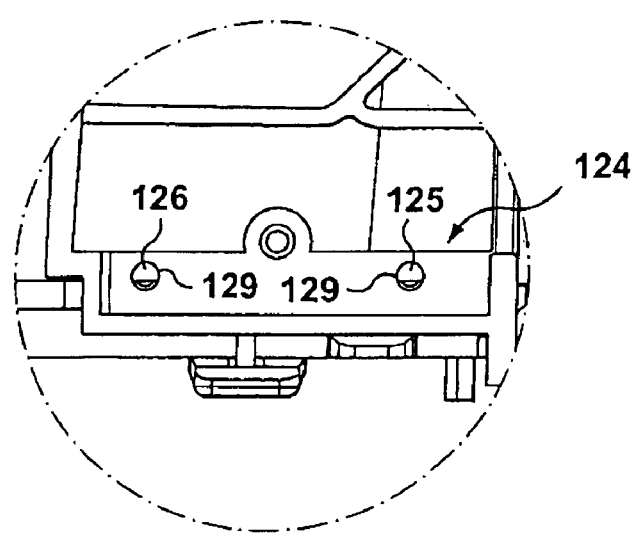
FIG. 20 is a top view of a portion of the input guide means of FIG. 19, drawn at a larger scale.

The preferred embodiment of the apparatus 30 also includes a document guide mechanism 124, as shown in FIGS. 19-21. The document guide mechanism 124 is located at the home position 44, for guiding the inserted document 32 into the document path 42. The document guide mechanism 124 is preferably positioned at an edge of the deck portion 60 to facilitate alignment of the document 32.

Figure 17:
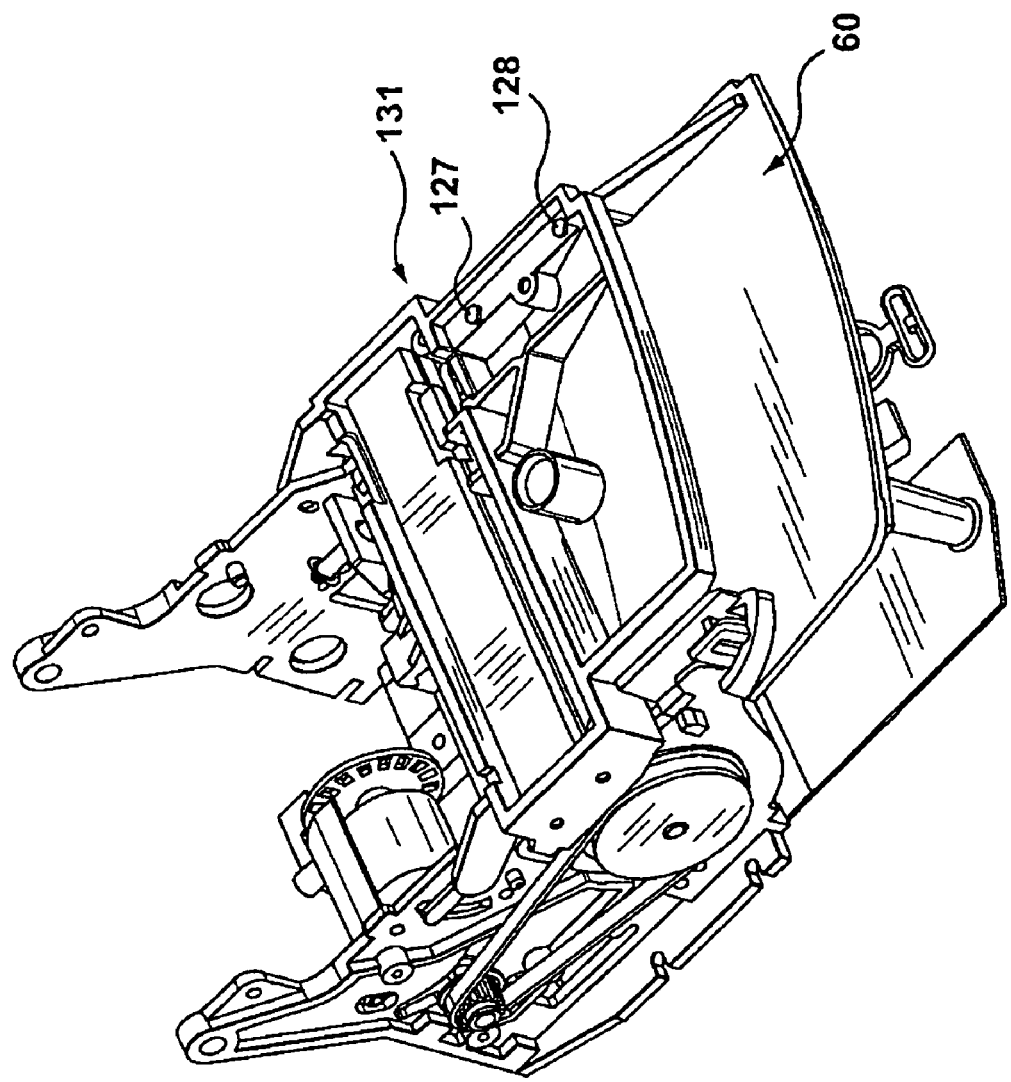
FIG. 17 is an isometric view of the frame of FIG. 16 from the front showing a contact image sensor housing mounted on the frame.
Figure 18:
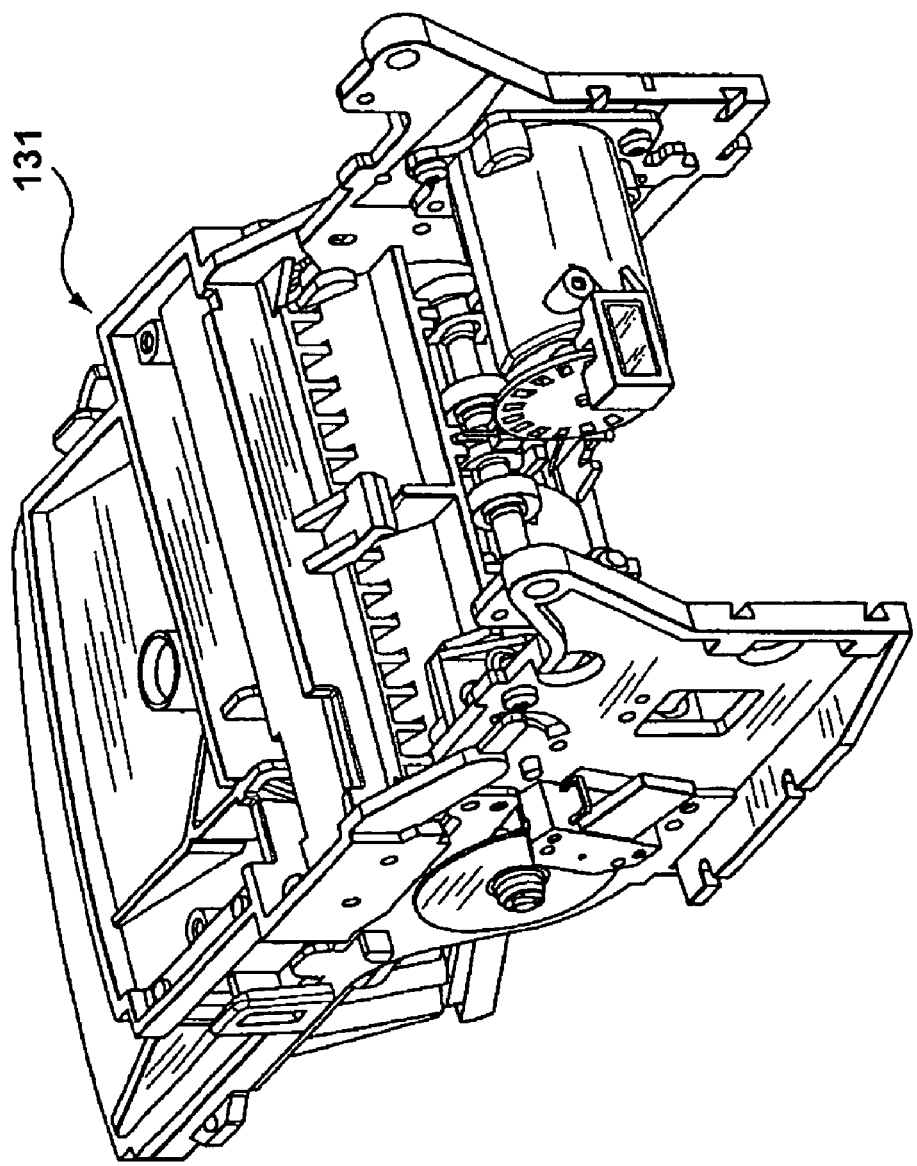
FIG. 18 is an isometric view of the frame of FIG. 16 from the back showing the contact image sensor housing.

The document guide mechanism 124 preferably includes the deck portion 60 and two light sources 125, 126. Each light source 125, 126 is positioned below the deck portion 60, and the light sources 125, 126 transmit two light beams substantially parallel to each other to create two predetermined paths of light. The light sources 125, 126 are positioned so that, when the document 32 is in the home position 44, the document 32 is located in the predetermined paths of light. The apparatus also includes two light receptors 127, 128 (FIG. 17) positioned above the light sources 125, 126 to receive the two beams of light when the document 32 is not in the home position. Preferably, the light sources 125, 126 are LEDs and the light receptors 127, 128 are photo diodes, as is known in the art. Holes 129 (FIGS. 19, 20) are provided to permit the beams of light to pass from the light sources 125, 126 to the light receptors 127, 128 which are not round in cross-section. As can be seen in FIG. 20, the holes 129 are configured to be approximately three quarters open, so that the document 32 will prevent light from the light sources 125, 126 from reaching the light receptors 127, 128 when the document 32 is in the home position. The holes 129 are located adjacent to a wall 131 in the deck portion 60.

Figure 20E:
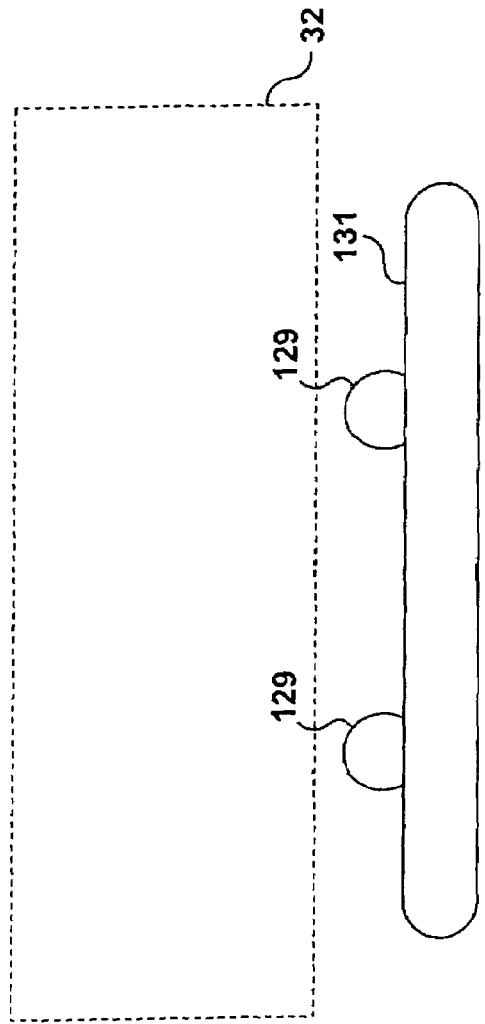
FIG. 20E is a schematic diagram representing the input guide means when the document is misaligned therein.
Figure 20F:
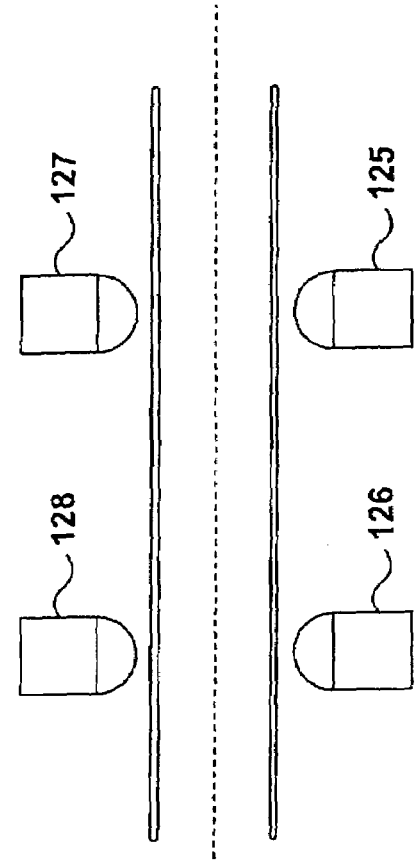
FIG. 20F is a schematic diagram representing the input guide means when the document is misaligned therein.

As can be seen in FIG. 20A, when the document 32 is abutting the wall 131, it covers the holes 129. The holes 129 are shown in FIG. 20A for convenience. The drive mechanism 38 is actuated when the document 32 is in the position shown in FIG. 20A, as indicated in FIG. 20B. In FIG. 20C, however, the document 32 is not abutting the wall 131, and light through the holes 129 is not blocked by the document 32. In this case, the drive mechanism 38 is not actuated, and the document 32 is not moved into the document path 42. Another example is shown in FIGS. 20E and 20F, in which the document 32 is aligned in the inward direction, but the document 32 is not abutting the wall 131. Once again, because the light through the holes 129 is not blocked by the document 32, the drive mechanism 38 is not actuated.

Preferably, upon the document 32 being placed in the home position 44, either a removal signal is generated or a drive mechanism actuation signal is generated. The removal signal is generated if the document 32 was rejected, and alerts the user that removal of the document 32 is required. The actuation signal is generated if the document 32 was not rejected, and actuates the drive mechanism 38.

The apparatus 30 also preferably includes a processor for controlling the apparatus 30 and associated basic memory, the integrated keypad 95 for inputting transaction data 84, and the display screen 99 for displaying document data 56.

It will be appreciated that the apparatus 30 can also include an internal database. In this embodiment, transaction data 84 is input into the internal database, as is document data 56. The document data 56 and the transaction data 84 preferably are transmitted to the central data processor 72. It is also possible, however, that the analysis of the document data 56 and the transaction data 84 could be done in a processor in the apparatus 30. In this embodiment, external data would preferably be uploaded into the internal database on a regular periodic basis.

Figure 15A:
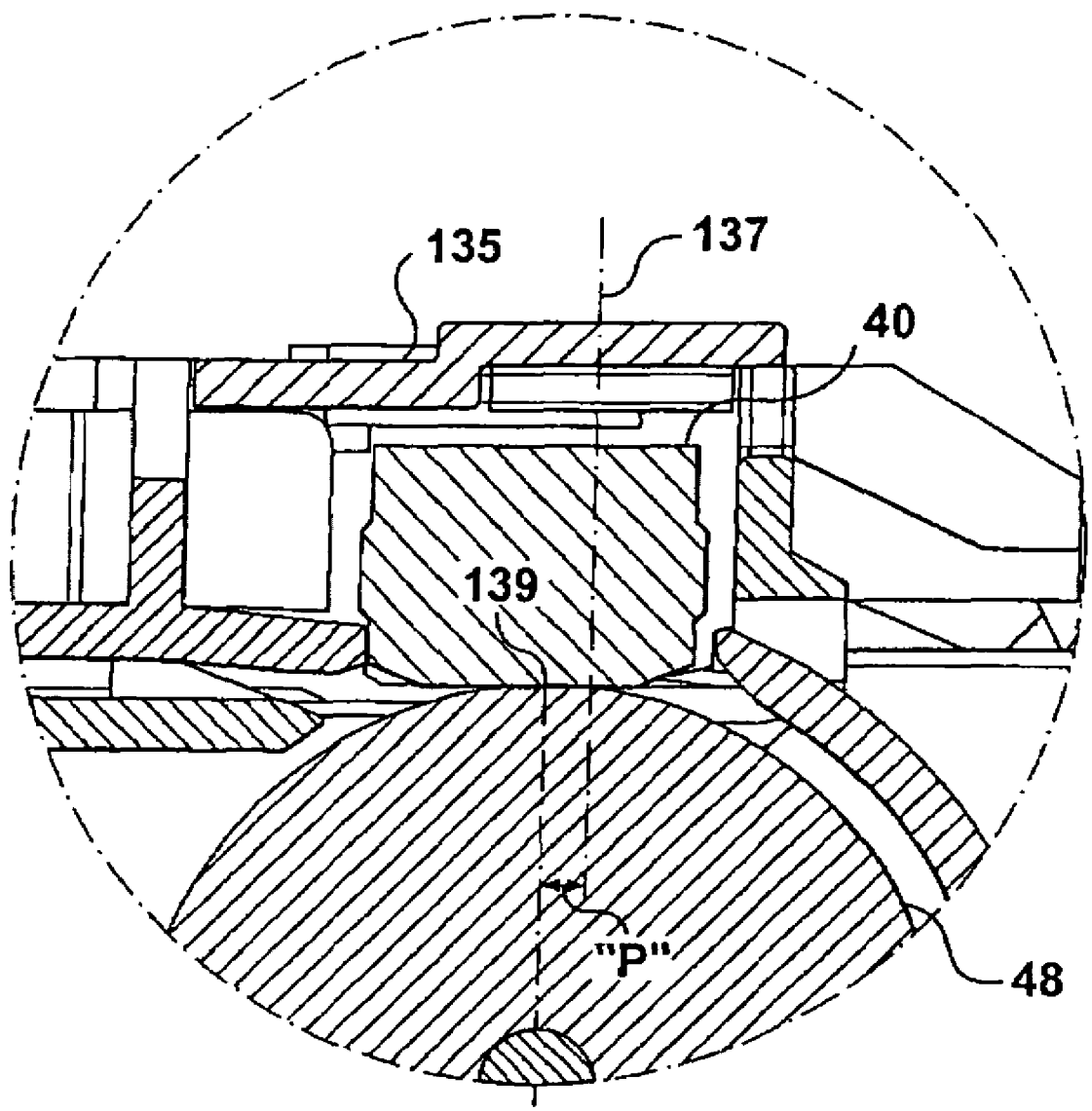
FIG. 15A is a cross-section of the apparatus of FIG. 15 taken at a larger scale showing the positioning of an image plane of the sensor relative to the roller.

Preferably, the sensor 40 is a contact image sensor secured in a contact image sensor housing 135 mounted in an imaging frame assembly 131 (FIG. 17) which is mounted to the frame 36. The contact image sensor 40 is adapted to obtain the image 88 of the document along an image plane 137 (FIG. 15A). As can be seen in FIGS. 8-15, 15A and 21A, the contact image sensor housing 135 is positioned to press the sensor 40 onto the document 32 against the roller surface 54 at a tangent point 139 at the top of the roller 48 along the width 34 of the document 32. The contact image sensor 40 is located so that the image plane 137 is positioned a predetermined distance ("P" in FIG. 15A) downstream in the inward direction of travel along the document path 42 from the tangent point 139. The inward direction is the direction of arrow "I" in FIG. 8.

Preferably, the predetermined distance ("P") is approximately 2 millimeters.

It is preferred that the imaging plane 137 be positioned downstream from the tangent point 139 because scratches on the glass of the contact image sensor 40 at the tangent point 139, and ink smearing on the glass at the tangent point 139, often impede the ability of the contact image sensor 40 to obtain image data 88. The contact image sensor 40 is positioned downstream of the tangent point 139 in order to ensure that the entire image 88 of the document 32 is captured. In contrast, in known devices, an image sensor is often positioned upstream of the tangent point to avoid the problems described above resulting from locating the sensor so that the image plane at the tangent point. However, the prior art devices are unsatisfactory because the upstream positioning results in the leading edge 33 of the document 32 (and information adjacent to the leading edge of the document) not being captured in known prior art devices.

Figure 26:
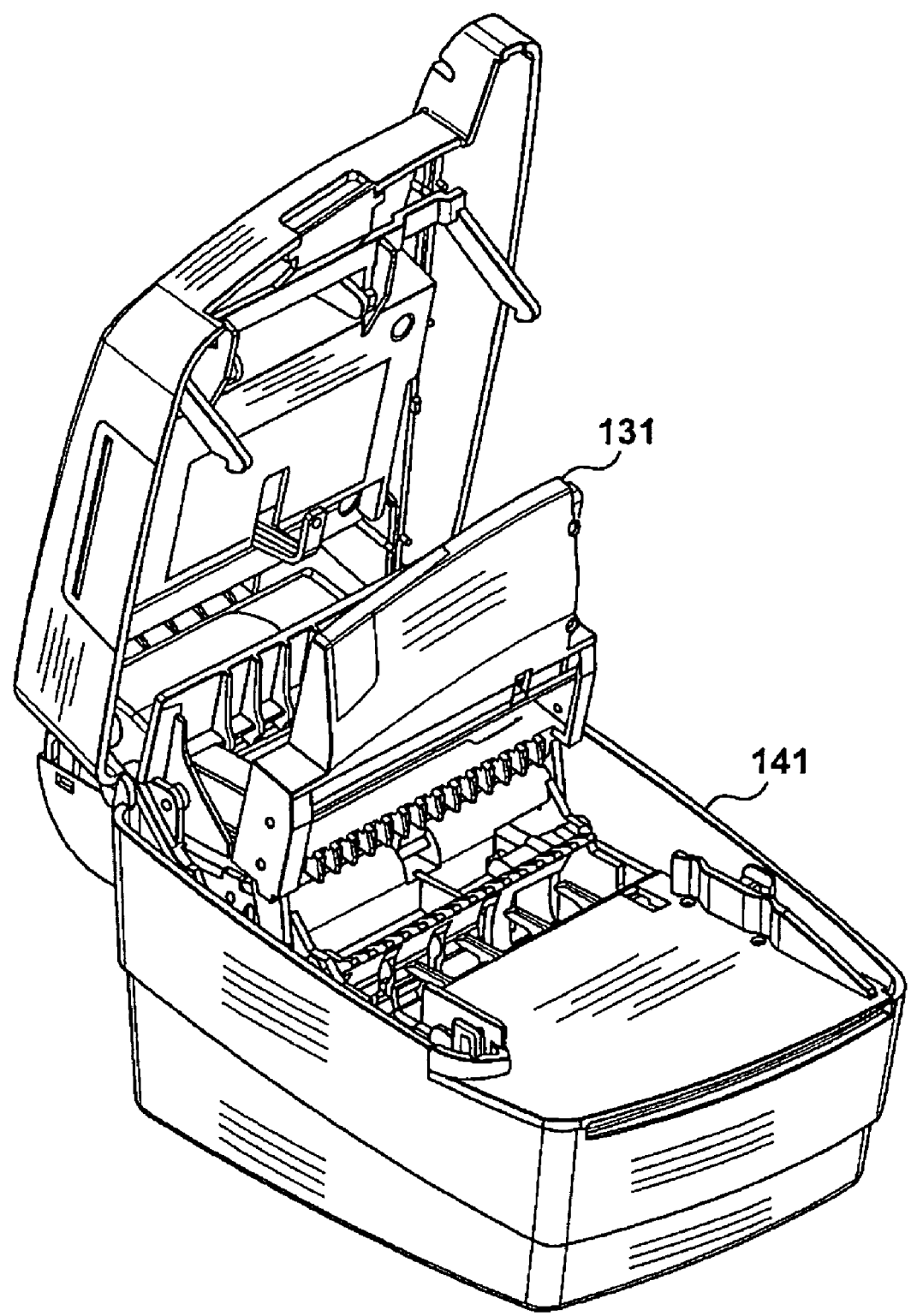
FIG. 26 is an isometric view of the apparatus of FIG. 3 with the cover portion in an open position.

The apparatus 30 is shown as including a body portion 141. Preferably, the integrated keypad assembly 95 and the display screen 99 are integral with the body portion 141. As can be seen in FIG. 26, the body portion 141 is preferably divided into two parts and can be opened to permit access to internal parts of the apparatus 30.

Figure 21A:
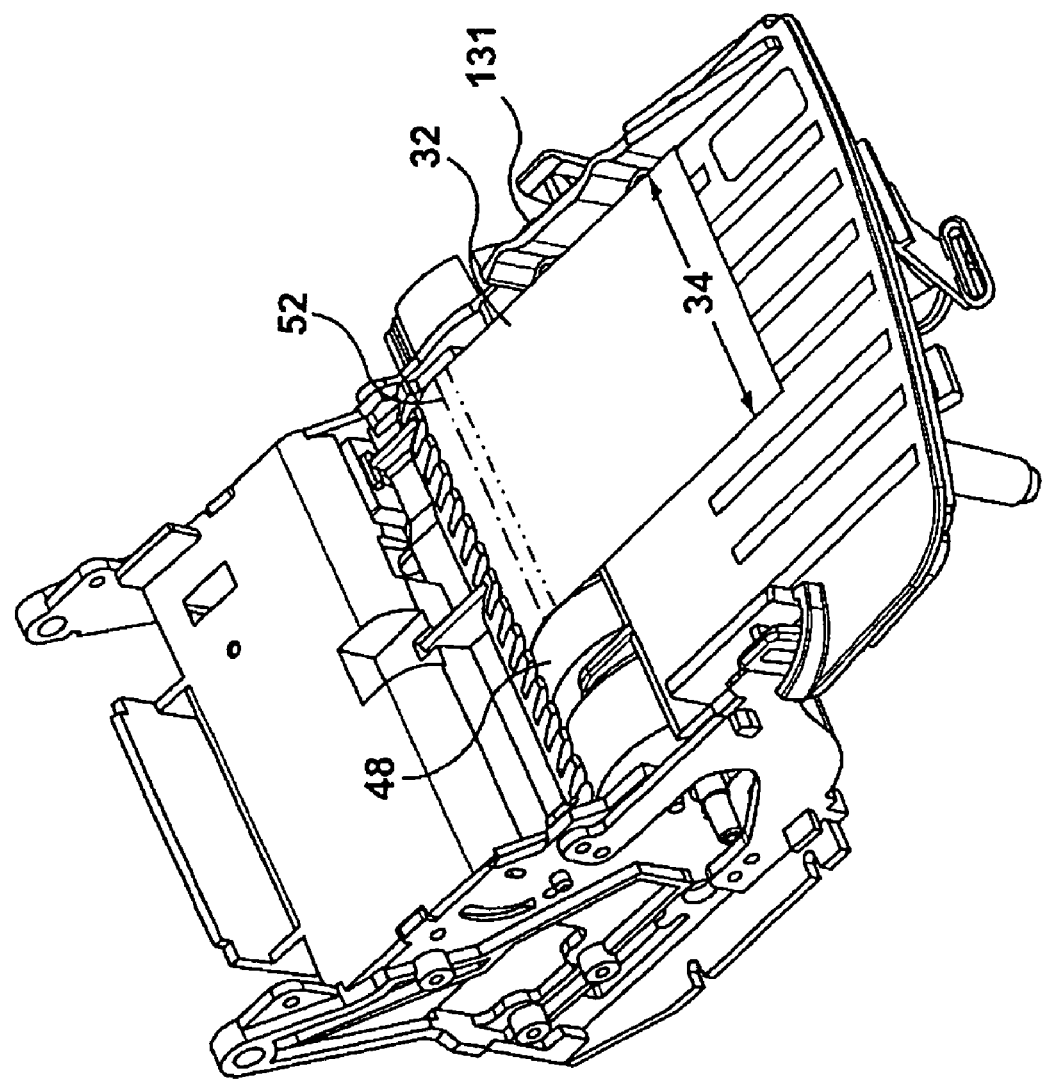
FIG. 21A is an isometric view of the frame of FIG. 21, drawn at a smaller scale, showing the document in the document path.

In use, the document 32 is located in the home position 44 using the document guide means 124 to align the document 32. The drive mechanism 38 is actuated, and the document 32 is engaged by the roller surface 54. The contact portion 52 of the document 32 is tightly compressed against the roller surface 54. As can be seen in FIG. 21A, the contact portion 52 extends along the entire width 34 of the document 32. This minimizes distortion and enables accurate data 56 to be obtained from the document 32. As can be seen in FIG. 15A, the imaging plane 137 is positioned very close to the tangent point 139, so that the image data 88 is obtained when the document 32 is virtually normal to the imaging plane 137. Furthermore, it will be appreciated that the image data 88 is obtained from the document 32 along the image plane 137 across the entire width 34 of the document 32.

Similarly, the MICR reader 92 is normal to the document 32 when the MICR reader 92 obtains the MICR data 94. The idler 67 is positioned adjacent to the MICR reader 92, and the document 32 is pressed tightly against the roller surface 54 when the MICR data 94 is obtained by the MICR reader 92.

It will be appreciated that, in comparison to known devices, the use of a single roller 48 has a number of advantages. First, due to the use of the single roller 48 and the slots 58 and the fingers 62 cooperating therewith, misfeeds and jamming of the document 32 is less likely to occur than would be the case if more than one roller were used. Second, because a single roller 48 is used, the image data 88 and the MICR data 94 are synchronized. The image data and MICR data and also transaction in known devices employing more than one roller, can sometimes be provided in an unsynchronized fashion.

Also, and as noted above, the apparatus 30 is relatively simple because it has one roller, and reliably provides image data 88 with minimal distortion because the data is taken at, or close to, the contact portion 52, i.e., off the roller 48 when the document 32 is pressed tight against the roller surface. Distortion is limited because the data is taken essentially normal to the document 32.

In addition to the foregoing advantages, the apparatus 30 has the advantage that the footprint of the apparatus 30 tends to be smaller than that of known devices, because the document 32 is wrapped around the roller 48 along the document width 34. Also, the apparatus 30 has a smaller footprint because only one roller 48 is used.

In addition, where a customer (not shown) presents the document 32, the apparatus 30 conveniently returns the document 32 to the customer. It will be appreciated that the document 32, if approved, is moved in the document path 42 along the approved path 79, ultimately to be positioned in the exit position 46. In contrast, if the document 32 is rejected, it is moved along the rejection path 81 to the home position 44. The two alternate paths 79, 81 along which the document 32 is moved once a transaction decision signal 74 has been provided enable the user and the customer to readily determine whether the document was approved or rejected.

Figure 1:
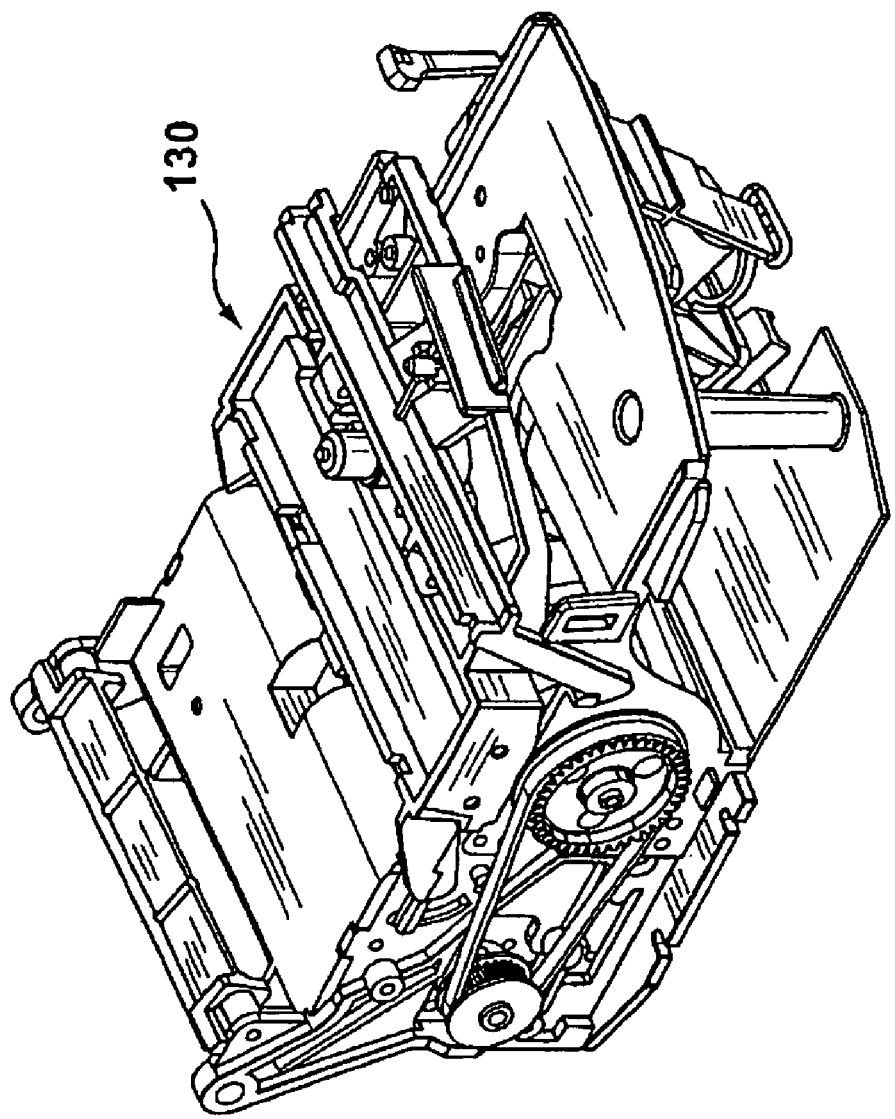
FIG. 1 is an isometric view of a preferred embodiment of the data-obtaining apparatus of the invention.
Figure 1A:
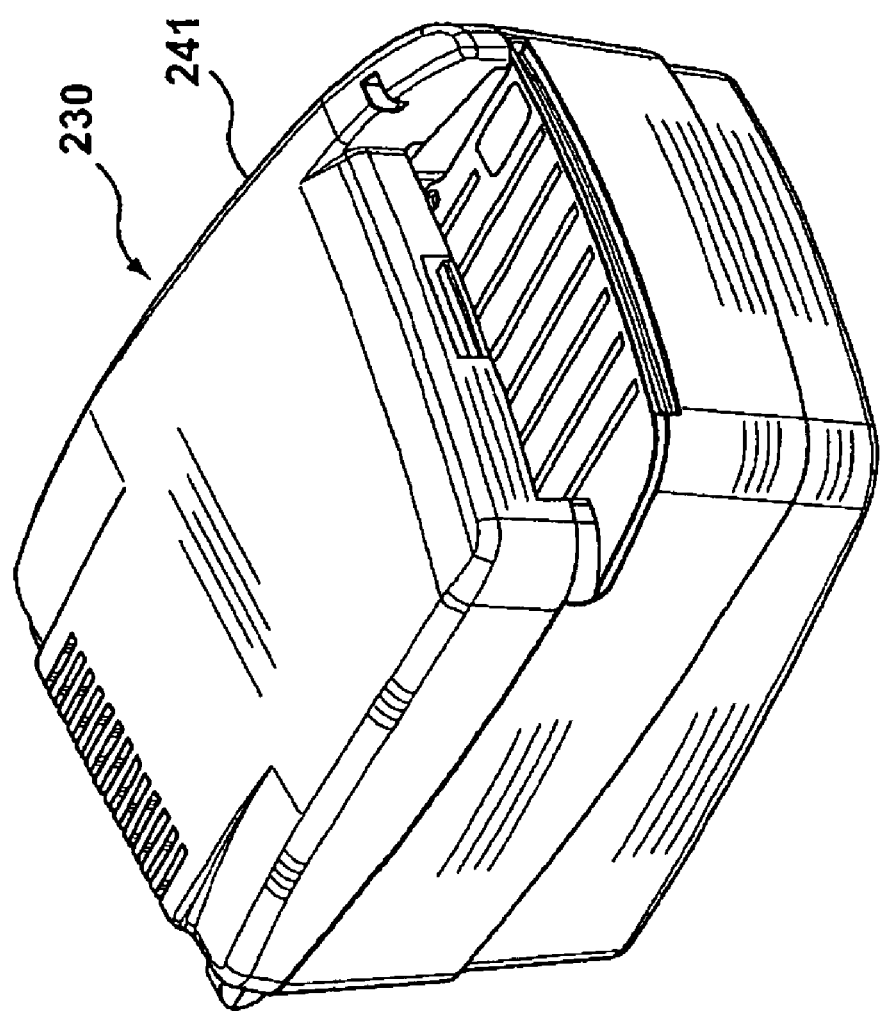
FIG. 1A is an isometric view of another embodiment of the data-obtaining apparatus of the invention including a cover in a closed position.
Figure 1B:
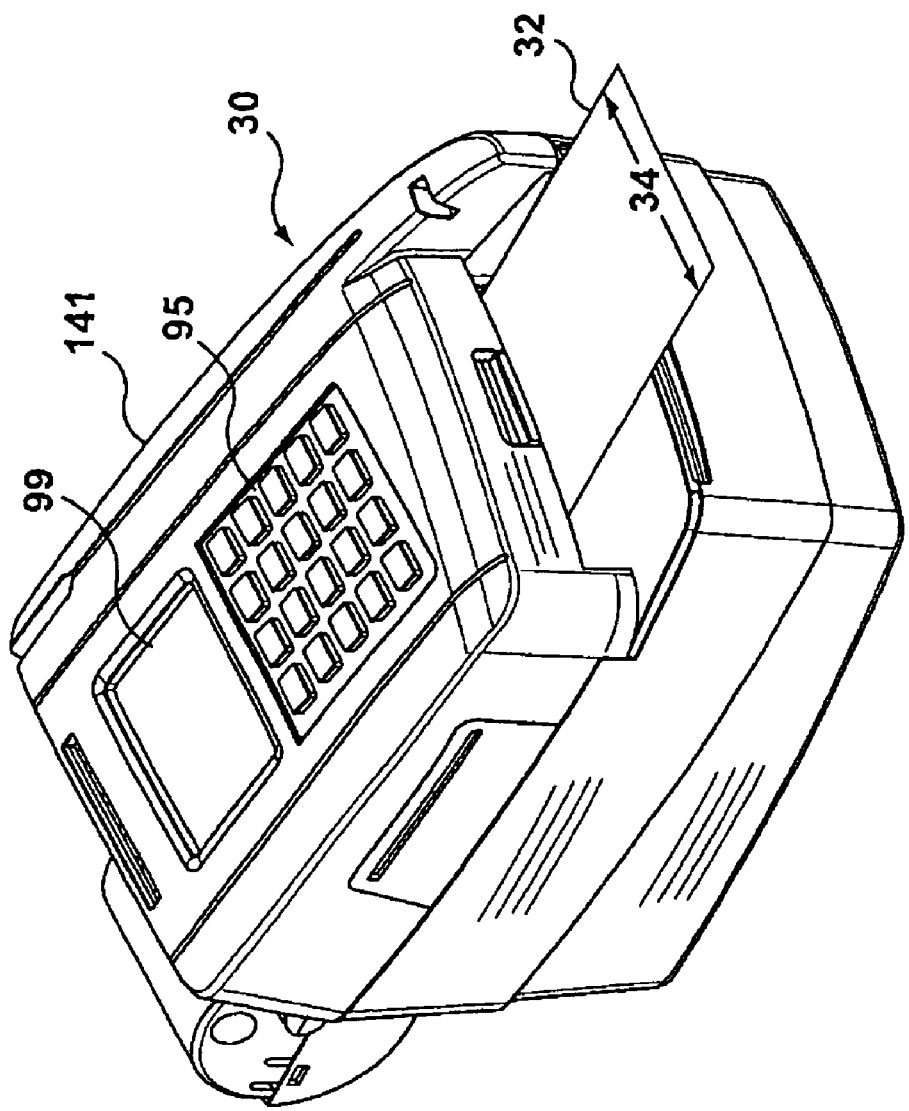
FIG. 1B is an isometric view of another embodiment of the data-obtaining apparatus of the invention including a cover, a keypad assembly, and a display screen, the cover being in a closed position, with a document inserted in the apparatus.

Additional embodiments 130, 230 of the invention are shown in FIGS. 1 and 1A respectively. In FIGS. 1 and 1A, elements are numbered so as to correspond to like elements shown in the other drawings herein.

The apparatus 130 is shown in FIG. 1 without a body portion. It will be appreciated that various forms of body portions could be used with the apparatus 130.

The alternative embodiment 230 is shown in FIG. 1A as having a body portion 241 which does not include the integrated keypad assembly 95 or the display screen 99.

An additional embodiment 330 of the apparatus of the invention is shown or schematically illustrated in FIGS. 29-41. In FIGS. 29-41, elements are numbered so as to correspond to like elements shown in the other drawings herein.

Figure 29:
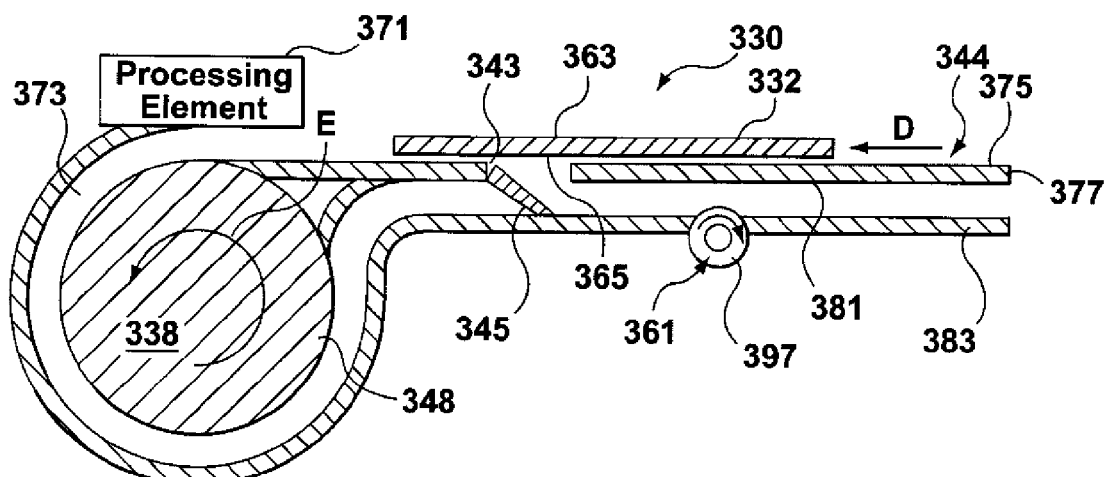
FIG. 29 is a schematic illustration of an alternative embodiment of the apparatus of the invention showing a document with a first face thereof facing upwardly in a first document path, adjacent to a front end thereof.
Figure 30:
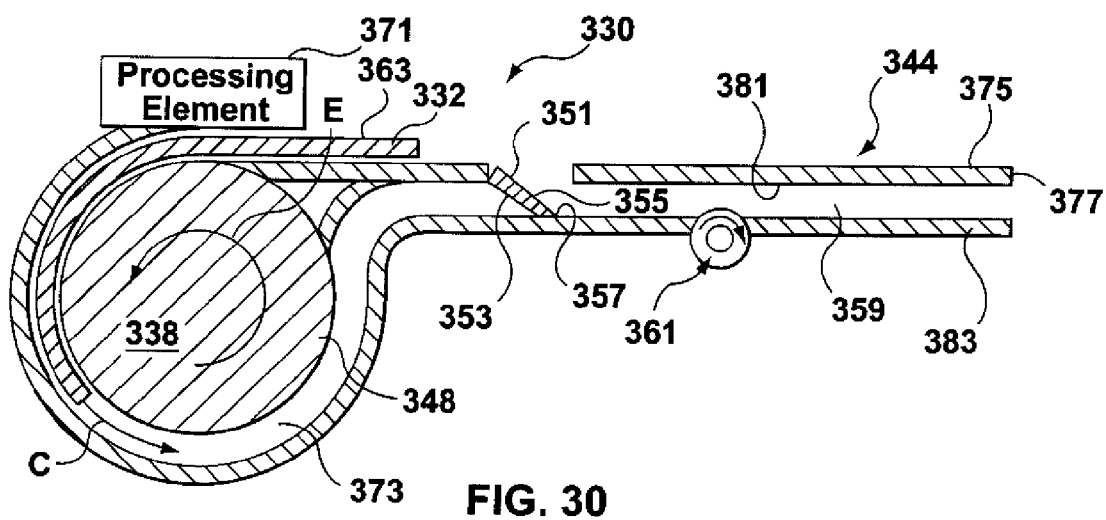
FIG. 30 is a schematic illustration of the apparatus of FIG. 29 showing the document positioned adjacent to a processing element, presenting the first face thereto.
Figure 32:
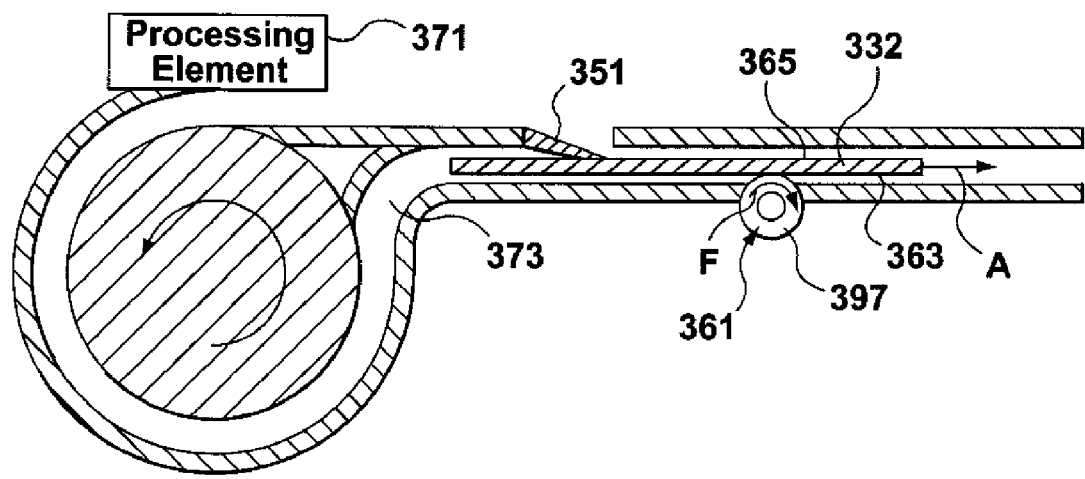
FIG. 32 is a schematic illustration of the apparatus of FIG. 29 showing the document positioned underneath the gate and partially in the first document path, and partially in a second document path.
Figure 33:
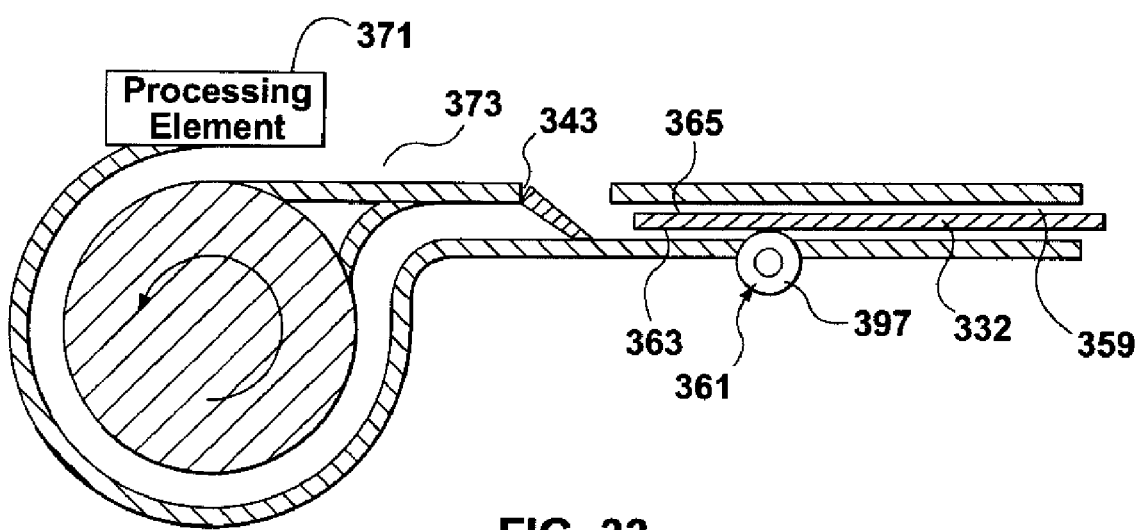
FIG. 33 is a schematic illustration of the apparatus of FIG. 29 showing the document positioned in the second document path, with the second face of the document facing upwardly.

The apparatus 330 is for presenting each of a first face 363 and a second face 365 of a document 332 to a processing element 371 to facilitate processing of the document thereby. As can be seen in FIGS. 29 and 30, the apparatus 330 includes a first transport subassembly 338 for moving the document 332 along a first document path 373 from a front end 343 to a back end 345 of the first document path 373, past the processing element 371 to present the first face 363 of the document 332 for processing thereof by the processing element 371. The apparatus 330 also includes one or more gates 351, as will be described. Each gate 351 has an upstream side 353 defining the back end 345 of the first document path 373 and a downstream side 355 defining an end 357 of a second document path 359 (FIG. 30). Also, each gate 351 is adapted to permit movement of the document 332 from the first document path 373 to the second document path 359, as will also be described. In addition, the apparatus 330 includes a second transport subassembly 361 for moving the document 332 in the second document path 359 (i.e., in the direction of arrow "A" in FIG. 32) until the document 332 has cleared each gate 351 (FIG. 33). The second transport assembly 361 is further adapted for moving the document 332 thereafter along the second document path 359 in a reverse direction (i.e., in the direction of arrow "B" in FIGS. 33A and 33B) until the document 332 engages the downstream side 355 of each gate 351 (FIGS. 33A, 33B, and 34), as will be described.

Figure 34:
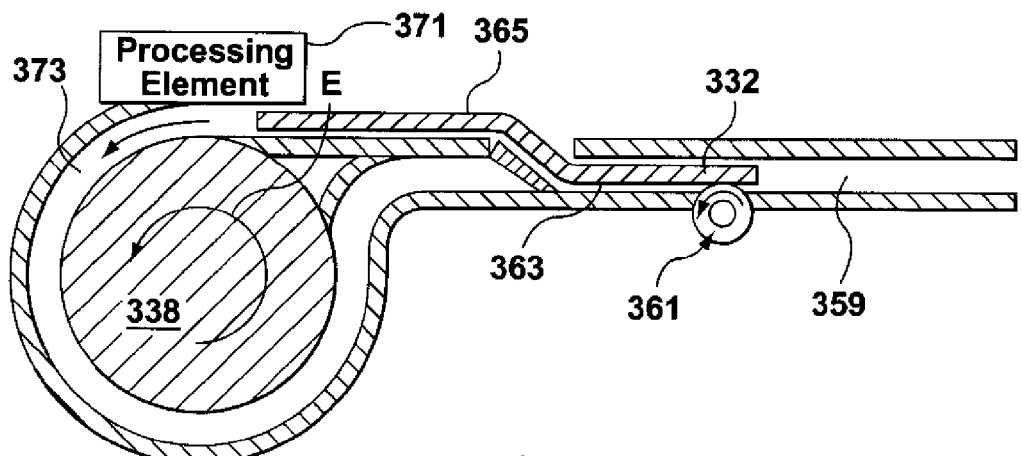
FIG. 34 is a schematic illustration of the apparatus of FIG. 29 showing the document positioned partially in the second document path and partially in the first document path, with the second face thereof facing upwardly.
Figure 35:
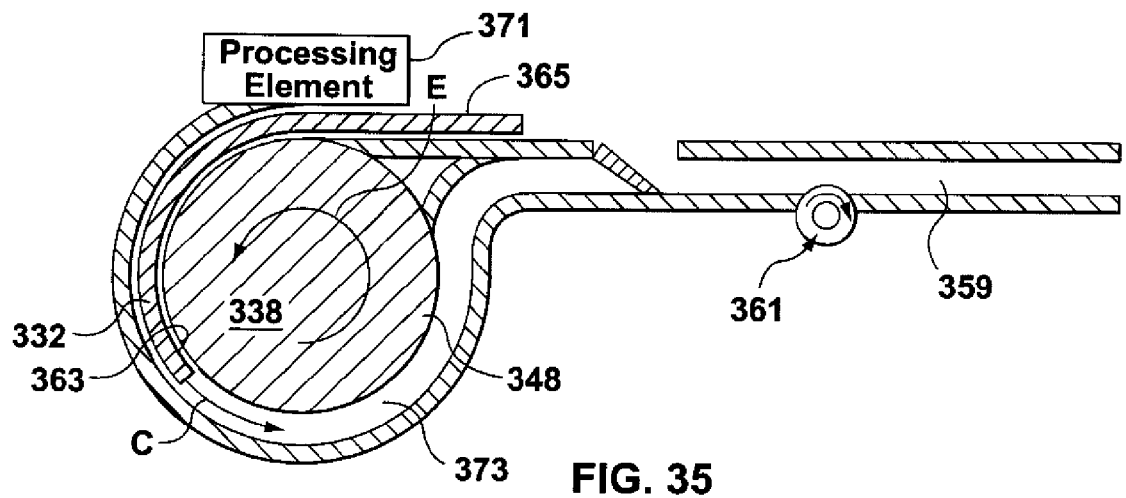
FIG. 35 is a schematic illustration of the apparatus of FIG. 29 showing the document positioned adjacent to the processing element, presenting the second face thereto.

Also, each gate 351 is adapted to direct the document 332, upon engagement of the document 332 with the downstream side 355, into the first document path 373 at the front end 343 thereof with the second face 365 of the document 332 positioned for presentation to the processing element 371. As shown in FIGS. 34 and 35, the second face 365 of the document 332 is presented to the processing element 371 as the document is moved along the first document path 373 by the first transport subassembly 338, for processing thereof by the processing element 371.

Figure 35A:
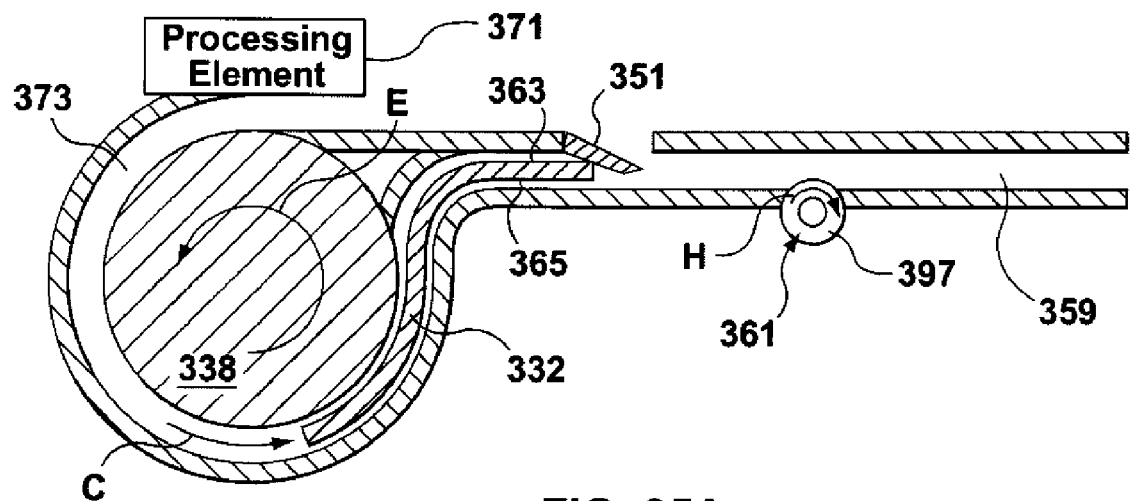
FIG. 35A is a schematic illustration of the apparatus of FIG. 29 showing the document engaging the upstream side of the gate.
Figure 35B:
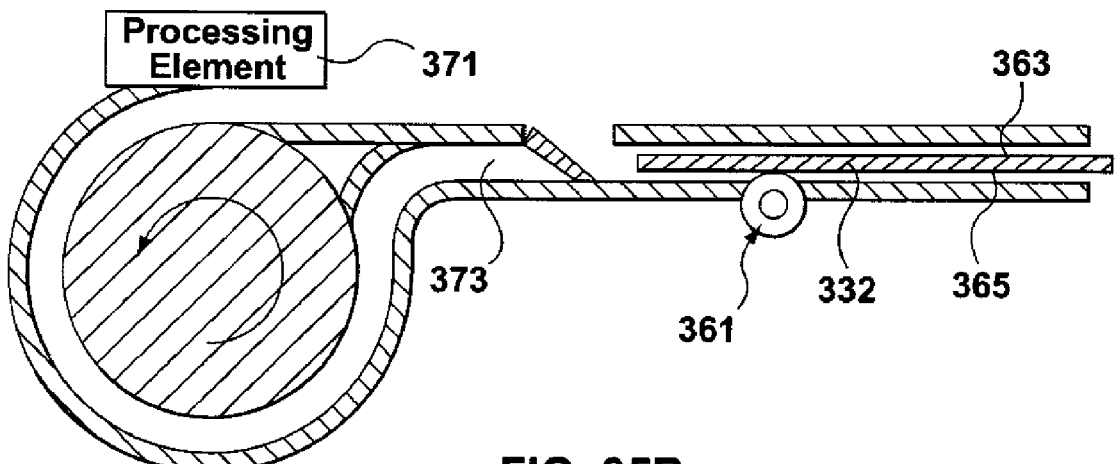
FIG. 35B is a schematic illustration of the apparatus of FIG. 29 showing the document positioned entirely in the second document path.

The document 332 is moved further along the first document path 373 (in the direction of arrow "C", in FIG. 35A) by the first processing element 338, as shown in FIG. 35A. Upon reaching the end of the first document path 373, the document 332 engages the upstream side 353 of the gate 351, causing the gate 351 to move to the open position (FIG. 35A). As described above, the document 332 is moved from the first document path to the second document path 359, where the second transport subassembly 361 pulls the document 332 past the gate 351 until the document 332 is in a final position (FIG. 35B) in the second document path 359. Once the document 332 is in the final position, then the document 332 is removed from the second document path 359 by an operator (not shown).

It will be understood that, for the purposes hereof, "processing" a document refers to any process involving a document such as, for example, capturing an image of at least part of a face of the document, or reading MICR data. "Processing" also includes printing or stamping information on the document.

Figure 37:
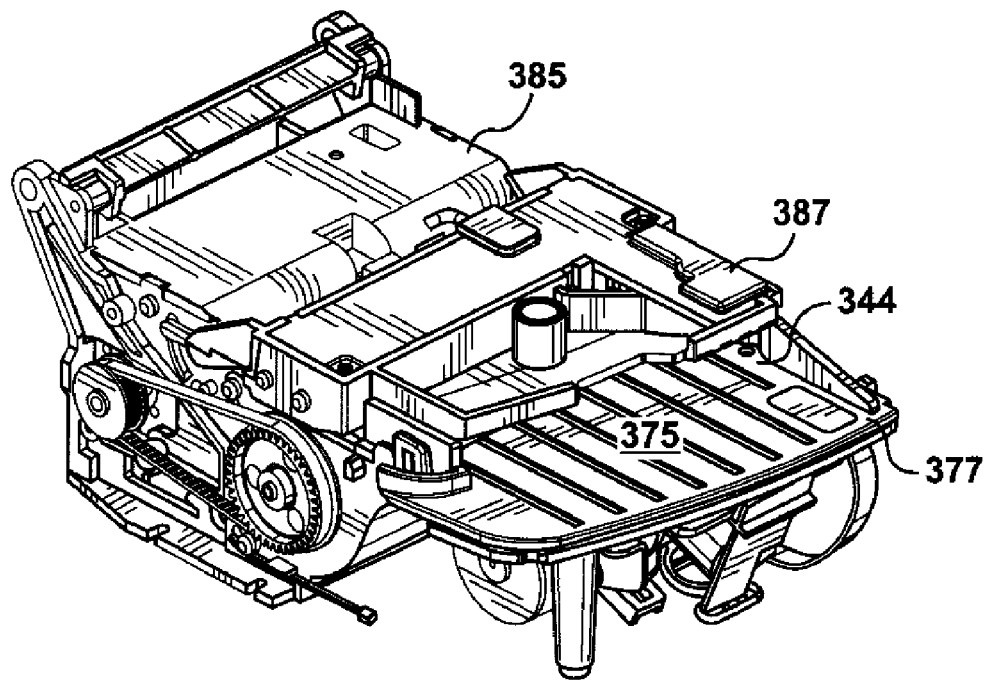
FIG. 37 is an isometric view of an embodiment of the apparatus of the invention.
Figure 38:
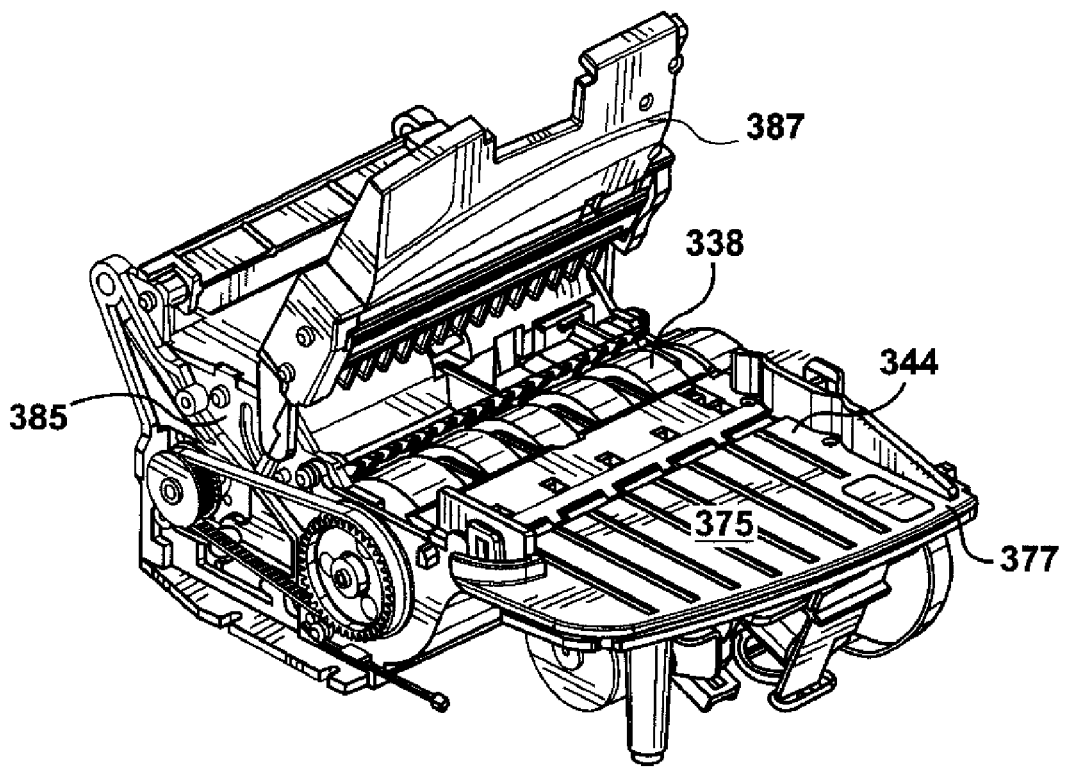
FIG. 38 is another isometric view of the apparatus of FIG. 37.
Figure 39:
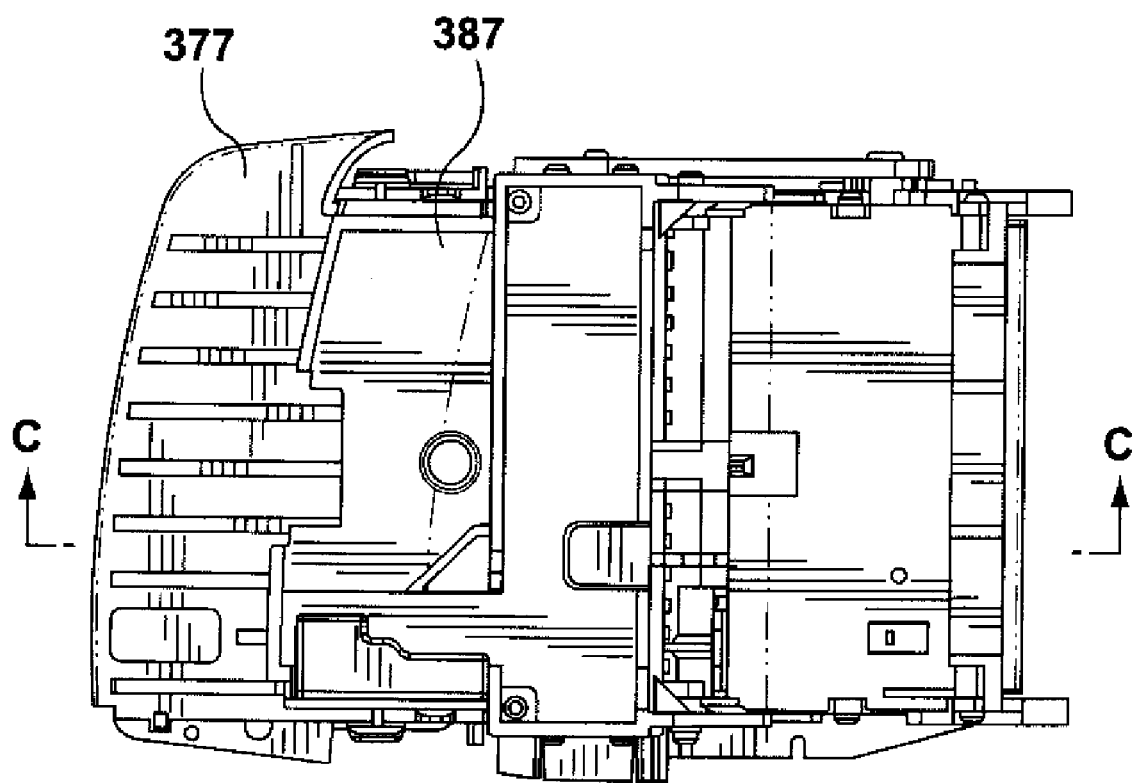
FIG. 39 is a top view of the apparatus of FIG. 37.
Figure 40:
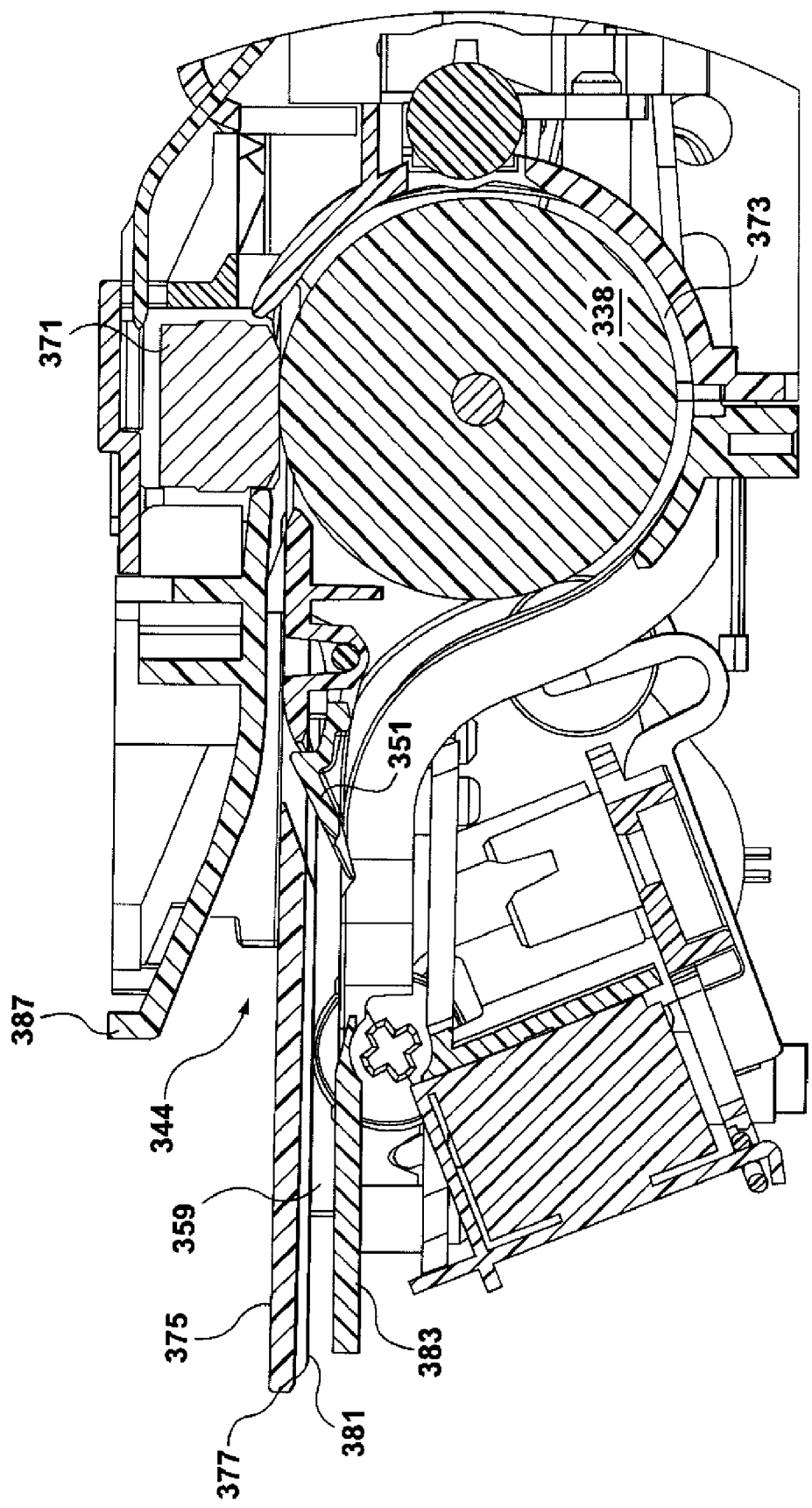
FIG. 40 is a cross-section of the apparatus of FIG. 37 taken along line C-C in FIG. 39, drawn at a larger scale.

As can be seen in FIGS. 29, 30, 37, 38, and 40, the apparatus 330 includes an entrance portion 344 which is defined, in part, by an upper surface 375 of a deck 377. The deck 377 also has a lower surface 381 which is spaced apart from a lower deck 383, to partially define the second document path 359 (FIGS. 29, 30, and 40). The deck 377 is mounted onto a housing 385 of the apparatus 330. The apparatus 330 also includes a top portion 387 which is preferably pivotably mounted to the housing 385, and movable between a raised position (FIG. 38) and a lowered position (FIG. 37). As can be seen in FIGS. 37 and 38, the top portion 387 is pivotably mounted to provide relatively convenient access to the first transport subassembly 338 in the event that the document 332 jams upon engagement with the first transport subassembly 338.

Figure 41:
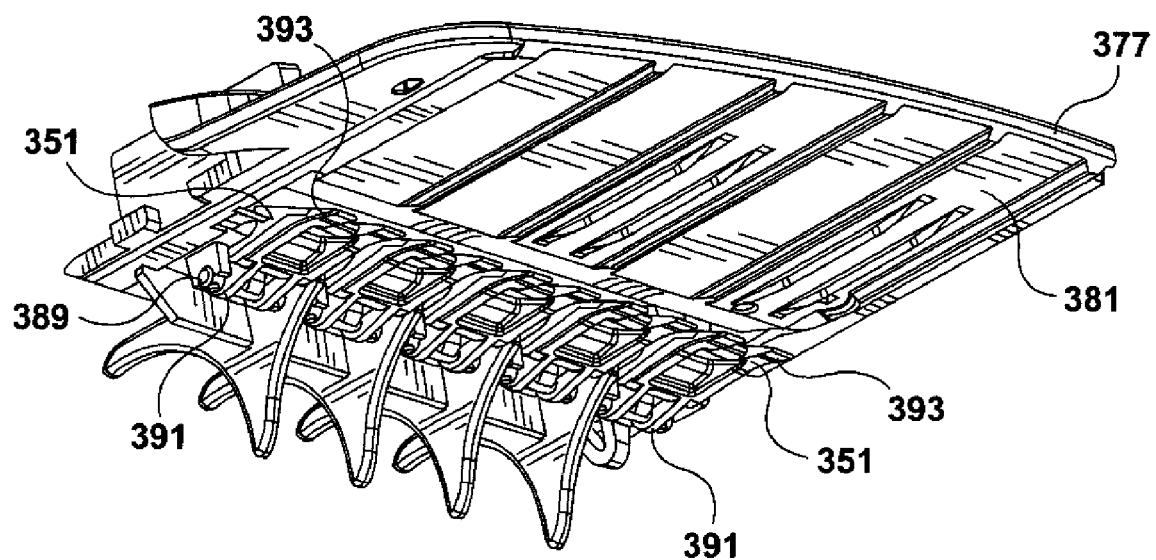
FIG. 41 is an isometric view of a deck in the apparatus of FIG. 37 showing an array of gates mounted on a lower surface thereof, drawn at a smaller scale.

As shown in FIG. 41, one or more gates 351 preferably are pivotably mounted to the lower surface 381 of the deck 377. As can be seen in FIG. 41, preferably, each gate 351 is pivotable about on or more rods 389 defining an axis about which each gate 351 is pivotable. In the preferred embodiment, a plurality of gates 351 is used because, in this structure, the mass of each individual gate 351 is relatively small, to minimize cost. Preferably, each gate 351 has a proximal end 391 through which the rod 389 passes, and a distal end 393 positioned distal to the proximal end 391. The distal end 393 preferably is shaped and positioned so that, upon engagement of the document 332 with the upstream side 353 of the gate 351, the document 332 is directed underneath the distal end 393, to force the distal end 393 to pivot upwardly. As can be seen in FIG. 41, if a plurality of rods or similar structural elements is used, then the rods or other elements are positioned so that the axes about which the gates are pivotable are coaxial.

Figure 33A:
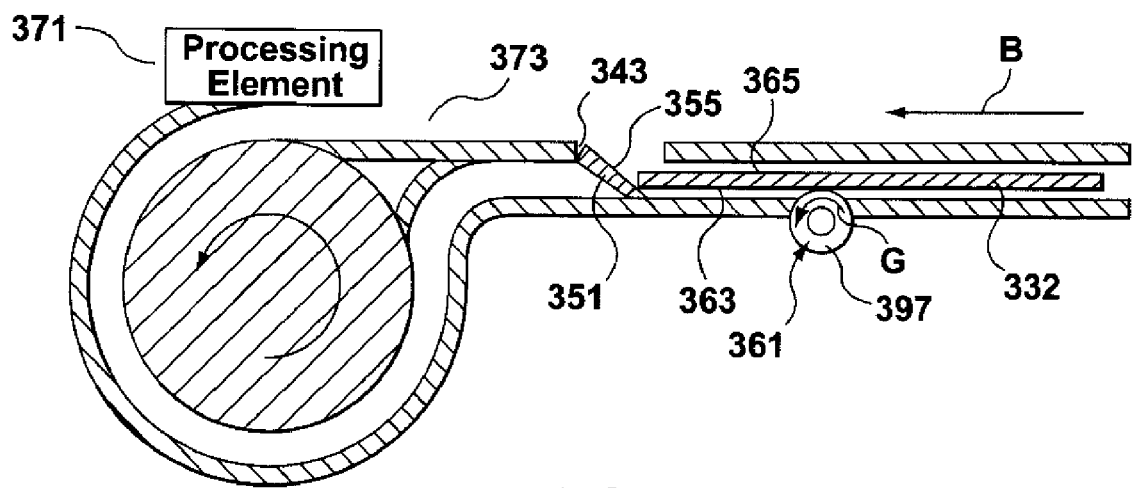
FIG. 33A is a schematic illustration of the apparatus of FIG. 29 showing the document engaging a downstream side of the gate.
Figure 33B:
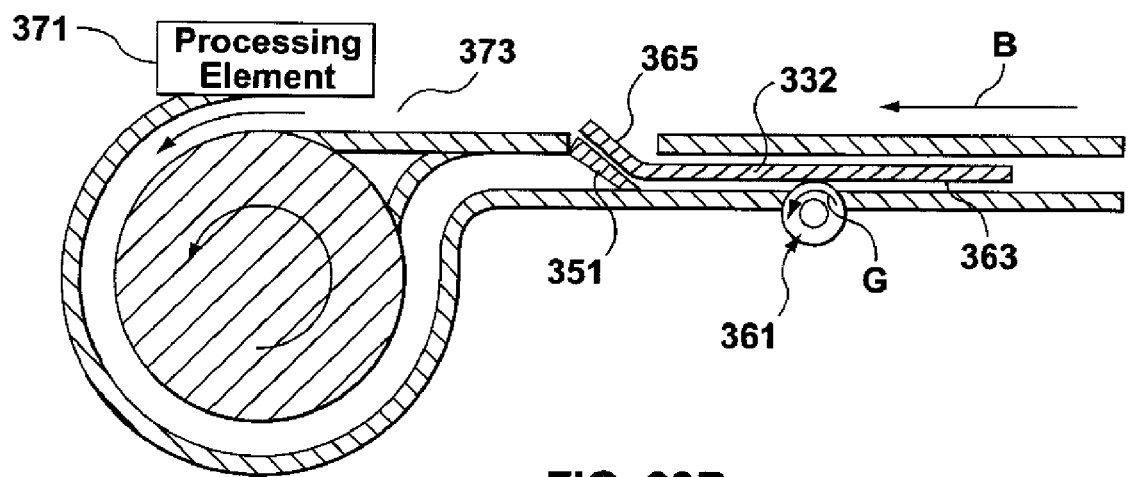
FIG. 33B is a schematic illustration of the apparatus of FIG. 29 showing the document directed into the first document path by the gate.

Preferably, each gate 351 is pivotable between the open position (FIG. 32), in which the document 332 can pass beneath the gate 351, and a closed position (FIGS. 31 and 33), in which the gate 351 (i.e., the distal end 393 thereof) engages the lower deck 383. When the gate 351 is in the closed position and the document 332 engages the downstream side 355 of the gate 351, the document 332 is directed towards the first document path 373 (FIGS. 33A, 33B, and 34).

Preferably, the gate 351 is biased to the closed position. It will be appreciated by those skilled in the art that the biasing of the gate 351 can be accomplished in various ways. In the preferred embodiment, each gate 351 is biased to the closed position (i.e., downwardly) by gravity. However, those skilled in the art would appreciate that each gate 351 could be biased to the closed position by other means, e.g., a spring. Also, various means for moving each gate 351 from the closed position to the open position are possible. In the preferred embodiment, the upstream side 353 of the gate 351 is adapted and positioned to direct the document underneath the gate 351, and thereby to lift the gate 351. Also, it is preferred that the gate 351 remains in the closed position when the document 332 engages the downstream side 355 of the gate 351 (FIG. 33A).

In use, the operator first places the document 332 in the entrance portion 344 of the apparatus 330 with the first face 363 of the document 332 facing upwardly (FIG. 29). The operator pushes the document 332 in the direction of arrow "D" into the first document path 373 until the first transport subassembly 338 engages the document 332. The first transport subassembly 338 includes one or more rollers 348 driven to rotate in a direction so as to move the document 332 through the first document path 373 upon engagement of the roller 348 with the document 332. As shown in FIGS. 29-35B, rotation of the roller 348 is counterclockwise, i.e., in the direction indicated by arrow "E".

The document 332, with the first face 363 presented to the processing element 371, is moved through the first document path 373 by the first transport subassembly 338 in the direction indicated by arrow "C". It will be understood that the processing element 371 may be adapted for any type of processing of the document 332, and may be positioned anywhere along the first document path 373. The processing element 371 is positioned immediately above the roller 348 in FIGS. 29-35B solely for illustrative purposes. Because the first face 363 is presented outwardly, the second face 365 engages with the roller 348.

It will also be understood that FIGS. 29-35B are schematic illustrations in which certain aspects have not been drawn to scale, for the purposes of clarity. For example, in FIGS. 29-35B, relatively large gaps are shown between the document 332 and the roller 348, between the document 332 and the walls defining the document paths 373 and 359, and between the document 332 and the second transport subassembly 361. In contrast, FIG. 40 is a cross-section drawn to scale, and it can be seen from FIG. 40 that the aforesaid gaps between the document 332 and other elements illustrated in FIGS. 29-35B enable the functional aspects of the steps taken in processing the document to be shown clearly.

Figure 31:
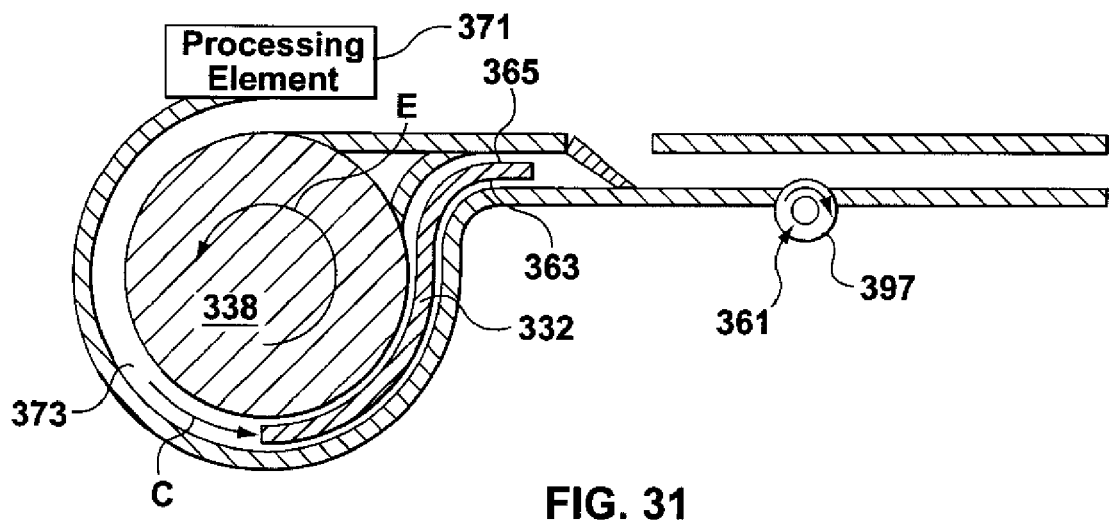
FIG. 31 is a schematic illustration of the apparatus of FIG. 29 showing the document positioned in the first document path.
Figure 31A:
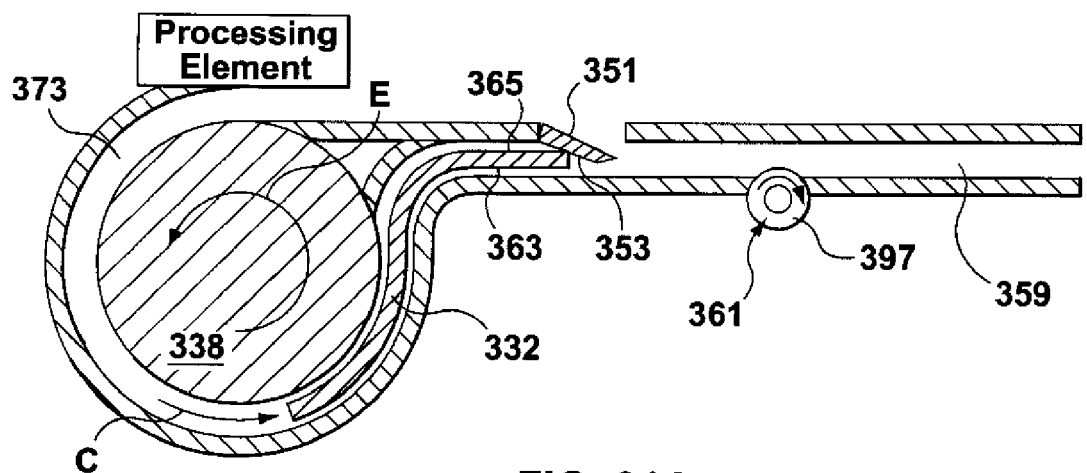
FIG. 31A is a schematic illustration of the apparatus of FIG. 29 showing the document engaging an upstream side of a gate.

At the back end 345 of the first document path 373, the document 332 engages the upstream side 353 of the gate 351 (FIG. 31A). Both the upstream side 353 and the downstream side 355 of the gate are relatively smooth, so that the document 332 slides along the gate 351 upon engagement by the document 332 therewith. Also, and as shown in the drawings, when the gate 351 is in the closed position, the upstream side 353 is positioned at an acute angle relative to the document 332. Preferably, the upstream side 353 is disposed at about 25° relative to the document 332 upon engagement of the document with the upstream side 353. Because of this, and because the upstream side 353 is relatively smooth, when the document 332 engages the upstream side 353, the document slidably engages the upstream side, and the document 332 is able to slide underneath the gate 351. As the document 332 pushes underneath the distal end 393 of the gate 351, the distal end 393 pivots upwardly about the axis defined by rod element 389 which passes through (or is positioned in) the proximal end 391 of the gate 351.

The second transport subassembly 361 includes one or more wheels 397 rotatable in two directions by a drive mechanism (not shown). As shown in FIGS. 31A and 32, the document 332 is initially moved from the first document path 373 into the second document path 359 by the first transport subassembly 338. Once the document 332 has been moved sufficiently far into the second document path 359, the second transport subassembly 361 engages the document 332 and moves the document 332 past the gate 351, i.e., completely into the second document path 359, in the direction indicated by arrow "A". As shown in FIGS. 31A and 32, in order to accomplish this, the wheel 397 is rotated in the direction indicated by arrow "F".

Once the document 332 has cleared the gate 351, then, as shown in FIG. 33, rotation of the wheel 397 is stopped. As can be seen in FIG. 33, the document 332 is stationary in the second document path 359 in a rest position, with the second face 365 facing upwardly.

As illustrated in FIG. 34, the wheel 397 is next rotated in the direction indicated by arrow "G", thereby moving the document 332 in a reverse direction (i.e., opposite to the direction indicated by arrow "A"), which reverse direction is indicated by arrow "B".

Upon engagement of the document 332 with the downstream side 355 of the gate 351, the document 332 is directed up the downstream side 355 into the first document path 373 at the front end 343 thereof (FIGS. 33A, 33B, and 34). As can be seen in FIGS. 33A, 33B, and 34, the gate 351 is in the closed position, and the downstream side 355 of the gate 351 and is positioned at an obtuse angle relative to the document 332, when the document 332 engages the downstream side 355. In addition, and as described above, the downstream side 355 is relatively smooth, so that the document can slidably engage the downstream side 355. That is, upon engagement of the document with the downstream side 355, the document slides along and up the downstream side 355 until it reaches the front end 343 of the first document path 373. The document slidably engages the downstream side 355 because of the position of the downstream side 355 relative to the document (i.e., the downstream side is at an obtuse angle relative to the document) and because the downstream side 355 is relatively smooth. Preferably, the downstream side is disposed at about 155° relative to the document.

It will be appreciated that the disposition of the gate 351 relative to the document when the gate 351 is in the closed position (i.e., the acute angle and the obtuse angle described above) can vary over a wide range.

As can be seen in FIG. 32, when the document 332 is first moved into the second document path 359, the second face 365 is facing upwardly. Accordingly, when the document 332 is moved into the first document path 373 for the second time—as shown in FIGS. 33A, 33B, 34, and 35—the second face 365 of the document 332 is facing upwardly.

The document 332 engages with the roller 348 once the document 332 has been pushed sufficiently far into the first document path 373 (FIGS. 34 and 35). The document 332 is then moved along the first document path 373 by the first transport subassembly 338 in the direction indicated by arrow "C". As shown in FIGS. 34 and 35, the second face 365 is presented to the processing element 371 as the document 332 is moved through the first document path 373. The first face 363 of the document 332 directly engages the roller 348.

FIG. 35A shows the document 332 beginning to move out of the first document path 373 with the first face 363 facing upwardly once again. The document 332 pushes the distal end 393 of the gate 351 upwardly, and the document 332 is initially moved into the second document path 359 by the first transport subassembly 338. The second transport subassembly 361 also moves the document 332 into the second document path 359. Finally, after the document 332 has cleared the gate 351 with the first face 363 facing upwardly, the document 332 arrives in the final position in the second document path 359 (FIG. 35B), in which the second transport subassembly is not rotating.

Figure 42:
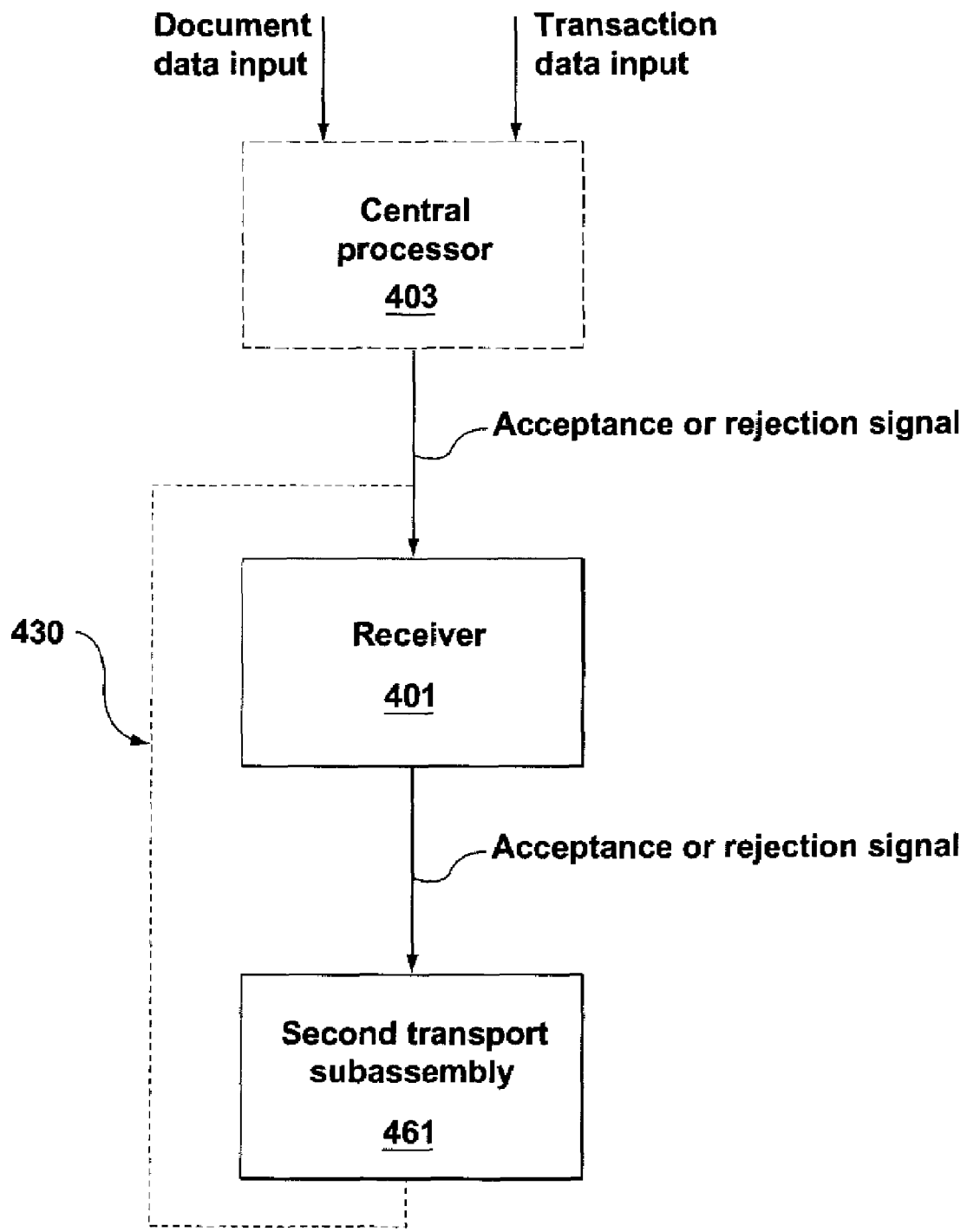
FIG. 42 is a functional block diagram of a portion of an embodiment of the apparatus of the invention.

In another embodiment of the apparatus 430, the apparatus 430 includes elements (schematically illustrated in FIG. 42) which are adapted to take into account acceptance or rejection of the document 332 when the document is tendered or submitted with respect to one or more transactions. Preferably, the apparatus 430 includes a receiver 401 adapted for receiving an acceptance signal indicating that the document 332 is acceptable with respect to the transaction(s). However, the receiver 401 is also adapted to receive a rejection signal indicating that the document 332 is unacceptable with respect to the transaction(s). For clarity, only two elements of the apparatus 430 are illustrated in FIG. 42, but it will be understood that the apparatus 430 includes such other elements, corresponding to elements of the apparatus 330, as are required.

It will also be understood that, as described above, information about the transaction(s) and information about the document (e.g., if the document is a check) may be sent, by any suitable means, to a processor 403 for a determination of whether the document is acceptable or not for the transaction (s) in question. The information is input using any suitable input means and transmitted to the processor 403 via any suitable communication means. Also, once the determination has been made, the acceptance or rejection signal could be transmitted to the receiver 401 via any suitable network or other communication system, whether wired or wireless. It will be appreciated by those skilled in the art that, although the processor 403 may be a central processor, the processor 403 could be any suitable processor, and could, for example, be included in the apparatus 430.

The apparatus 430 preferably includes a second transport subassembly 461 which is adapted to receive the acceptance signal which is communicated to the second transport subassembly 461 by the receiver 401. Preferably, the acceptance signal is received by the second transport subassembly 461 before or while the document 332 is located in the second document path 359 in the rest position (FIG. 33).

If the second transport subassembly 461 receives an acceptance signal, it then moves the document 332 in the reverse direction so that it engages the downstream side 355 of the gate 351, as shown in FIG. 33A. The second transport subassembly 461 thereafter moves the document 332 into the first document path 373 with the second face 365 facing upwardly until the first transport subassembly 338 engages the document 332, as described above (i.e., as shown in FIGS. 33A 33B, 34, and 35).

As described above, the document 332 is then moved along the first document path 373 until the document 332 engages the upstream side 353 of the gate 351 (FIG. 35A). As can be seen in FIG. 35A, at this point, the first face 363 of the document 332 is facing upwardly. The document 332 is then moved from the first document path 373 into the second document path 359 (i.e., the document passes under the gate 351) by the first transport subassembly 338, as previously described. The second transport subassembly 461 also engages the document 332 once it is sufficiently far into the second document path, with the wheel 497 rotating in the direction shown by arrow "H" in FIG. 35A.

Figure 43:
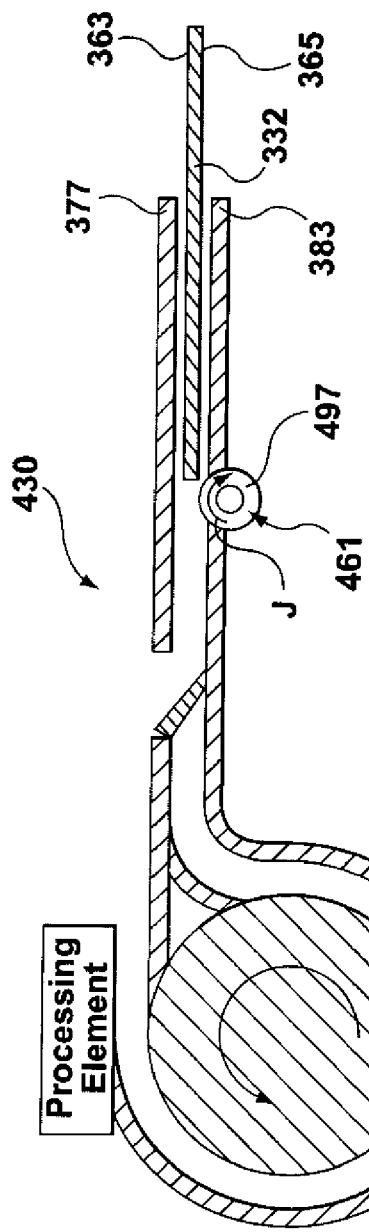
FIG. 43 is a schematic illustration of an embodiment of the apparatus of the invention showing the document in a predetermined acceptance position.

After the document 332 has cleared the gate 351, however, the document 332 is preferably moved to a predetermined acceptance position, illustrated in FIG. 43. The wheel 497 rotates in the direction of arrow "J" (FIG. 43), engaging the document 332, thereby moving the document 332 to the predetermined acceptance position shown in FIG. 43. When the document 332 is in the acceptance position, the first face 363 is facing upwardly. Also, and as can be seen in FIG. 43, when the document 332 is in the acceptance position, a portion of the document extends beyond the deck 377 and the lower deck 383 so that the document 332 can easily be grasped for removal by the operator.

Figure 44:
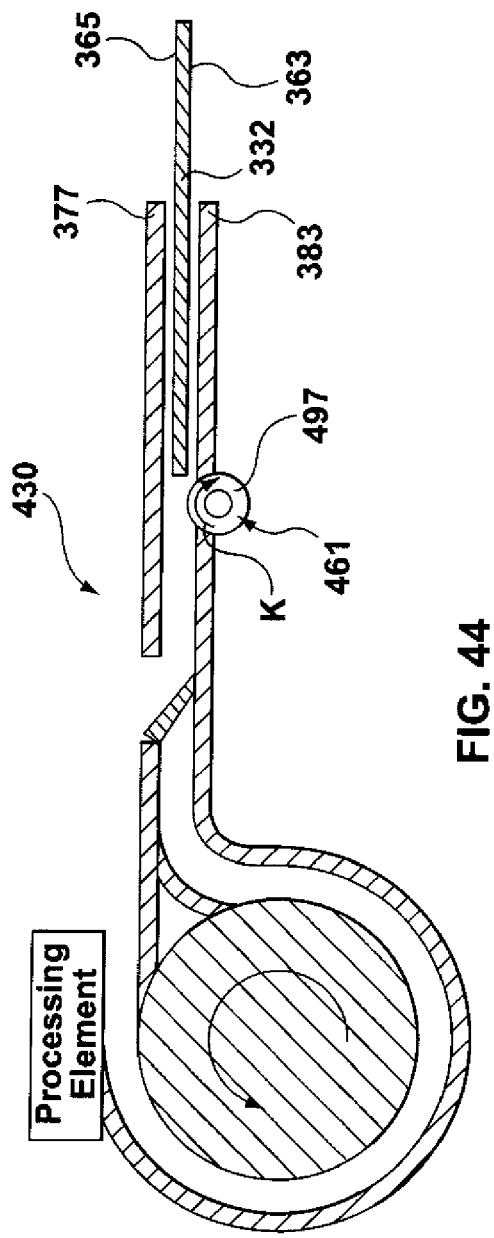
FIG. 44 is a schematic illustration of an embodiment of the apparatus of the invention showing the document in a predetermined rejection position.

However, if the second transport subassembly 461 receives the rejection signal, the second transport subassembly 461 preferably moves the document 332 to a predetermined rejection position, shown in FIG. 44. The sequence of events is as follows. First, the rejection signal is preferably received when the document is in the second document path 359 as shown in FIG. 33. At this point in the process, as described above, the document 332 would have been moved through the first document path 373 once, and the document 332 is positioned in the second document path 359 with the second face 365 facing upwardly. Upon receipt by the second transport subassembly 461 of the rejection signal, the wheel 497 is rotated in the direction shown by arrow "K" in FIG. 44 to move the document 332 to the predetermined rejection position. When the document 332 is in the rejection position, the second face 365 is facing upwardly. Also, and as can be seen in FIG. 44, when the document 332 is in the acceptance position, a portion of the document extends beyond the deck 377 and the lower deck 383 so that the document 332 can easily be grasped for removal by the operator.

From the foregoing description it can be seen that whether the document's first face or second face is facing upwardly will serve to confirm for the operator whether the document is accepted or rejected.

Other acceptance or rejection positions will occur to those skilled in the art. For example, instead of the second transport assembly 461 moving the document 332 to the rejection position (FIG. 44) upon receipt of the rejection signal, the second transport assembly 461 could do nothing further, and the operator could, in that case, retrieve the rejected document 332 from its position as shown in FIG. 33.

Figure 36:
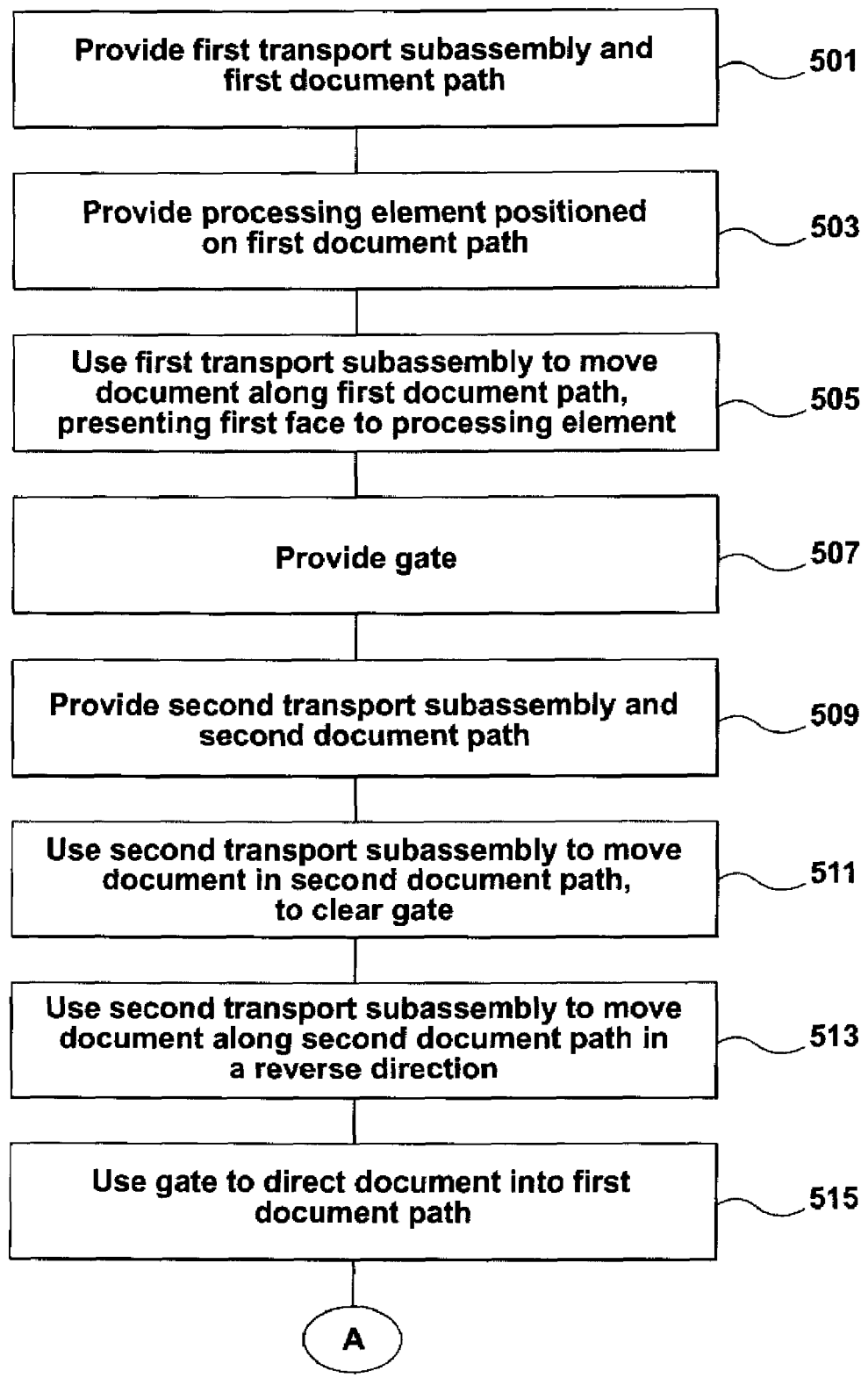
FIG. 36 is a flow diagram schematically illustrating a portion of an embodiment of a method of the invention.
Figure 36A:
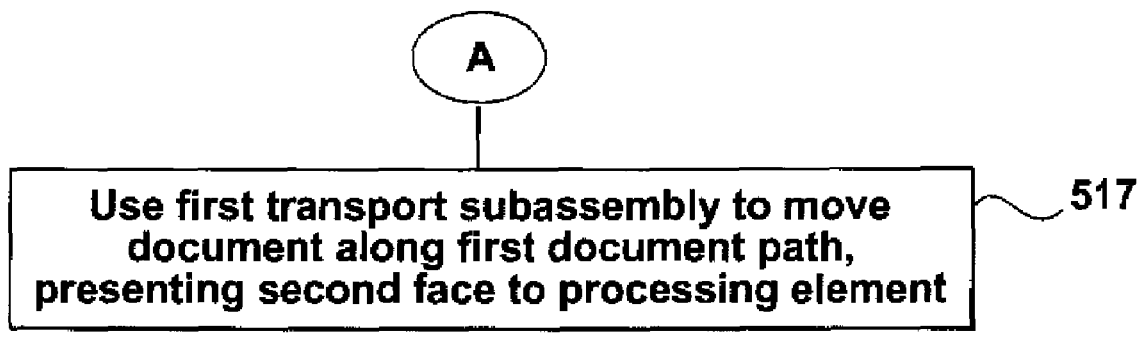
FIG. 36A is a flow diagram schematically illustrating another portion of the method of the invention partially shown in FIG. 36.

In another embodiment, the invention includes a method of presenting each of a first face and a second face of a document to a processing element for processing of the document thereby, as schematically represented in FIG. 36. The method begins at block 501, where a first transport subassembly and a first document path operably associated therewith are provided. One or more processing elements is provided, positioned on or near the first document path (block 503). Next, the first transport subassembly is used to move the document along the first document path from a front end thereof to a back end thereof (i.e., past the processing element), and the first face of the document is presented to the processing element as the document is moved along the first document path (block 505).

As shown in block 507, a gate is provided at the back end of the first document path. A second transport subassembly and a second document path operably associated therewith are also provided, the gate having a downstream side marking an end of the second document path (block 509). The second transport subassembly is used to move the document in the second document path until the document clears the gate (block 511).

The second transport subassembly is then used to move the document in a reverse direction along the second document path until the document engages the downstream side of the gate (block 513). Upon engagement of the document with the gate, the document is directed into the first document path with the second face positioned for presentation to the processing element (block 515). The document is then moved through the first document path with the second face presented to the processing element (block 517).

Any element in a claim that does not explicitly state "means for" performing a specified function, or "step for" performing a specific function, is not to be interpreted as a "means" or a "step" clause as specified in 35 U.S.C. §112, paragraph 6. In particular, the use of "step of" in the claims herein is not intended to invoke the provisions of 35 U.S.C. §112, paragraph 6.

It will be evident to those skilled in the art that the invention can take many forms, and that such forms are within the scope of the invention as claimed. Therefore, the spirit and scope of the appended claims should not be limited to the description of the preferred versions contained therein.

We claim:

1. An apparatus for presenting each of a first face and a second face of a document to a processing element to facilitate processing of the document thereby, the document being related to at least one transaction, the apparatus comprising:
    a receiver for receiving an acceptance signal indicating that the document is acceptable with respect to said at least one transaction, and if the document is unacceptable with respect to said at least one transaction, a rejection signal indicating that the document is unacceptable;
    a first transport subassembly for moving the document along a first document path from a front end to a back end of the first document path past the processing element to present the first face of the document to the processing element for processing thereof by the processing element;
    at least one gate having an upstream side defining the back end of the first document path and a downstream side defining an end of a second document path;
    said at least one gate being adapted to permit movement of the document from the first document path to the second document path;
    a second transport subassembly adapted to move the document in the second document path until the document has cleared said at least one gate;
    said receiver being adapted to communicate the acceptance signal to the second transport subassembly, upon receipt thereof by said receiver;
    the second transport subassembly being further adapted, upon receipt of the acceptance signal, to move the document along the second document path in a reverse direction until the document engages the downstream side of said at least one gate;
    said at least one gate being adapted to direct the document, upon engagement thereof with the downstream side of said at least one gate, into the first document path at the front end thereof with the second face of the document positioned for presentation to the processing element as the document is moved along the first document path, for processing thereof by the processing element; and
    the document being subsequently movable into the second document path to a predetermined acceptance position therefor.

2. An apparatus according to claim 1 in which the second transport subassembly is further adapted, upon receipt of the rejection signal, to move the document to a predetermined rejection position therefor.

3. An apparatus according to claim 1 in which the second transport subassembly is further adapted, upon receipt of the rejection signal, to maintain the document in a predetermined rejection position therefor.

4. An apparatus according to claim 1 additionally comprising means for transmitting information about the document and said at least one transaction to a processor for processing the information, to determine whether the document is acceptable with respect to said at least one transaction.

* * * * *

UNITED STATES PATENT AND TRADEMARK OFFICE
CERTIFICATE OF CORRECTION

PATENT NO. : 7,665,655 B2 Page 1 of 1
APPLICATION NO. : 11/341417
DATED : February 23, 2010
INVENTOR(S) : Johannesson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1061 days.

Signed and Sealed this

Seventh Day of December, 2010

David J. Kappos
*Director of the United States Patent and Trademark Office*